(12) United States Patent
Singh et al.

(10) Patent No.: US 9,453,111 B2
(45) Date of Patent: Sep. 27, 2016

(54) BORON-MODIFIED SILAZANES FOR SYNTHESIS OF SIBNC CERAMICS

(71) Applicant: Kansas State University Research Foundation, Manhattan, KS (US)

(72) Inventors: Gurpreet Singh, Manhattan, KS (US); Romil Bhandavat, Manhattan, KS (US)

(73) Assignee: Kansas State University Research Foundation, Manhatten, KS (US)

( * ) Notice: Subject to any disclaimer, the term of this patent is extended or adjusted under 35 U.S.C. 154(b) by 12 days.

(21) Appl. No.: 14/377,123

(22) PCT Filed: Feb. 7, 2013

(86) PCT No.: PCT/US2013/025137
§ 371 (c)(1),
(2) Date: Aug. 6, 2014

(87) PCT Pub. No.: WO2013/119806
PCT Pub. Date: Aug. 15, 2013

(65) Prior Publication Data
US 2015/0030856 A1 Jan. 29, 2015

Related U.S. Application Data

(60) Provisional application No. 61/595,922, filed on Feb. 7, 2012, provisional application No. 61/697,578, filed on Sep. 6, 2012.

(51) Int. Cl.
*B05D 7/24* (2006.01)
*C08G 77/62* (2006.01)
(Continued)

(52) U.S. Cl.
CPC ............. *C08G 77/62* (2013.01); *B05D 3/0254* (2013.01); *B05D 7/24* (2013.01); *B82Y 30/00* (2013.01); *C04B 24/42* (2013.01); *C04B 35/58* (2013.01); *C04B 35/589* (2013.01); *C04B 35/597* (2013.01); *C04B 35/6267* (2013.01); *C04B 35/6268* (2013.01); *C04B 35/62218* (2013.01);
(Continued)

(58) Field of Classification Search
USPC ................ 428/408, 698, 704; 427/180, 387; 501/94, 95.2, 96.1, 96.4, 97.1; 556/402
See application file for complete search history.

(56) References Cited

U.S. PATENT DOCUMENTS

| | | | |
|---|---|---|---|
| 4,668,642 | A | 5/1987 | Bujalski |
| 5,021,533 | A | 6/1991 | Schwark |

(Continued)

FOREIGN PATENT DOCUMENTS

JP 09095646 8/1997

OTHER PUBLICATIONS

International Search Report and Written Opinion dated May 15, 2013 in the corresponding PCT/US2013/025137.
(Continued)

*Primary Examiner* — Archene Turner
(74) *Attorney, Agent, or Firm* — Hovey Williams LLP

(57) ABSTRACT

New methods for synthesizing boron-modified silazanes, their use as polymer-derived ceramic precursors, and polymer-derived ceramics and composites formed therefrom are disclosed. The polymeric ceramic precursors comprise a boron-modified silazane that is a room temperature liquid-phase polymer comprising a backbone having recurring monomeric repeat units comprising boron-nitrogen bonds. Nanocomposites comprising polymer-derived ceramics and carbon nanotubes are also disclosed.

24 Claims, 35 Drawing Sheets

(a) MWCNT dispersed in Toluene
(b) Polymer functionalized NT subjected to MW irradiation
(c) Si(B)CN ceramic coated MWCNT

(51) Int. Cl.
| | |
|---|---|
| C04B 24/42 | (2006.01) |
| C09D 183/16 | (2006.01) |
| C04B 35/58 | (2006.01) |
| C04B 35/589 | (2006.01) |
| C04B 35/597 | (2006.01) |
| C04B 35/622 | (2006.01) |
| C04B 35/626 | (2006.01) |
| C04B 35/628 | (2006.01) |
| C04B 35/80 | (2006.01) |
| B82Y 30/00 | (2011.01) |
| B05D 3/02 | (2006.01) |

(52) U.S. Cl.
CPC ... *C04B 35/62222* (2013.01); *C04B 35/62857* (2013.01); *C04B 35/62863* (2013.01); *C04B 35/62868* (2013.01); *C04B 35/62871* (2013.01); *C04B 35/62886* (2013.01); *C04B 35/806* (2013.01); *C09D 183/16* (2013.01); *C04B 2235/3409* (2013.01); *C04B 2235/483* (2013.01); *C04B 2235/486* (2013.01); *C04B 2235/5288* (2013.01); *C04B 2235/665* (2013.01); *C04B 2235/667* (2013.01); *C04B 2235/9607* (2013.01); *Y10T 428/30* (2015.01); *Y10T 428/31678* (2015.04)

(56) References Cited

U.S. PATENT DOCUMENTS

| | | | |
|---|---|---|---|
| 5,030,744 A | | 7/1991 | Funayama et al. |
| 5,190,709 A | | 3/1993 | Lukacs, III |
| 5,233,066 A | * | 8/1993 | Jansen .................. C01B 21/064 556/402 |
| 5,364,920 A | | 11/1994 | Bujalski et al. |
| 5,543,485 A | * | 8/1996 | Baldus .................. C08G 77/60 501/96.1 |
| 5,866,705 A | * | 2/1999 | Jansen .................. C08G 77/60 501/96.1 |
| 6,093,840 A | * | 7/2000 | Jansen .................. C04B 35/571 501/96.3 |
| 6,242,626 B1 | * | 6/2001 | Eiling .................. C04B 35/589 556/402 |
| 7,795,461 B2 | * | 9/2010 | Krosche ................ C04B 35/589 556/402 |

OTHER PUBLICATIONS

Bhandavat R. "Synthesis of Polymer-Derived Ceramic Si(B) CN-Carbon Nanotube Composite by Microwave Induced Interfacial Polarization," ACS Applied Materials & Interfaces, 2012, pp. 11-16, vol. 4.

Bhandavat R. "Synthesis, Characterization, and High Temperature Stability of Si(B) CN-Coated Carbon Nanotubes Using a Boron-Modified Poly(ureamethylvinyl)Silazane Chemistry," J. Am. Ceram. Soc., May 2012, pp. 1536-1543, vol. 95[5].

Katsuda, Y. "Reinforcement of Precursor-derived Si-(B-)C-N Ceramics with Carbon Nanotubes," Max-Planck-Institut für Metallforschung, Dec. 20, 2005, Bericht Nr. 177.

Lehman J. "Core-Shell Composite of SiCN and Multiwalled Carbon Nanotubes from Toluene Dispersion," J. Mater. Sci., May 21, 2010, pp. 4251-4254, vol. 45.

\* cited by examiner

BORON-MODIFIED SILAZANES FOR SYNTHESIS OF SIBNC CERAMICS

CROSS-REFERENCE TO RELATED APPLICATIONS

The present application is the U.S. National Stage of PCT/US2013/025137, filed Feb. 7, 2013, which claims the priority benefit of U.S. Provisional Patent Application Ser. No. 61/595,922, filed Feb. 7, 2012, and Ser. No. 61/697,578, filed Sep. 6, 2012, both entitled SYNTHESIS OF BORON-MODIFIED POLYUREASILAZANE FOR SYNTHESIS OF SI(B)CN CERAMIC, and incorporated by reference in their entireties herein.

FEDERALLY SPONSORED RESEARCH OR DEVELOPMENT

This invention was made with government support under grant #EPS-0903806, awarded by the National Science Foundation. The United States government has certain rights in the invention.

BACKGROUND OF THE INVENTION

1. Field of the Invention

The present invention relates to polymer-derived ceramics, precursors, and methods of using and making the same.

2. Description of Related Art

Polymer-derived ceramics, such as silicon carbide (SiC), siliconoxycarbide (SiOC), silicon carbonitride (SiCN), aluminum nitride (AlN), and hafnium carbide (HfC), can be synthesized by thermal decomposition of suitable polymeric precursors, and possess some remarkable properties, such as high oxidation resistance, high temperature piezoresistivity, high mechanical strength, and photoluminescence One advantage of polymer-derived ceramics is that their microstructure can be modified on a molecular scale through modification of the polymer precursor. Most silicon-based polymer-derived ceramics are amorphous ceramics, prepared by controlled heating of polysilazane- or polysiloxane-based liquid polymeric precursors. The final ceramic's chemical and physical properties are known to depend on the initial molecular arrangement of the polymeric precursor and processing conditions. Boron-doping of polymer-derived ceramics has also been shown to result in enhanced electrical conductivity and thermoelectric power. Early work on boron-modified polysilazane (precursor for SiCN ceramic) and polysiloxane (precursor for SiOC) ceramics was performed by European researchers, in which boron was introduced into silazanes typically by aminolysis of chloroborosilanes with methyl amine or by ammonolysis of single-source precursor ($B[C_2H_4Si(CH_3)Cl_2]_3$). Hydroboration of new dopants ($HBCl_2.SMe_2$) further enhanced the boron-to-silicon molar content in the precursor to 1:2 with 56% polymer to ceramic yield. Alternatively, dehydrogenative coupling reactions of hydrosilanes have also been utilized to synthesize polysilazanes or polycarbosilazanes polymer precursors. As a further simplification, hydroboration of vinyl-substituted polysilazanes has also been performed after ammonolysis of chlorosilanes, to eliminate the by-product salt formed in the polymer. In almost all of these methods developed for Si(B)CN synthesis, preparation of the polymeric precursor requires multiple steps involving exclusive synthesis setup and machinery, and special handling of hazardous chemicals (e.g., borane dimethyl sulfide, chlorosilanes) and their by-products (e.g., ammonium chloride). They also contain impurities and precipitates that must be filtered out before use. Even the most recently-reported work on Si(B)CN polymeric precursor involved coammonoloysis of chlorosilanes with boron trichloride and results in a very low boron retention in the final ceramic. Moreover, current boron-doping techniques yield boron-modified silazanes that are in gel or semi-solid form upon incorporation of the boron, which limits their potential applications.

Polymer-derived ceramics have a number of different uses including the formation of protective coatings or ceramic matrices, as well as interfacing with various nanomaterials to form nanocomposites having high temperature stability, oxidation resistance, as well as enhanced electrical, electrochemical, and mechanical properties.

SUMMARY OF THE INVENTION

The present invention is broadly concerned with boron-modified silazanes useful as polymeric precursors for polymer-derived ceramics. The inventive boron-modified silazanes advantageously remain room temperature liquid-phase polymers even after boron-modification. The boron-modified silazanes comprise a backbone having recurring monomeric repeat units comprising boron-nitrogen bonds. Unlike previous polymeric ceramic precursors, there is a preference in the inventive boron-modified precursors for boron-nitrogen and boron-oxygen bonds, over boron-carbon bonds. In one or more embodiments, the monomeric repeat units comprise alternating silicon and nitrogen atoms in the backbone, wherein the boron-nitrogen bonds are selected from the group consisting of: boron pendant from the nitrogen in the backbone; boron-substituted nitrogen groups pendant from the silicon in the backbone; and combinations thereof. In one or more embodiments, the monomeric repeat units comprise —Si—N—$B(R_5)_2$ bonds, where each $R_5$ is individually —$OCH_3$ or —$C_2H_4Si(R)H$, where R is —H or —$CH_3$.

A composition useful in forming a polymer-derived ceramic is also described herein, which comprises (consists essentially or even consists of) a boron-modified silazane according to any one (or combination of) the various embodiments described herein. In one or more embodiments, the composition further comprises (consists essentially or even consists of) a plurality of nanofillers dispersed therein, such as carbon nanotubes, metal nanoparticles, 2-D nanomaterials (such as graphene ribbons, molybdenum disulfide sheets, etc.), carbon fiber, fullerenes, and mixtures thereof. Advantageously, in one or more embodiments where the nanofillers are carbon nanotubes, the boron-modified silazane has a boron content of greater than about 1 boron atom for every 1 silicon atom present in the boron-modified silazane. In one or more embodiments, the nanofillers chemically interface (bond) with the boron-modified silazanes, instead of just being physically mixed therein.

The present disclosure is also concerned with polymer-derived ceramics (generally of the $Si_3N_4$/SiC type) formed from a boron-modified silazane according to any one (or combination of) the various embodiments described herein. In one or more embodiments, the polymer-derived ceramic can further comprise a plurality of nanofillers. Advantageously, a high boron content is retained in the ceramic itself, and in one or more embodiments, the ceramic has a boron to silicon atomic ratio of at least about 1:1. Thus, the ceramic itself also comprises boron-nitrogen bonds Articles of manufacture are also disclosed herein, including structures comprising a substrate having a surface; and a layer of a polymer-derived ceramic adjacent the substrate surface, wherein the polymer-derived ceramic is formed from a boron-modified silazane according to any one (or combination of) the various embodiments described herein. In one or more embodiments, the layer of ceramic further comprises a plurality of nanofillers dispersed therein. In one or more embodiments, the ceramic layer is a powder coating comprising the polymeric precursor and a plurality of nanofillers, wherein the polymeric precursor is bonded with the nanofillers. Advantageously, the ceramic layer is resistant to laser irradiation up to about 15 kWcm$^{-2}$ at a wavelength of about 10.6 µm, for about 10 seconds without burning, delamination, or deformation of the layer. The ceramic layer is also resistant to oxidation in flowing air at a temperature of up to about 1000° C.

The present disclosure is also concerned with new and inventive nanocomposites. The nanocomposites comprise (consists essentially or even consists of) a plurality of carbon nanotubes having respective sidewalls; and a layer adjacent the sidewalls of a polymer-derived ceramic according to any one (or combination of) the various embodiments described herein. Advantageously, the polymer-derived ceramic is bonded (non-covalently) to the sidewalls forming a protective shell thereon. The nanocomposite is also resistant to oxidation in flowing air at a temperature of up to about 1000° C. Exemplary nanocomposites include nanowires, nanorods, nanosheets, and combinations thereof.

The present polymeric precursors and resulting ceramics and nanocomposites have a multitude of uses. Thus, in one or more embodiments, a lithium ion battery anode is provided, which comprises a nanocomposite according to any one (or combination of) the various embodiments described herein. Advantageously, use of the present nanocomposites eliminates the need for separate conducting material (e.g., copper) in the anode structure. Protective coatings and molded nanocomposite shapes and structures are also contemplated herein.

The nanocomposites can be provided in various forms, including ceramic coatings, layers, fiber-reinforced composites, and the like. In one or more embodiments, a powdered composition comprising a nanocomposite according to any one (or combination of) the various embodiments described herein is disclosed. The nanocomposites can be ground into discrete particulates to form a fine powder that is free-flowing and substantially free of solvents. The powder can also be mixed with a solvent system or suitable binder or conducting agent depending upon the final desired use.

The present disclosure is also concerned with new and inventive methods for making boron-modified silazanes. The methods comprise forming a reaction mixture comprising trimethyl borate and a room temperature liquid-phase silazane, and mixing under ambient conditions for at least about 24 hours. A nanofiller can also be present in the reaction mixture if desired. In some embodiments, the reaction mixture can be heated from room temperature up to about 85° C. during mixing to evaporate solvents and/or any reaction by-products formed. Advantageously, boron-modified silazanes prepared according to the inventive methods are room temperature liquid-phase polymers, and do not need to be heated to soften or liquefy the polymer for use.

Methods of forming a polymer-derived ceramic are also described herein. The methods generally comprise providing a boron-modified silazane according to any one (or combination of) the various embodiments described herein, crosslinking the boron-modified silazanes to yield a cured polymeric precursor; and converting the cured precursor to a ceramic. In one or more embodiments, a plurality of nanofillers can be mixed with the boron-modified silazane prior to crosslinking. The methods also include forming a layer of boron-modified silazane adjacent a substrate surface prior to crosslinking. In one or more embodiments, the boron-modified silazane can be molded using injection molding or other molding techniques to form various shapes prior to crosslinking. Likewise, the boron-modified silazane can be used to infuse a fibrous reinforcement prior to crosslinking to create a fiber-reinforced composite. As also mentioned, in some embodiments the cured precursor can be ground into a powder before converting it into ceramic. Likewise, the precursor can first be converted to ceramic before grinding the ceramic into a powder. Powdered forms can be used to create solvent-based or solvent-free coatings depending upon the particular application.

Regardless of the embodiment, the boron-modified silazanes and resulting ceramics have a number of significantly improved properties over existing precursors and polymer-derived ceramics, as explained in more detail below.

DETAILED DESCRIPTION OF PREFERRED EMBODIMENTS

Figure 1:
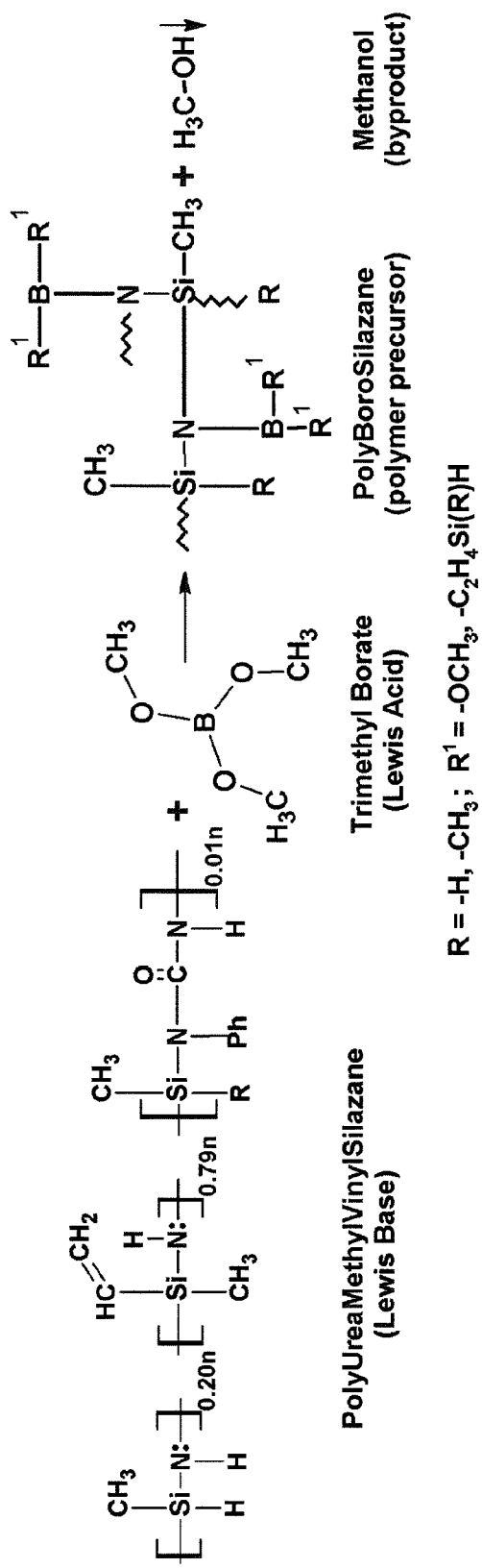
FIG. 1 is a reaction mechanism for molecular level interfacing of boron with poly(ureamethylvinyl)silazane liquid polymer.

In one or more embodiments, the present invention is concerned with new methods for synthesizing boron-modified silazanes ("polyborosilazanes"), their use as polymer-derived ceramic precursors, and polymer-derived ceramics and composites formed therefrom. The methods comprise mixing a room temperature liquid-phase, non-oxide silicon-based ceramic precursor compound with trimethyl borate (B(OCH$_3$)$_3$) for at least about 12 hours (preferably from about 24 to about 36 hours, with continual mixing) under ambient conditions. The term "ambient conditions," as used herein refers to the common, prevailing, and uncontrolled conditions in a room or place, such as room temperature (about 20-35° C.) and normal atmosphere and pressure (about 1 atm), and without artificial constraints. In other words, boron-doping reactions according to the invention do not have to be carried out under any elevated temperatures or pressures, or in an otherwise artificial environment (e.g., under vacuum, under Ar or N$_2$ gas, etc.). In some embodiments, the reaction mixture may be heated during mixing to temperatures of from about 25° C. to about 85° C. to facilitate drying of any solvent (if present, see infra), as well as evaporation of any by-products, although the reaction otherwise proceeds under ambient conditions. In some embodiments, sonication can be used to facilitate intermixing of the ingredients to create a substantially homogenous reaction mixture.

Preferably, the non-oxide silicon-based compound is a silazane compound of the oligomer/polymer-type, referred to herein generally as a "polysilazane." Polysilazanes are room temperature liquid-phase polymers of low viscosity, where the term "polymer" is used herein to encompass both oligomers and polymers. The team "room temperature liquid-phase" as used herein, means that the polymer is a flowable, liquid-phase material, without the aid of solvents or heating to soften the material and lower its viscosity. Thus, such materials are in the liquid-phase (as opposed to the gel, semi-solid, or soft-solid phases) at or about room temperature (e.g., from about 20 to about 35° C.), and in any event at temperatures below 50° C. Thus, in some literature, such polymers are described as 100% "solids" polymers (i.e., not dispersed in a solvent) in the liquid phase, which can be solidified (cured) under appropriate conditions upon heating to sufficient temperatures. Suitable silazanes for use in the various embodiments include any type of polysilazane, including functional derivatives thereof. For example, many commercially-available polysilazanes include functional groups, such as methyls, vinyls, aryls, alkyls, allyls, amines, phenyls, and the like, pendant from the backbone to improve stability of the polymer and/or facilitate crosslinking/curing. Exemplary polysilazanes will generally comprise (consist essentially, or even consist of) monomeric repeat units comprising (consisting essentially of or even consisting of) alternating silicon and nitrogen atoms in the polymer backbone. In one or more embodiments, the monomeric repeat units comprise (consist essentially or even consist of) alternating silicon and nitrogen, generally of the formula:

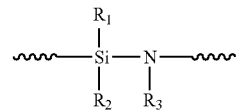

where each of R$_1$ and R$_2$ are individually —H, alkyls (e.g., C$_1$-C$_4$ alkyls), alkenyls (e.g., vinyl groups, etc.), or alkynls (e.g., —C≡CH), and R$_3$ is —H, alkyl, aryl, or allyl. The foregoing segment may correspond to one monomeric repeat unit in the polymer backbone, but may also represent a portion of the backbone smaller than an entire repeat unit where additional atoms are attached to either the nitrogen or the silicon within the repeat unit, as indicated by the squiggly lines. Thus, the squiggly line indicates the point of attachment to the remainder of the backbone or molecule. In some embodiments, additional atoms, such as alternating carbons, can be present in the backbone of the Si—N repeat unit ("organopolysilazanes" or "polycarbosilazanes"), or in adjacent repeat units. Thus, in one or more embodiments, the monomeric repeat units will comprise (consist essentially or even consist of) the general formula:

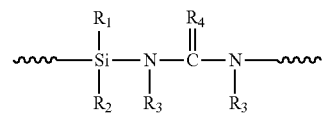

where R$_1$, R$_2$, and R$_3$ are defined above, and R$_4$ is O or S. In one or more embodiments, at least one of R$_3$ is —H. Thus, in some embodiments, suitable polysilazanes will comprise (consist essentially or even consist of) monomeric repeat units of:

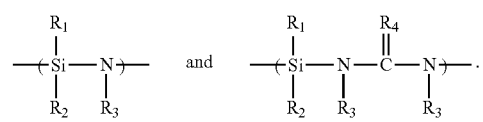

Polysilazanes are commercially-available (e.g., Ceraset™ from KiON, Clariant, etc.), and can also be synthesized using numerous known techniques. Various polysilazane synthesis routes are described, for example, in U.S. Pat. Nos. 5,021,533 and 5,190,709, incorporated by reference herein to the extent not inconsistent with the present disclosure.

Regardless of the embodiment, a reaction mixture of polysilazane and trimethyl borate is formed. The relative amounts of polysilazane to trimethyl borate in the mixture is tunable, and can be varied depending upon the final properties desired in the polymeric precursor composition. In general, the weight ratio of polysilazane to trimethyl borate will range from about 1:10 to about 10:1, preferably from about 1:5 to about 5:1, more preferably from about 1:2 to about 2:1, and even more preferably about 1:1.

In one or more embodiments, the reaction mixture comprises, consists essentially, or even consists of the polysilazane and trimethyl borate. In some embodiments, solvents may be present in the reaction mixture such as toluene, propanol, N-methylpyrrolidone, and the like. In some embodiments, the reaction mixture is substantially free (less than about 0.5% by weight) of any additives or additional ingredients, such as solvents, reaction salts, and the like. Reaction of the polysilazane with the trimethyl borate results in an incorporation (substitution) of boron atoms into the polysilazane structure at the molecular level (and not just as fillers) to yield new and inventive a boron-modified silazane (aka "polyborosilazane") "pre-ceramic" liquid polymer. Advantageously, boron-modified silazanes formed according to the present invention remain in liquid phase under ambient conditions. That is, they do not gel or harden into self-sustaining, semi-solid, or soft-solid phases at room temperature, where the term "self-sustaining" means that the gel or semi-solid is not susceptible to deformation merely due to its own internal forces, and substantially maintains its shape without an external support structure. Thus, unlike current boron-modified silazanes, which are solids at room temperature, the boron-modified silazanes according to embodiments of the invention remain flowable polymer liquids under ambient conditions and are particularly suited for injection molding, liquid casting, fiber drawing, melt spinning, and/or infiltration/impregnation techniques. For example, the polymeric precursor can be poured, spin coated, spray coated, injected, puddle, pressed, and the like (without first being dispersed in a solvent system), which provides significant advantages over the state of the art. In one or more embodiments, the boron-modified silazanes according to the invention will have a viscosity of less than about 210 cP at 25° C.

In one or more embodiments, the inventive boron-modified silazanes will comprise (consist essentially or even consist of) recurring monomeric units comprising boron-nitrogen bonds. In some embodiments, the monomeric units can further comprise boron-oxygen bonds. Unlike previous boron-modified silazanes, boron doping results predominantly in boron-nitrogen and boron-oxygen bond formation, and little if any boron-carbon bond formation. Thus, bond preference in the resulting boron-modified silazanes will be B—N>B—O>B—C. In some embodiments, the boron-modified silazanes will comprise boron substitutions off of nitrogen atoms in the polymer backbone, but can alternatively comprise boron-substituted nitrogen groups pendant from the silicon atoms in the polymer backbone. In any event, after incorporation of boron into the polymer at the molecular level, the monomeric units will comprise —Si—N—B($R_5$)$_2$ bonds, where each of $R_5$ is individually —OCH$_3$ or —C$_2$H$_4$Si(R)H, where R is —H or —CH$_3$. In one or more embodiments, the recurring monomeric units in the resulting boron-modified silazanes will comprise alternating silicon and boron-substituted nitrogen atoms of the formula:

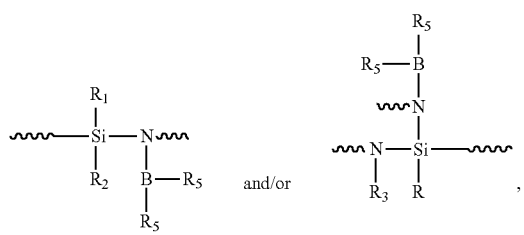

where R, $R_1$, $R_2$, $R_3$ and $R_5$ are defined above. Another advantage of the present synthesis methods is that the only by-product of the reaction is methanol. Thus, the reactions are substantially free of hazardous by-products or chemicals that require special handling or protocols. As also noted above, if the reaction mixture is slightly heated, the by-products of the reaction (i.e., methanol) can be simultaneously evaporated as the reaction proceeds. This removes the need for a separate step to isolate the boron-doped polymer from the by-products.

The inventive boron-modified silazanes will have a shelf stability for up to about 1 month when stored under ambient conditions in a sealed container sealed with ambient air. When stored under ambient conditions in a sealed container sealed with argon gas, the boron-modified silazanes will have a shelf stability of greater than about 1 month. The term "shelf stability," as used herein, refers to the shelf life (i.e., length of time) before the liquid polymer either begins to cure (i.e., crosslink, gel, and/or harden), and/or precipitates start falling out of the liquid polymer and settling to the bottom of the container.

The inventive boron-modified silazanes can be converted into SiBNC (used interchangeably herein with Si(B)CN) ceramics having substantially improved properties, such as oxidation resistance, extremely high temperature resistance, chemical and structural stability, and the like. In general, the boron-modified silazane ceramic precursors are first solidified through curing or crosslinking into the solid phase (plastic), followed by pyrolyzing into a ceramic. Ceramic formation requires heating the pre-ceramic up to at least about 700° C., and preferably at least about 800° C., for at least about 4 hours. In particular, in one or more embodiments, the boron-modified silazane is heated from room temperature to a temperature of from about 350° C. to about 450° C. (preferably about 400° C.) at a rate of from about 5 to about 10° C./min. (preferably about 5° C./min.) and maintained at the elevated temperature for at least 1 hour (preferably from about 1 hour to about 90 minutes). Next, the cured (crosslinked) product is heated up to a temperature of at least about 700° C. (preferably at least about 800° C.), at a rate of from about 2 to about 10° C./min. (preferably about 2° C./min.), where the crosslinked ceramic precursor is maintained for at least about 4 hours yield an amorphous, polymer-derived SiBNC ceramic. Pyrolysis can take place under artificial atmosphere (e.g., $N_2$ or $NH_3$) if desired. It will be appreciated that the pyrolysis temperature can be varied depending upon the final desired properties of the ceramic. For most ceramic applications, the ceramic precursor can be heated to temperatures of between about 800° C. and 1100° C. for pyrolysis. For use as anodes in lithium ion batteries, temperatures between about 800° C. and 1000° C. are preferred. If a lower oxygen content in the final ceramic is desired, the precursor can be heated up to about 1500° C.

As noted above, the fact that the inventive boron-doped polymeric precursors are in the liquid phase (without the aid of any solvents or heat) expands the potential uses for these improved materials. For example, the boron-modified silazane can be applied to a substrate surface, such as by spray coating or spin coating, followed by curing and eventual pyrolysis to form a ceramic coating or film on the substrate surface. Suitable substrates include metallic and non-metallic surfaces, such as those found in engine parts, tubing, wires, pump shafts, cylinders, spindles and/or sleeves, induction coils, natural and/or synthetic woven and/or non-woven fibers, mats and/or cloth, and the like. Such techniques would be useful for the formation of various articles of manufacture, such as harsh environmental sensors, heat shield tiles, and micro components. For example, in one or more embodiments, a mat, such as a carbon nanotube mat or cellulose mat substrate can be formed by filtering a dispersion of the material through a filter containing filter paper of the appropriate size, which results in deposition of the material onto the filter paper in a nonwoven mat. The mat can be peeled away from the filter and separated from the filter paper to yield a freestanding mat, network, or sheet. A coating of the boron-modified silazane can then be formed on the mat using spray coating, drop coating, or other suitable technique. The boron-modified silazane can then be converted to a ceramic as described herein, to yield a thin ceramic film adjacent the carbon nanotube or cellulose mat. This ceramic "paper" composite is thin and flexible with a uniform paper surface, which has a much higher temperature stability than the uncoated mat. Such ceramic coated paper composites be used as an independent anode material in rechargeable lithium-ion batteries. The inventive composite simplifies the anode design by eliminating the binder, conductive additives, and current collector metal (e.g., copper). Carbon nanotube paper has also been used to fabricate flexible actuators, sensors, displays, and energy storage devices, which can be further enhanced by addition of the inventive ceramic film.

The boron-modified silazanes can also be used to prepare flame-resistant protective gear and clothing. Thus, a coating of the boron-modified silazanes can be formed on a cloth substrate, by dipping, spray-coating, etc., followed by conversion of the boron-modified silazane to a ceramic.

The liquid boron-doped polymeric precursors can also be used to form bulk matrices in which a dispersed phase can be distributed. Such techniques would be useful for the formation of various high temperature stable articles of manufacture, such as fibers, multifunctional devices, ceramic-microelectromechanical systems (ceramic-MEMS), and the like.

A particular advantage of the present boron-doped polymeric precursors is that they can interface with nanomaterials to create nanocomposites. The term "nanocomposite" refers to having a bulk matrix (ceramic) and nano-dimensional dispersed phase(s), which can be any type of nanofiller, such as carbon nanotubes, nanoparticles, carbon fibers, 2-D nanosheets (such as graphene, molybdenum disulfide etc.), fullerenes, and the like. Unlike traditional composite materials, the present nanocomposites preferably involve surface wetting and functionalization of the nanomaterial by the liquid polymeric precursors resulting in a chemical interfacing between the matrix and the nanofiller. The nanofillers can be mixed with the liquid polymeric precursor after formation (i.e., boron-doping), and before crosslinking and pyrolysis. However, the nanofillers can also be added as part of the reaction mixture discussed above that is used to add boron to the polymer system. Thus, in one or more embodiments, the reaction mixture for forming the boron-doped polymeric precursors can comprise (consist essentially or even consist of) the silazane compound, trimethyl borate, and at least one nanofiller. The nanofiller can first be dispersed in a solvent system, such as toluene, propanol, N-methylpyrrolidone, and the like, before being mixed with the silazane compound and trimethyl borate. Alternatively, the procedure can be substantially free of any solvents.

It has been found that, although such nanofillers do not react with any of the other constituents, the inclusion of carbon-based nanofillers in the reaction mixture surprisingly results in an increased boron content in the resulting boron-doped polymeric precursor. For example, reaction of the trimethyl borate with the silazane compound, without any carbon-based nanofillers, yields about 1 boron atom for every 3 silicon atoms in the resulting boron-doped polymeric precursor. However, when the trimethyl borate is reacted with the silazane compound in the presence of the carbon-based nanofillers, the resulting boron-doped polymeric precursors have a boron content (atomic ratio) of greater than 1:3 (boron atoms:silicon atoms), preferably greater than about 2:3, more preferably from about 1:1 to about 20:3, and even more preferably about 18 boron atoms for every 3 silicon atoms (about 6:1), which is a significant increase. On a per weight basis, the boron-doped polymeric precursors formed in the presence of carbon nanofillers generally comprise about 40% by weight carbon, about 27% by weight nitrogen, about 18% by weight boron, and about 8% by weight silicon, in addition to other atomic constituents, such as hydrogen, etc.

Regardless of the embodiment, the inventive boron-doped polymeric precursors are particularly suited for forming nanocomposites with carbon nanotubes. Carbon nanotubes (CNTs) are allotropes of carbon (fullerene molecules) characterized by cylindrically-shaped graphene side walls, and can be categorized as single-walled carbon nanotubes (SWNTs), double-walled carbon nanotubes (DWNTs), and/or multi-walled carbon nanotubes (MWNTs). Nanotubes are extremely strong and light, possess high microwave absorbance characteristics, and can act both as conductors or semiconductors depending on the diameter and chirality of the hexagonal carbon sidewall lattice along the length of the nanotube. SWNTs consist of a single rolled layer of graphene, whereas MWNTs consist of multiple rolled layers (concentric tubes) of graphene. In one or more embodiments, a ceramic composite precursor is provided that comprises (consists essentially or even consists of) the liquid boron-modified silazane and a plurality of carbon nanotubes distributed therein. The amount of CNT used in the precursor can be varied, but will typically range from about 5 to about 20% by weight, and preferably from about 5 to about 10% by weight, based upon the total weight of the precursor composition taken as 100% by weight. Thus, the inventive nanocompsites in one or more embodiments, will comprise a boron-modified silazane-derived ceramic shell adjacent the carbon nanotube wall characterized as a carbon nanotube core/polymer-derived ceramic shell nanowire. As noted previously, the boron-modified silazane-derived ceramic is not merely a ceramic matrix (continuous phase) in which the carbon nanotubes are physically distributed (dispersed phase). Rather, the boron-modified silazane-derived ceramic shell has chemically interfaced with and bonded (non-covalently) to the carbon nanotube sidewalls, resulting in a significantly stronger composite structure. Moreover, the composites have significantly improved oxidation resistance of up to about 1000° C. in air.

As discussed in more detail in the working examples, nanocomposites according to the invention can be converted to ceramic using conventional heating (e.g., furnace); however, microwave irradiation can also be used to generate heat in the composite sufficient for thermal decomposition of the polymeric precursor into the ceramic phase. Remarkably, the conversion to ceramic using microwave irradiation takes less than about 30 minutes, preferably less than about 20 minutes, and more preferably from about 5 to about 20 minutes, which is considerably faster than previously-reported pyrolysis techniques.

Regardless of the embodiment, the composites or nanocomposites can be used as formed (i.e., by molding the liquid precursor/CNT mixture into the desired shape before crosslinking and/or pyrolysis), or can be ground into a powder (either after crosslinking (followed by pyroysis of the powder) or pyrolysis itself) and used to form a coating. Coatings of powdered boron-modified polymer-derived ceramics can be formed using conventional powder-coating techniques. The powder can also be dispersed in a suitable solvent system, or combined with suitable binders to facilitate coating formation. The powdered ceramic can be applied to virtually any type of substrate including metals, non-metals, planar substrates, as well as those having rough or intricate geometries (e.g., curved surfaces). Moreover, it will be appreciated that the powder itself can be used as a filler for a further composite material. Exemplary uses of the powdered boron-modified polymer-derived ceramic include coatings (e.g., turbine blades, engine parts), matrix composites, surface tiles, industrial use components, and the like.

Polymer-derived ceramics and associated nanocomposites not only have high temperature oxidation resistance, but are also resistant to laser irradiation. Thus, ceramics and associated nanocomposites according to any one (or combination) of embodiments described herein are resistant to damage when irradiated with a laser up to about 15 kWcm$^{-2}$ at a wavelength of about 10.6 μm for about 10 seconds. The term "resistant to damage" means that the ceramic will not burn, delaminate, or deform. The ceramics and associated nanocomposites also have uniform absorbance, and more specifically high optical absorbance characteristics. Thus, at wavelengths of about 10.6 μm, the ceramics and/or nanocomposites will absorb at least about 90%, preferably at least about 95%, and more preferably at least about 98%. In addition, not only do the polymeric precursors contain an improved/increased boron content, but a high boron content is retained upon conversion to the ceramic. Thus, in one or more embodiments, ceramics and/or nanocomposites according to the invention have a boron to silicon ratio of at least about 1:1 and preferably at least about 1.2:1.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Synthesis, Characterization and High Temperature Stability of SiBNC Coated Carbon Nanotubes Using a Boron-Modified Poly(Ureamethylvinyl)Silazane Chemistry In this Example, we report a single-step process for molecular level interfacing of boron with poly(ureamethylvinyl)silazane liquid polymeric precursor and utilize it for synthesis of SiBNC-MWCNT composite. In addition, the ceramic shells' structural evolution is investigated and their high temperature stability is demonstrated by use of thermogravimetric analysis (TGA) and TEM. The XPS boron to silicon ratio in the final ceramic was 1:1 or higher for all specimen processed in (800 to 1500° C.) temperature range.

1. Experimental Procedure
   a. Sample preparation 1-gram MWCNTs (Bayer AG) were dispersed in 125 mL Toluene (grade: ACS 99.5%) and sonicated for approximately 30 minutes (Branson 2510). The polymeric precursor, poly(ureamethylvinyl)silazane (Ceraset™; KiON, Charlotte, N.C.), and boron precursor, trimethyl borate (Sigma Aldrich; St. Louis, Mo.), were then added at a very slow rate of approximately 1 mL/min to assist thorough and uniform polymer adhesion on the nanotube surface while the mixture was being stirred at 300 rpm for about 24 hours. Attempt was made to achieve a homogenous dispersion of ~10 wt % of MWCNTs in the solution. The mixture was slowly dried in an inert atmosphere at 80° C. Slow drying also facilitates evaporation of the byproducts (methanol) formed during the reaction. The dried powder was then cross-linked at 400° C. for 90 minutes and pyrolyzed at 800° C. for 4 hours, under nitrogen flowing at approximately 25 mL/min. The heating rate for crosslinking and pyrolysis was 10° C./min. For the samples prepared at higher pyrolysis temperatures (1000° C., 1100° C., 1200° C., 1300° C., 1400° C. and 1500° C.), same material composition, heating/cooling rate and dwell times were used.

2. Characterization
   a. Electron Microscopy

SEM was performed using a Carl Zeiss EVO Low-Vacuum SEM and FEI Nova NanoSEM 430. TEM was performed using a Philips CM 100 (100 KeV) and FEI Tecnai F20 XT (200 KeV) for high-resolution imaging.

b. NMR: $^{11}$B and $^{29}$Si NMR Spectroscopy
   Liquid State:

Experiments were carried out on a Varian INOVA 400 (9.7 T) with 4 Nuclei Auto switchable probe operating at the resonance frequency of 128.33 MHz for $^{11}$B and 79.46 MHz for $^{29}$Si. The spectra $^{11}$B and $^{29}$Si were collected with sample rotating at 20 Hz with single pulse excitation. The high power 90° decoupling RF pulse of 26 μm @36 dB for $^{29}$Si and 41 μm@36 dB for $^{11}$B was applied and the recycle delay of 4 seconds for $^{11}$B and 3 seconds for $^{29}$Si was used. $C_6D_6$ was used as a solvent and external standard diethyletherate of trifluoroborane $(C_2H_5)_2O.BF_3$ was used as a reference (δ=0 ppm) for $^{11}$B and Tetramethylsilane $(CH_3)_4Si$ (δ=0 ppm) for $^{29}$Si.

Solid State:

Experiments were carried out on a Bruker Avance II 300 spectrometer operating at a static magnetic field of 7.05 T. A 4 mm MAS static H—X double-resonance probe at room temperature was used for collecting $^{11}$B and $^{29}$Si spectra. The solid-state experiments were conducted at the resonance frequencies of 96.26 MHz for $^{11}$B and 59.60 MHz for $^{29}$Si. The $^{29}$Si and $^{11}$B chemical shifts were expressed relative to 100% external reference compound [Sodium 3-Trimethylsilyl Propionate, TMSP 2, 2, 3, 3-d4] signaled at δ=0 ppm.

c. XPS

The surface chemistry of the nanowires was studied by X-ray photoelectron spectroscopy (PHI Quantera SXM) using monochromatic Al Kα X-radiation (beam size <9 micrometers). The overall scan was followed by a 15-minute high-resolution element scan for each sample.

d. FTIR

The FTIR spectra were collected on Thermo-Nicolet Nexus 870FT-IR spectrometer. FTIR samples were prepared by mixing approximately 1 wt % of the finely powdered sample with FTIR grade KBr powder.

e. XRD

The phase evolution in the SiBNC-MWCNTs were characterized by Bruker powder X-ray diffractometer operating at room temperature, with Cu Kα radiation and nickel filter. The pyrolyzed samples were finely crushed with mortar and pestle and laid on the palette for analysis.

f. TGA

Thermogravimetric analysis was performed using Shimadzu 50 TGA (limited to 1000° C.). Sample weighing, approximately 5 mg, was heated in a platinum pan at a rate of 10° C./min in air flowing at 20 mL/min.

g. Raman Spectroscopy

Thermo Scientific DXR Raman microscope with an air-cooled green Nd:YAG laser (λ=532 nm) of 5 mW power was used as the excitation source for all the specimens. Spectra were collected on the instrument operating with a 3.1-μm confocal hole size, 50-μm wide entrance slit, 900 grating lines/mm, and 10× MPlan objective Olympus lens. Data processing was performed using Thermo Scientific's Omnic software for microRaman. The samples were mounted on a manually controlled x-y stage.

3. Results and Discussion

Figure 2:
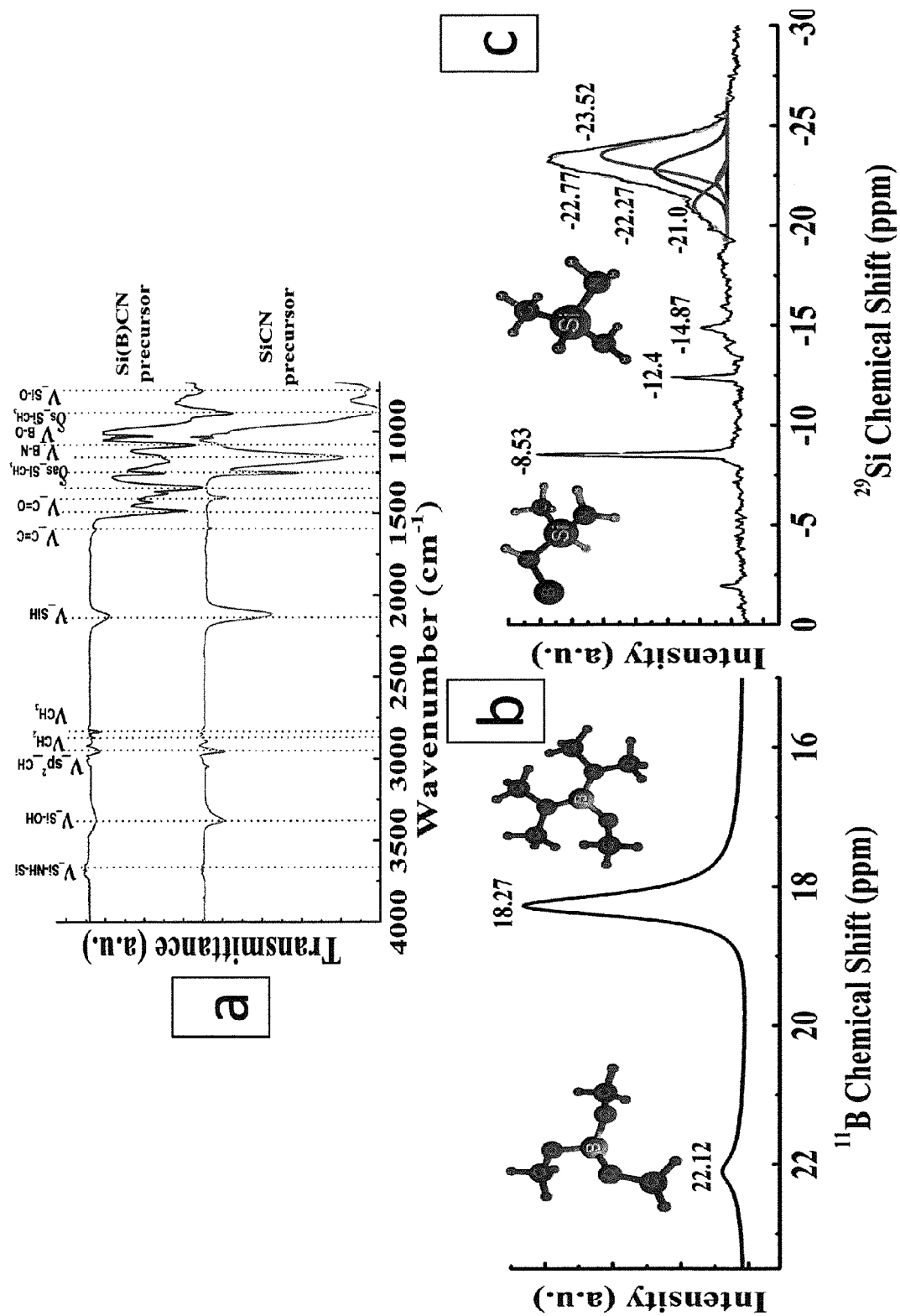
FIG. 2 shows (a) FTIR spectra of poly(ureamethylvinyl)silazane and boron-modified poly(ureamethylvinyl)silazane. (b and c) Experimental $^{11}$B and $^{29}$Si liquid NMR spectra of liquid boron-modified polymer precursor collected at room temperature, respectively. The sample consisted of liquid precursor in $C_6D_6$ solvent.

The addition of tri-methyl borate to the ceramic precursor resulted in formation of boron-modified poly(ureamethylvinyl)silazane by substitution reaction as shown in FIG. 1. In this reaction, a dative covalent bond was formed between the electron pair donor nitrogen and electron deficient boron. The methoxy ion from tri-methyl borate combined with weakly bonded hydrogen in Si—N polymer backbone, releasing methanol as a by-product. The characterization of polyborosilazane was performed using FT-IR (FIG. 2a), and liquid $^{11}$B and $^{29}$Si NMR (FIGS. 2b and c). When compared with the SiCN precursor (polyureasilazane) before boron modification, the emergence of peaks at 1340, 1153 and 1080 cm$^{-1}$ in FTIR spectra of polyborosilazane shows the formation of new B—N and B—O bonds.

$^{11}$B NMR spectrum showed a strong signal at 18.27 ppm and a weak signal at 22.12 ppm. As shown in FIG. 2(b), the 18.27 ppm is due to the electronegative methoxy functional group present in the reactant compound trimethyl borate with sp$^2$-bonded boron. Whereas higher electronegativity of the dimethyl amine functional group in tertiary boron compounds resulted in electron dishielding at the boron nucleus and resulted in a peak downfield at 22.12 ppm. It signifies B—O bond cleavage, which was replaced by B—N bonds, formed as a result of trimethyl borate reacting with the polyureasilazane. $^{29}$Si exhibited a strong and broad peak centered at −23 ppm, which were resolved in four peaks at −21, −22.27, −22.77, and −23.52 ppm due to the C—Si—H type magnetic environment present in the reacting polyureasilazane, as shown in FIG. 2(c). A strong and sharp peak at −8.53 ppm and weak peak at −12.4 and −14.87 ppm signifies C—Si—N type bonds that arise from the environment present around the silicon in the polyureasilazane. These sharp peaks were not observed in $^{29}$Si NMR of liquid polyureasilazane (prior to the addition of trimethyl borate), implying an obvious change in Si magnetic surrounding caused by long range coupling, possibly caused by boron based functional group forming either B—C or B—N type chemical bonds.

Figure 3:
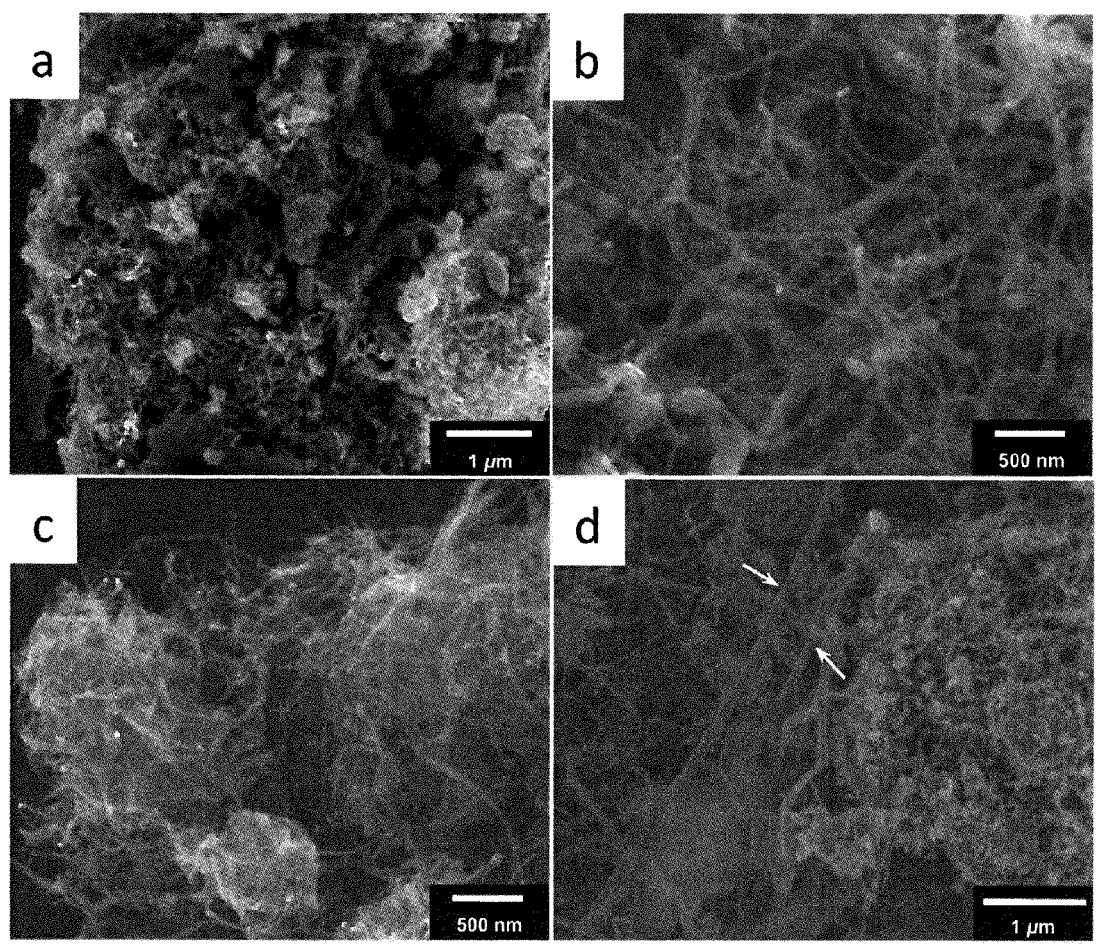
FIG. 3 shows (a to d) SEM images of SiBNC-coated MWCNTs pyrolyzed at 800, 1100, 1300, 1500° C. respectively. Arrows in (d) point at the ultra-long rod like structures.
Figure 4:
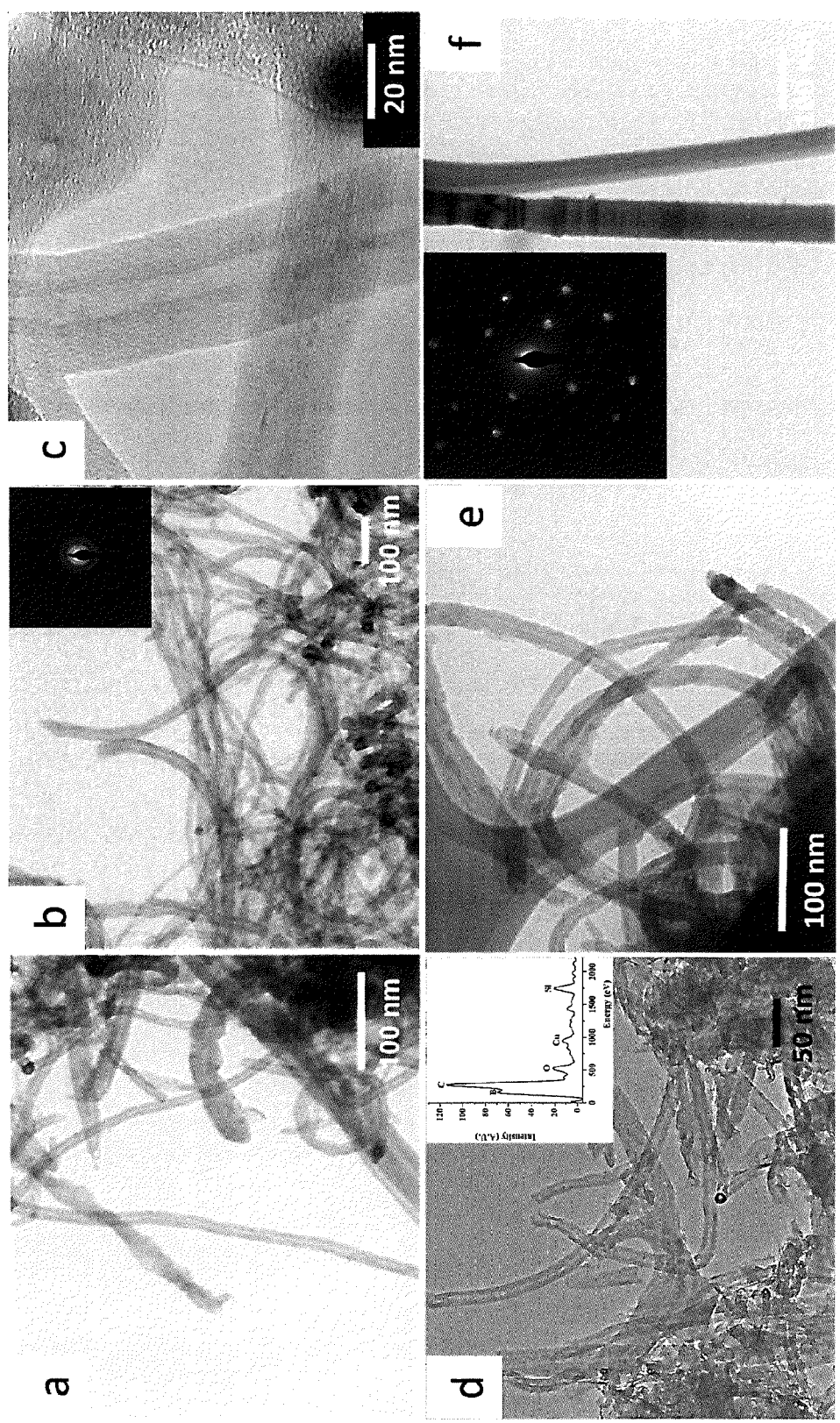
FIG. 4 shows TEM images of nanowires pyrolyzed at (a) 800° C., (b) 1000° C., (c) 1000° C. (high resolution), (d) 1200° C. (Inset: Energy Dispersive Spectroscopy plot), (e) 1500° C. and (f) crystalline nanowires observed at 1500° C.
Figure 5:
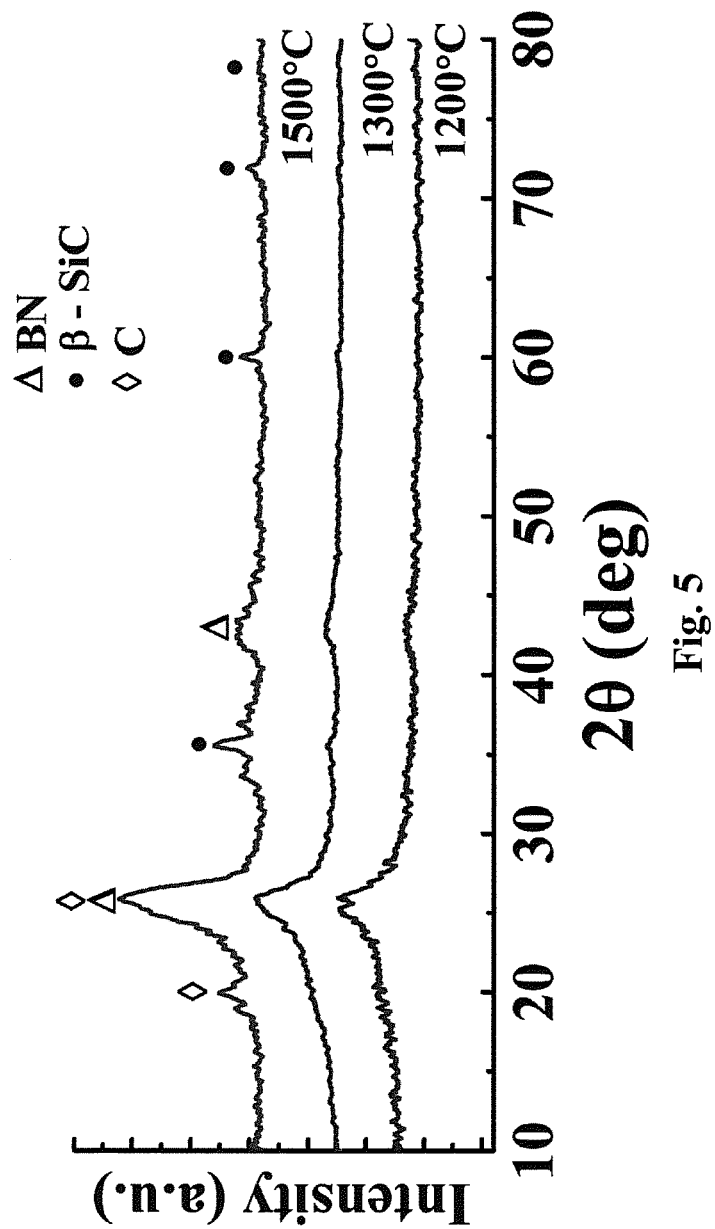
FIG. 5 shows X-ray Diffraction plots for selected nanowire (powders) specimen. SiBNC shell is amorphous up to 1300° C., crystallization is observed for specimen processed at 1500° C.

SEM and TEM analysis of specimens processed at various pyrolysis temperatures confirmed formation of composite nanowires consisting of SiBNC shell on MWCNT core. A majority of the nanowires remained isolated from each other while some ceramic "clusters" with embedded nanotubes were also observed. The ceramic coating on the nanotubes was observed to be anywhere between 5 to 15 nm as revealed through HR-TEM. FIGS. 3 and 4 are the SEM and TEM micrographs of nanowires pyrolyzed in the 800 to 1500° C. range respectively. Selected area electron diffraction (SAED) of individual nanowires and XRD analysis of nanowire powder confirmed the typical pseudo-amorphous nature of Si—B—C—N ceramic. However, for samples processed at 1500° C., a few ultra long (~50 μm to 100 μm) crystalline rods were also observed, these were estimated to be about 1 to 5% of the total content. The formation of crystalline nanorods at 1500° C. is similar to that observed in previous studies where the amorphous SiCN and NH$_3$ (released during pyrolysis) reacted on the CNT surfaces to form SiCNO nanowires. FIG. 5 shows the XRD patterns of the specimen processed at 1200° C., 1300° C. and 1500° C. The analysis shows broad and featureless diffraction spectra for samples processed at lower temperatures suggesting amorphous nature of the ceramic, further implying that the structural transformation was retarded up to 1500° C. Small peaks observed in the ceramic processed at 1500° C. suggest transition into partial crystallization. These small peaks could become more distinct and intense at even higher processing temperatures. Peaks at 2θ=26.05° and 41.65° were assigned to BN, while 2θ=35.55°, 41.65°, 60°, 71.75° and 77.9° to β-SiC and at 2θ=19.85° and 26.05° are from the graphitic carbon in CNT.

The XPS analysis involved curve fitting for the core and valence band peaks using non-linear least squares Gaussian-Lorentzian (70:30) mix function. The Si, B, C, N and O peaks were consistently observed in all the samples. Since XPS signal originates from the top few angstroms of the sample surface only, it was assumed that the carbon photoelectrons detected were emitted mostly from the ceramic and not MWCNT core.

Figure 6:
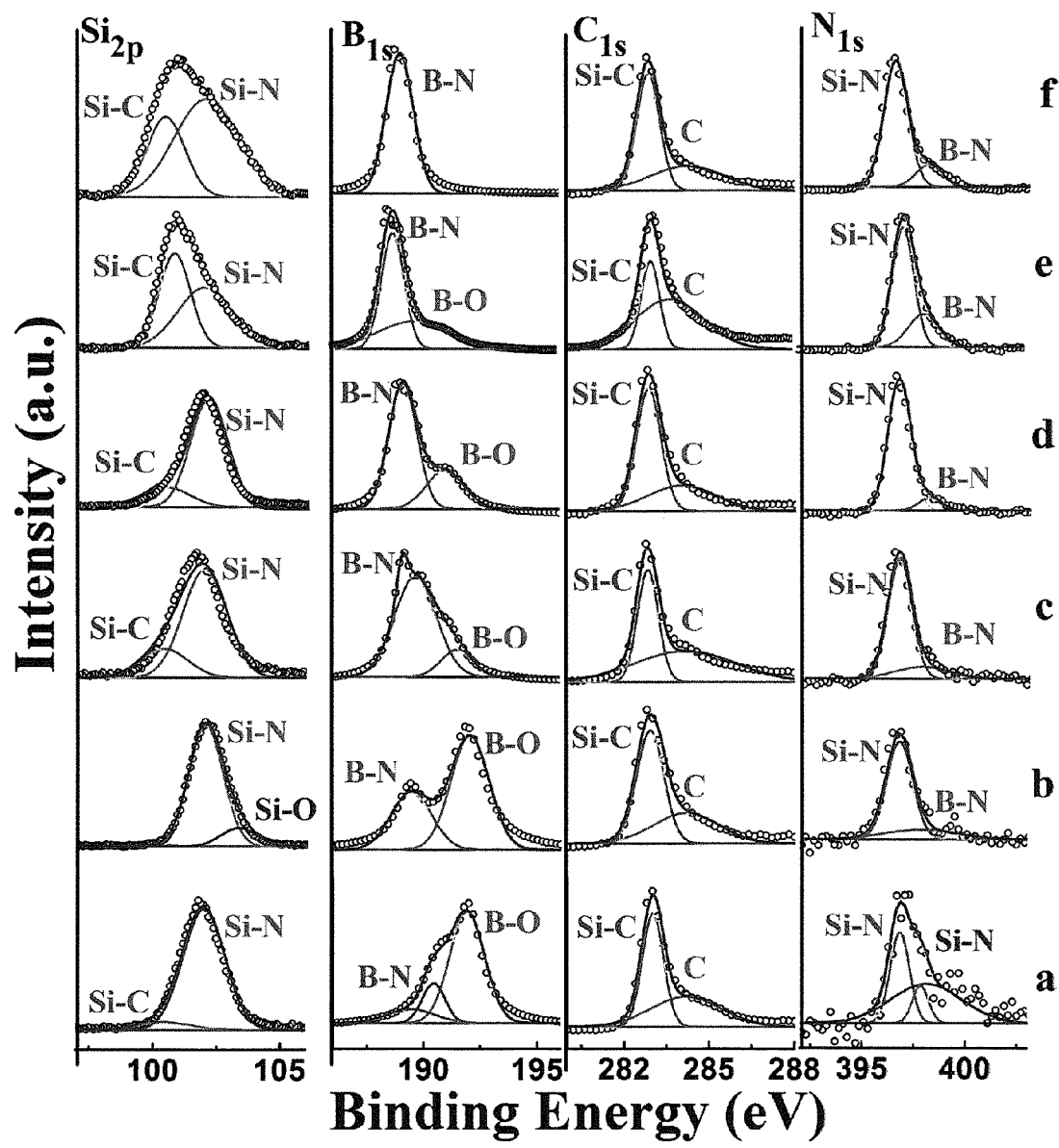
FIG. 6 shows (a to f) Core level elemental XPS spectra of SiBNC-MWCNT synthesized 800° C., 1100° C., 1200° C., 1300° C., 1400° C., and 1500° C., respectively.

FIG. 6 compares XPS data from nanowire specimens prepared at varying pyrolysis temperatures. The silicon band (for Si 2p photoelectrons) indicated peaks at 100.4 eV and 102 eV corresponding to SiC and Si$_3$N$_4$ phases respectively. They emerge out into two distinct peaks with increasing pyrolysis temperatures. Whereas a higher energy peak of smaller magnitude interpreted at 103.3 eV indicates Si—O bonds (mostly SiO$_2$). The higher energy peaks at 188.7 eV and 190 eV indicate B—N bonds (as in BN$_x$(O) while the lower intensity peaks at a greater binding energy shift of 2 eV at 192 eV are due to B—O type bonds (in B$_2$O$_3$). Progressively increasing intensity of the B—N peak and simultaneously decreasing B—O peak implies the transition from one bond type to another observed with samples processed at higher temperatures i.e., above 1200° C. The binding energy of C1s photoelectrons at 282.9 eV confirms the Si—C bond assignment. Whereas the aliphatic carbon is responsible for peaks at 284.18 eV due to $sp^2$ bonded carbon atoms and peak at 285.18 eV is due to $sp^3$ bonded carbon atoms. Few instances that showed the shake-up satellite peaks typically observed beyond 290 eV were ignored. The N1s band on deconvolution showed peak at 396.8 eV attributable to Si—N bonds, which confirm the assignment of silicon 2p photoelectrons. The peaks at 397.8 eV and 398.1 eV indicate Si—N (mostly $Si_3N_4$) and B—N bonds respectively. Based on this XPS analysis, the average Si to B ratio was observed to be 1:1.26. A more accurate analysis would require sophisticated combustion analysis techniques but nonetheless it is clear that a good percentage of boron could be retained in the resulting ceramic shell. It would also be possible to tune the percentage of boron to higher or lower levels by controlling the amounts of tri-methyl borate in the starting polymer. The elemental composition and empirical formula based on XPS data is shown in Table I.

TABLE I

XPS Chemical composition of SiBNC-MWCNT nanowires for varying pyrolysis temperatures ($T_{pyrolysis}$). Hydrogen content is assumed to be less than 1 wt %. Empirical formula is based on atomic percent.

| $T_{pyrolysis}$ (° C.) | Si (wt %) | B (wt %) | C (wt %) | N (wt %) | O (wt %) | Empirical formula |
|---|---|---|---|---|---|---|
| 800 | 13.8 | 18.26 | 37.09 | 17.83 | 13.02 | $SiB_{3.43}C_{6.27}N_{2.58}O_{1.65}$ |
| 1000 | 9.93 | 6.49 | 52.89 | 2.95 | 27.74 | $SiB_{1.69}C_{12.43}N_{0.59}O_{4.89}$ |
| 1100 | 5 | 3.45 | 69.39 | 2.56 | 19.6 | $SiB_{1.79}C_{32.38}N_{1.02}O_{6.86}$ |
| 1300 | 5.81 | 7.86 | 61.67 | 7.19 | 17.46 | $SiB_{3.51}C_{24.77}N_{2.48}O_{5.26}$ |
| 1400 | 7.17 | 10.98 | 56.31 | 9.12 | 16.29 | $SiB_{3.97}C_{18.33}N_{2.54}O_{3.98}$ |
| 1500 | 7.93 | 17.69 | 39.86 | 27.02 | 7.5 | $SiB_{5.78}C_{11.73}N_{6.81}O_{1.66}$ |

Figure 7:
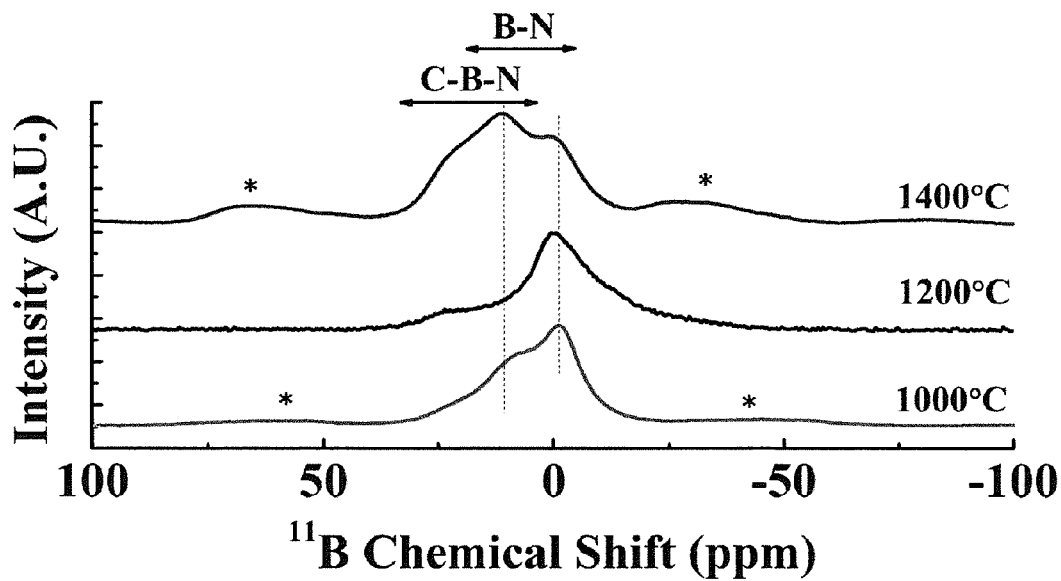
FIG. 7 (a) Comparative experimental $^{11}$B SS-NMR spectra of the samples pyrolysed at 1000° C., 1200° C. and 1400° C. shows the B—N type bond formation (preferred at higher temperatures) than B—O at lower processing temperatures. These spectra were collected by finely crushing the sample using mortar and pestle.

The solid-state $^{11}B$ spectra were collected for samples pyrolyzed at 1000° C., 1200° C. and 1400° C. only; based on XPS and XRD data, these specimens are likely to capture major boron chemical shifts. These three representative samples were compared as shown in FIG. 7, where the upfield peaks most closely resembles the $BN_3$ and $BC_2N$, and the downfield peaks resemble more electronegative $BC_3$. This analysis suggests that the ceramic boron possesses different magnetic environments among which the B—N type bonds dominate at higher pyrolysis temperatures (also confirmed by the XPS results).

Figure 8:
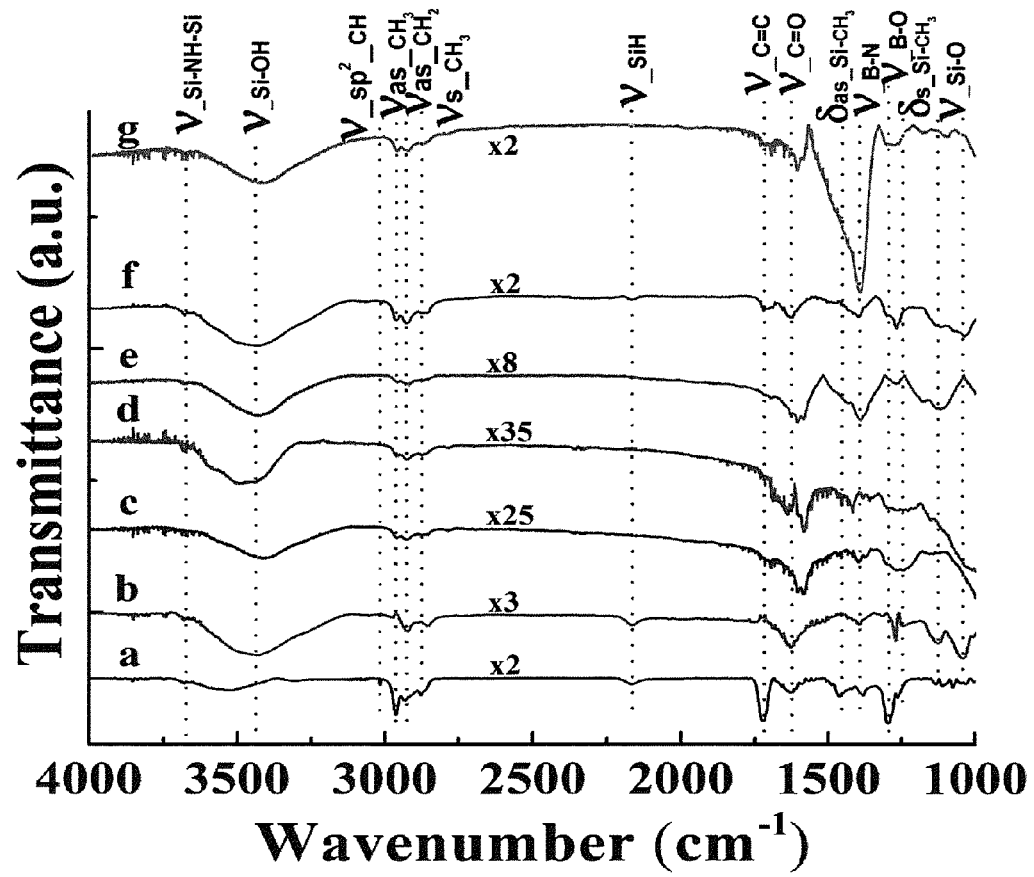
FIG. 8 shows (a to g) Diffuse Reflectance Infrared Fourier Transform (DRIFT) spectra of samples pyrolyzed at 800° C., 1000° C., 1100° C., 1200° C., 1300° C., 1400° C., and 1500° C., respectively. (ν: stretching vibration mode and δ: bending vibration mode)'

FIG. 8 shows the FTIR spectra for the background subtracted samples pyrolyzed at temperatures ranging from 800 to 1500° C. The collected spectra are scaled differently for the purpose of observing the respective peaks and hence their intensities should not be compared with each other. A small peak at 3680 $cm^{-1}$ and the broad peak between 3480 $cm^{-1}$-3400 $cm^{-1}$ are due to free and bonded —OH stretching in Si—OH, most likely due to moisture absorption.

Characteristic band at 1715 $cm^{-1}$ was assigned due to C═C stretching vibrations in the CNT. Small peak at 1629 $cm^{-1}$ is characteristic of C═O stretching in N-disubstituted amides (in the urea group in ceramic precursor) which typically appears at 1680 $cm^{-1}$-1630 $cm^{-1}$ for solids. Ketone groups which usually stretches at 1715 $cm^{-1}$ wavenumber have a modified frequency due to the mesomeric effects causing the $\pi$ electron delocalization and resulting in a weaker C═O bond. The —$CH_3$ asymmetric (weak at 1475 $cm^{-1}$-1450 $cm^{-1}$) and symmetric deformations (typically at 1280 $cm^{-1}$-1255 $cm^{-1}$) were responsible for the weak and medium intensity bands at 1476 and 1265 $cm^{-1}$ corresponding to Si—$CH_3$ group. The medium-to-strong peaks at 1396 $cm^{-1}$ could be assigned to hexagonal B—N stretching modes that are strongly absorbed at 1465 $cm^{-1}$-1330 $cm^{-1}$. The strong absorption at 1301 $cm^{-1}$ could be due to B—O stretching (typically 1350 $cm^{-1}$-1310 $cm^{-1}$) in $B(OCH_3)_3$. Peaks at 1124 $cm^{-1}$ and 1044 $cm^{-1}$ could be assigned to Si—O—Si stretching vibrations, which were characteristic bands of siloxane chains, and typically appeared as strong bands at 1130 $cm^{-1}$-1000 $cm^{-1}$. Small peaks at 904 $cm^{-1}$ and 808 $cm^{-1}$ could be assigned to C—H out-of-plane bending vibrations (typically at 990-910 $cm^{-1}$) and to Si—H bending vibration mode (usually 960 $cm^{-1}$-800 $cm^{-1}$) respectively.

Figure 9:
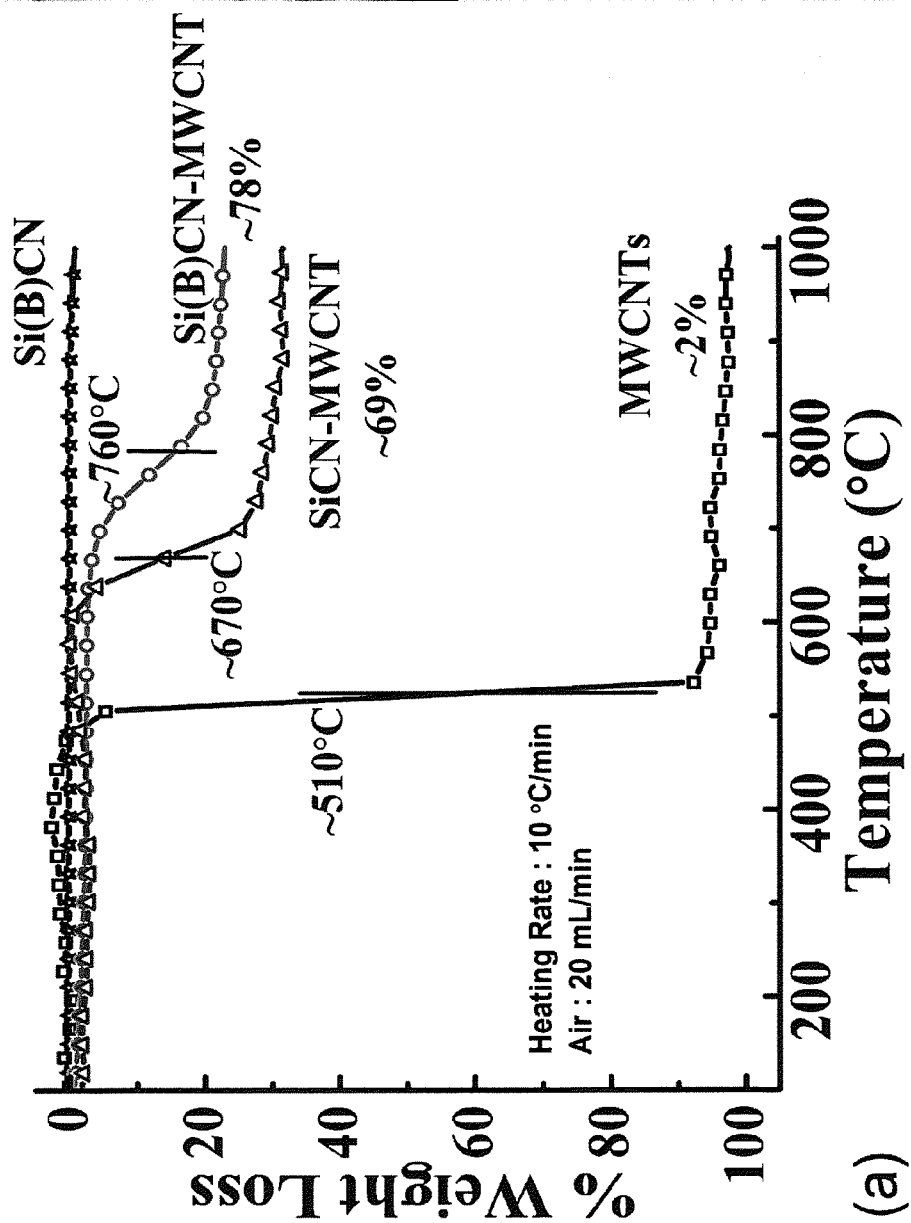
FIG. 9 shows (a) TGA plots showing the weight loss (%) and oxidation temperature (° C.) for SiBNC, MWCNTs, SiBNC-MWCNTs and SiCN-MWCNTs performed in flowing air. (b) and (c) TEM micrographs showing residual TGA SiBNC-MWCNT and SiCN-MWCNT respectively. MWCNTs could be seen in the SiBNC-MWCNTs TGA residual while for SiCN-MWCNTs, the material turned white indicating severe oxidation and burning of the nanotube core (also see Raman data, FIG. 11)

Thermogravimetric analysis was performed for SiBNC-MWCNT as well as for pristine MWCNTs to compare their high temperature behavior. As shown in FIG. 9, the SiBNC-MWCNT specimen had a linear relationship between residual mass and the oxidation temperature, which was observed to be about 750±10° C. After the weight loss at about 750° C., the composite nanowire specimens showed stability in their weight and consequently their physical structure. The oxidation/threshold temperature did not seem to depend much on nanowire processing temperature. TGA residual weight was 77% for SiBNC specimen processed at 1100° C. The residual mass consisted of composite nanowires along with some "clusters" of the ceramic material. The SiBNC-MWCNT TGA residual was later observed under the TEM. The walls and core structure remained intact, at least for thicker nanotubes (diameter >50 nm). TGA performed on as-obtained (pristine) MWCNTs showed 98% weight loss at ~510° C. The narrow weight loss range of pristine nanotubes suggested that they were formed of homogenous material whereas an extended weight loss range for the composite nanowire sample implies a larger range of oxidation temperature with lesser weight loss of a comparatively non-homogenous amorphous ceramic. The 25 to 30% weight loss for SiBNC-MWCNT composite nanowires could be attributed to the combustion of small diameter, defective or non-uniformly coated nanotubes. This was further confirmed from the fact that mostly larger diameter nanowires were observed in TGA residual. Also, as thermal annealing have been shown to increase the stability of MWCNTs, this increase in the oxidation resistance of SiBNC-MWCNTs could be credited collectively to the protective ceramic shield and defect elimination in CNTs during the pyrolysis process.

Figure 10:
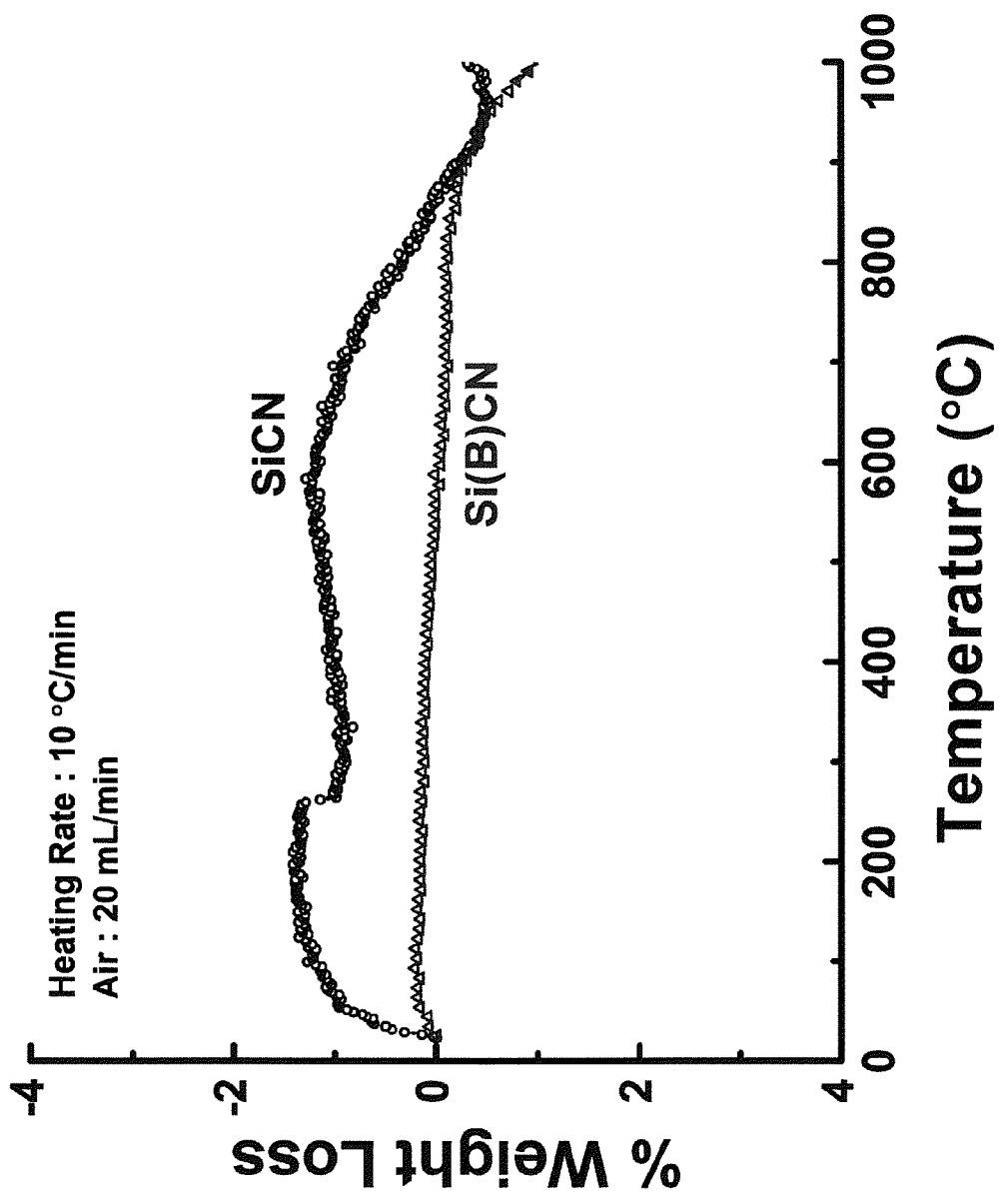
FIG. 10 shows TGA plots showing the weight loss (%) and oxidation temperature (° C.) for SiBNC and SiCN performed in flowing air.

We also compared the TGA of SiBNC-MWCNT with SiCN-MWCNT processed under identical conditions (same wt % of CNTs). SiBNC-MWCNT TGA residual retained its original appearance (black in color) while the SiCN-MWCNT turned into white chunks at 1000° C. in flowing air (instrument limited to 1000° C.). No nanotubes could be seen in SiCN-MWCNT TGA residual (FIG. 9 (c)). In another set of experiments, SiCN-MWCNT and SiBNC-MWCNT specimens were heated in a box furnace up to 1350° C. Here also SiBNC-MWCNT retained its characteristic black while SiCN-MWCNT turned into white particles, indicating superior oxidation resistance of SiBNC-MWCNT nanowires. Additional work was done on compares the oxidation resistance of boron-doped SiCN (i.e., SiBCN) with un-doped SiCN. The results are shown in FIG. 10. The SiCN specimen showed weight gain (approximately 1 to 2%), while the SiBCN specimen showed negligible weight gain or loss, further confirming a better resistance to oxidation at high temperature in flowing air of the boron-doped samples.

Figure 11:
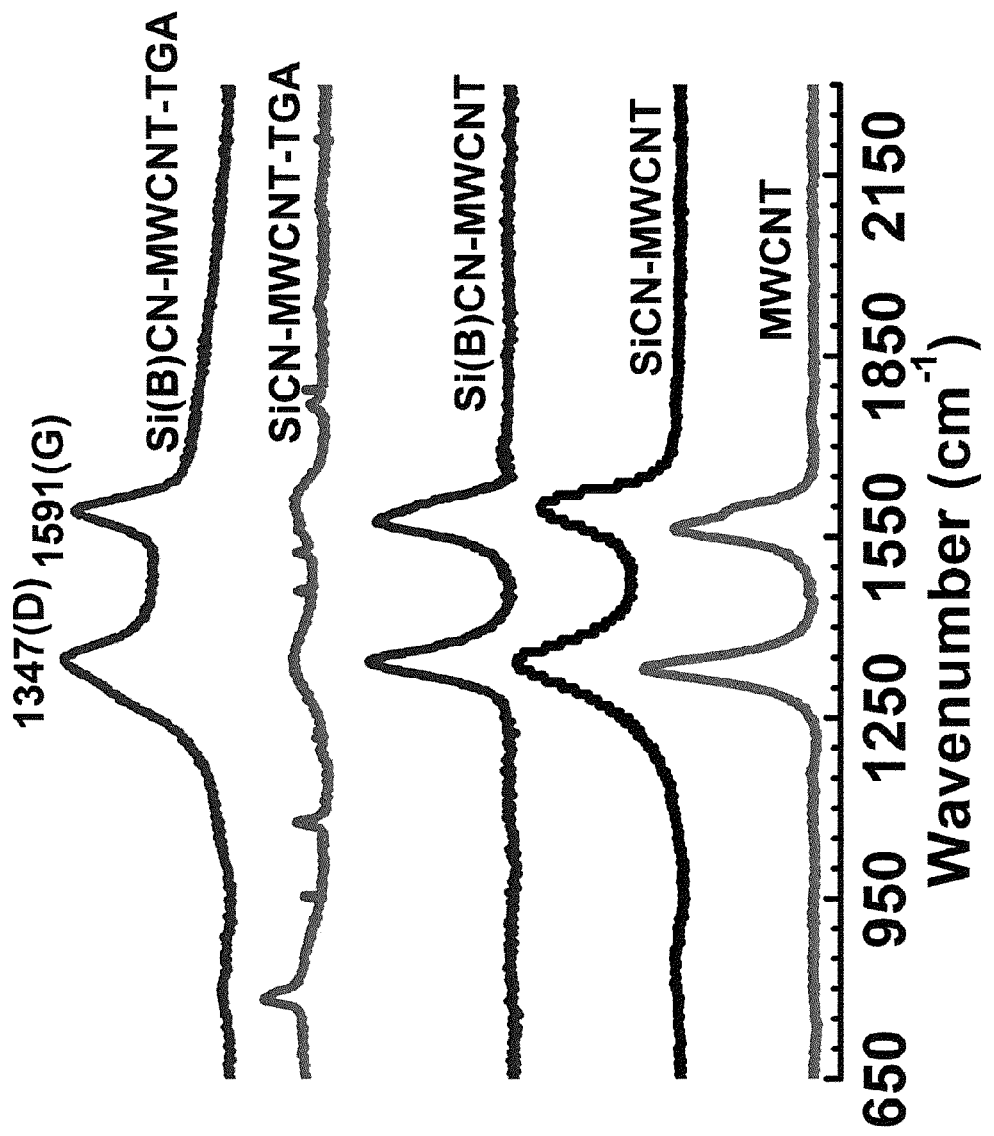
FIG. 11 shows Raman spectra for various specimen prepared in this study. Raman plot of SiBNC-MWCNT TGA residual confirms presence of D (~1350 cm$^{-1}$) and G (~1600 cm$^{-1}$) bands (peaks) that are characteristic of carbon nanotubes similar to that observed in "as-obtained" MWCNTs specimen. As expected, SiCN-MWCNT TGA residual did not show distinct D and G peaks indicating burning of MWCNTs in this specimen (correlating TEM observations)

To further confirm the survival of MWCNTs in SiBNC-MWCNT-TGA residual, we performed Raman spectroscopy for all specimen starting with pristine MWCNTs. Characteristic CNT peaks could be seen in the Raman spectrum of SiBNC-MWCNT TGA residual (FIG. 11). The high temperature stability of SiBNC could be explained based on the B/C/N turbostratic phase acting as a barrier for the diffusing oxygen atoms, inhibiting structural reorganizations and retarding the related decomposition reactions in the ceramic.

Eventually, at high temperatures the retention of ceramic shell on nanotubes is critical and may depend on the ceramic and CNT thermal expansion coefficients (CTE). The thermal expansion phenomenon for CNTs is rather complex and have been studied the least. CTE for CNTs can vary anywhere from $-1\times10^{-6}/°$ C. to $9\times10^{-6}/°$ C. depending upon the type of nanotube (SWCNT or MWCNT), its diameter and the number of walls etc. In general, SWCNTs have lower CTE than MWCNTs, while graphene has a CTE of $\sim2.5\times10^{-6}/°$ C. at $\sim1000°$ C. For SiBNC, is it approximately 3 to $4\times10^{-6}/°$ C., which falls within the range specified for CNTs and graphitic carbon. Our TEM results show survival of the coating and NT core at 1000° C. (in air), we surmise that the SiBNC-CNT interface is stable at high temperatures.

4. Conclusion

We have demonstrated successful introduction of boron in a polysilazane polymer precursor following a single-step, one-pot process. This was achieved through a reaction of trimethyl borate with polyureasilazane under atmospheric conditions. The boron-modified polymer, which is liquid at room temperature was then interfaced with carbon nanotube surfaces to form SiBNC/MWCNT shell/core nanowires. SEM images confirmed high nanowire yield, while TEM validated the amorphous nature of the ceramic shell with thicknesses of approximately 5 to 10 nm. Spectral data confirmed presence of boron in the ceramic. Detailed spectroscopy studies reveal that B—O type bonds are preferred at lower processing temperatures 800 to 1200° C. while B—N type bonds are dominant for samples processed at or above 1300° C. Almost all of the boron could be retained in the final ceramic, with Si:B ratio of 1:1 or higher. The overall ceramic yield ranged 50 to 55%. The TEM of TGA residual revealed that SiBNC ceramic shell protected the nanotube core at 1000° C. in flowing air, while SiCN-MWCNTs did not survive under identical conditions and formed white chunks.

This method of boron doping offers a rapid and more efficient alternative to the conventional sophisticated methods and can be utilized to produce bulk SiBNC components as well. The ease of polymer synthesis presents greater flexibility in tailoring the chemistry and structure of the final ceramic.

Example 2

Synthesis of Polymer-derived Ceramic SiBNC-Carbon Nanotube Composite by Microwave Induced Interfacial Polarization In this Example, an alternate approach to prepare ceramic composites that involves microwave irradiation of polymer (boron-doped polysilazane)-coated MWCNTs is described. The heat generated at the polymer-CNT interface causes thermal degradation and transformation of the polymer into the SiBNC ceramic shell that protects the nanotube core in flowing air up to at least 1000° C.

1. Materials and Methods[a]

Figure 12:
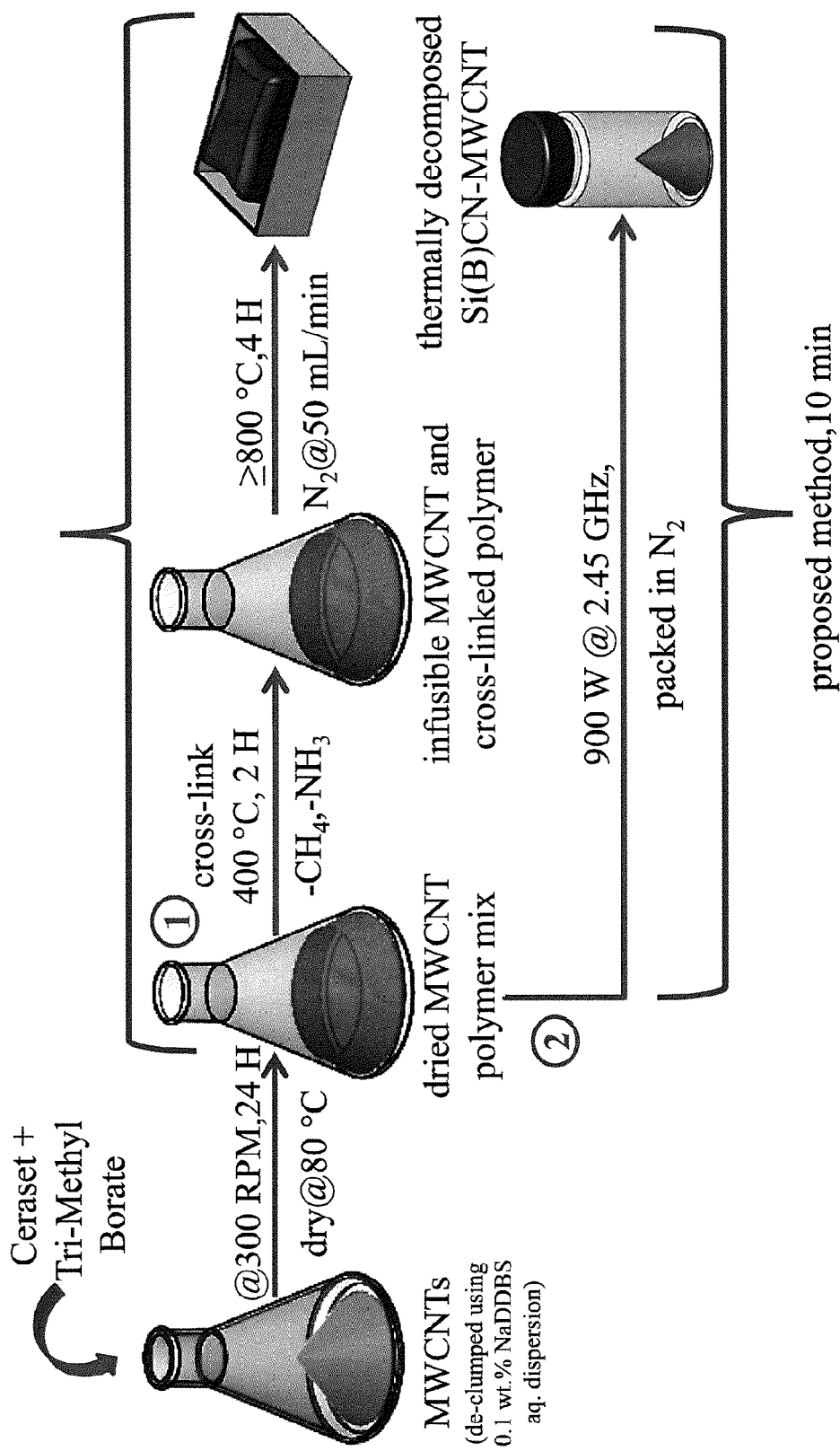
FIG. 12 illustrates the experimental procedure for the synthesis of polymer-derived ceramic coated MWCNTs by (1) previous (heating) method and (2) proposed method.

For the microwave irradiation experiments, specimens containing equal proportions of polymeric precursor and carbon nanotubes were prepared. Briefly, the specimen preparation involved dispersion of 1 g MWCNTs (Bayer MaterialScience AG, North America) in 125 mL of toluene and sonication for 30 min, followed by drop-wise addition of 5 g SiBNC polymeric precursor (boron-modified polyurea (methylvinyl)silazane, Example 1) with stirring for 24 h and drying in an inert atmosphere. The dried polymer-nanotube mix (~200 mg) was sealed in a quartz tube and exposed to full magnetron power of 900 W at 2.45 GHz (domestic microwave) for 5 min, 10 min and 15 min (a total of 3 samples). FIG. 12 is the schematic showing the major steps involved in this process and its comparison with conventional processing of PDC composites.

The other set of experiments involved dielectric measurements with vector network analyzer (VNA). For these experiments, MWCNTs (about 5 wt %) were dispersed in the polymeric precursor to obtain a polymer-CNT gel.

To ascertain the polymer to ceramic conversion, the molecular structure and bond formation of the composite was studied with X-ray photoelectron and Fourier transform infrared spectroscopy (FTIR), and results were compared with our previous work on SiBNC-MWCNTs composite prepared by conventional heating (Example 1). Transmission electron microscopy (TEM) was performed using a CM 100 microscope (Philips/FEI Corporation, Eindhoven, Holland) and Tecnai F20 XT microscope (FEI Corporation, Hillsboro, USA). X-ray photoelectron spectra were collected with a PHI Quantera SXM (ULVAC-PHI, Inc) to study the surface chemistry of the nanocomposite using monochromatic Al Kα X-radiation with beam size <9 μm. Following a survey scan, a 15-minute high resolution scan was performed at the major elemental peaks energy window. The FTIR spectra were collected on the Thermo-Nicolet Nexus 870FT-IR from the specimen prepared by mixing approximately 1 wt % of the finely powdered specimen with FTIR grade KBr powder. TGA was performed using T.A. Instruments Q5000IR. Initial specimen weight of approximately 5 mg was heated at a rate of 10° C./min in air flowing (25 mL/min) until the weight loss stopped and the specimen weight stabilized.

Figure 13:
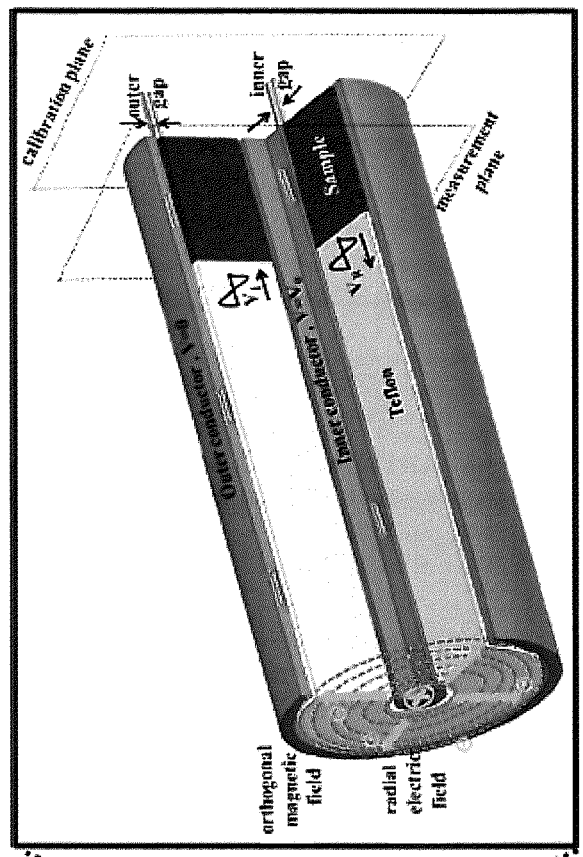
FIG. 13 illustrates the set-up for the dielectric measurements in Example 2.
Figure 13:
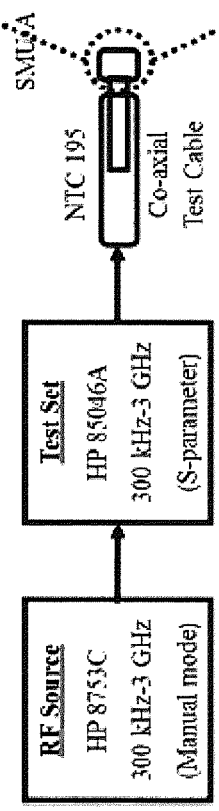

For the dielectric measurement setup, the impedance measurements were collected from a Hewlett Packard (HP) 8753C Vector Network Analyzer (VNA) connected to the sample through a 50Ω nominal impedance NTC195 Flexco coaxial, in combination with HP85046A for the S-Band (300 MHz to 3 GHz) at room temperature (FIG. 13). The test cable terminated with a 20 mm length female-female SMA adapter (Outer diameter of center conductor=5 mm; Inner diameter of outer-conductor=4.064 mm). This setup allows accurate measurement over a broad frequency range, because transmission-line theory can be used to address parasitic capacitances and inductances inherent in the non-negligible sample size at the higher frequencies applied. An S11 one-port calibration was performed prior to measurements by attaching short, open, and load standards at the end of an unmodified SMA adapter. During measurements, an identical female-female adapter was employed, but with 6 mm of its Teflon insulation removed as shown in the FIG. 13 to allow the test sample material to be inserted. The test sample was thus placed so that it constituted a part of the transmission line, and the coaxial line operated in the TEM mode and did not support propagation of higher-order modes. During sample insertion, it was ensured that no air gap exists between the coaxial conductors and the sample to prevent measurement inaccuracies. Since the calibration and measurement plane are not identical, the reflection coefficient measurements are mathematically adjusted to the new reference plane before extraction of the material's permittivity from the measured impedances.

The connector (sensor) translates the variations in the permittivity of the material with the change in frequency into changes in the input impedance. The reflected line scattering parameters were then calculated from the impedance measurements obtained on the VNA over the desired frequency range. The reflection coefficient Γ measured by the VNA is a function of load impedance ZL seen at the adjusted measurement plane. Following standard transmission-line theory, and ZL are related by $$\Gamma = \frac{Z_L - Z_0}{Z_L + Z_0}$$

The load ZL is composed of an open-circuited 6 mm transmission line formed from the coaxial metal conductors and the sample material, which acts as the dielectric. In general, ZL is a function of both this dielectric material and the length of coaxial line, and cycles through capacitive and inductive values repeatedly as the frequency of excitation is increased. However, for a sufficiently short length of line (electrical length less than one-half wavelength) such as the 6 mm length used, there is a one-to-one mapping between the impedance ZL and the sample's real and complex permittivity. This mapping is defined by basic transmission-line theory and can be determined either analytically or through simulation. Thus, once ZL is known, the permittivity can be accurately extracted. In this work, the mapping was done by simulating a 6 mm coaxial line with Agilent's ADS software with different values of permittivity until the measured ZL was obtained at each frequency.

2. Results and Discussion a. Irradiation Experiments and Carbon Nanotube Functionalization Mechanism As expected, a large volume of outgassing was observed within a few seconds of microwave exposure, and hence a relatively small amount of material was used in large vials to avoid overpressure in the container. Some sparks from the metal catalyst particles (typically present in MWCNTs) were also observed during the microwave exposure. About 50% weight loss was observed in the first five minutes of microwave exposure. The specimen did not lose weight thereafter (even after exposure to as much as 30 min). It is worth mentioning that a 30% to 40% weight loss is typical of PDCs prepared by conventional heating techniques. The increased weight loss in microwave-synthesized specimens could be collectively due to decomposition of the polymer into ceramic as well as burning of uncoated MWCNTs.

Figure 14:
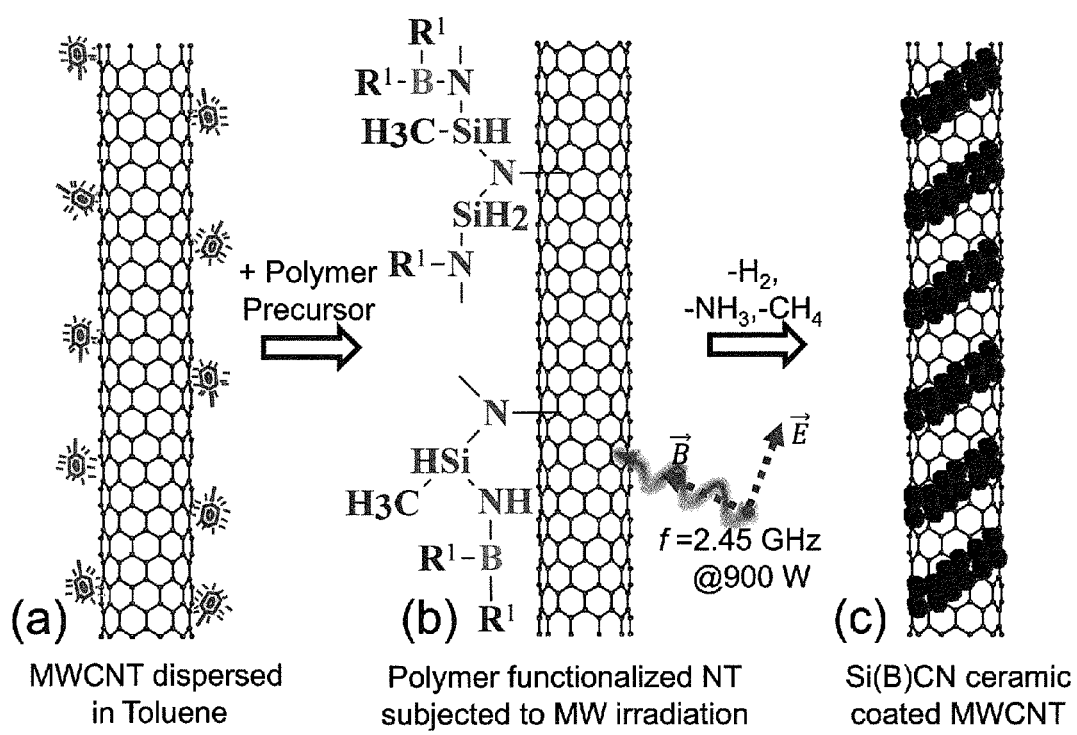
FIG. 14 depicts the mechanism of non-covalent exohedral, sequential sidewall functionalization of MWCNT with: (a) solvent (toluene), (b) boron-modified polysilazane polymeric precursor, and (c) pyrolyzed SiBNC ceramic following microwave irradiation.

We propose a noncovalent sidewall functionalization of MWCNTs by the polymeric precursor, as shown in FIG. 14. It is well known that the chemical reactivity in CNTs is primarily due to the π orbital misalignment that exists between the adjacent carbon atoms oriented at an angle to the tube circumference. Therefore, a strong van der Waals interaction between the aromatic group from toluene and the π-π stacking of the MWCNT sidewalls is very likely. This assists the immobilization of the polymer precursors on nanotube surfaces. Thus, a noncovalent interaction results between amine domains from the hydrophobic polymer backbone and the MWCNT sidewalls, where the former becomes the binding site. Microwave irradiation leads to selective heating of the nanotube core, resulting in thermal degradation of polymer into ceramic and thereby forming a protective coating on the nanotube surfaces. Moreover, the molecular dynamics simulations described in the literature also suggest that the concave outer surfaces of CNTs are more submissive to covalent functionalization than the inner surfaces, and hence ceramic exoskeleton is favored on the CNT surface.

b. Material Characterization i. Electron Microscopy

Figure 15:
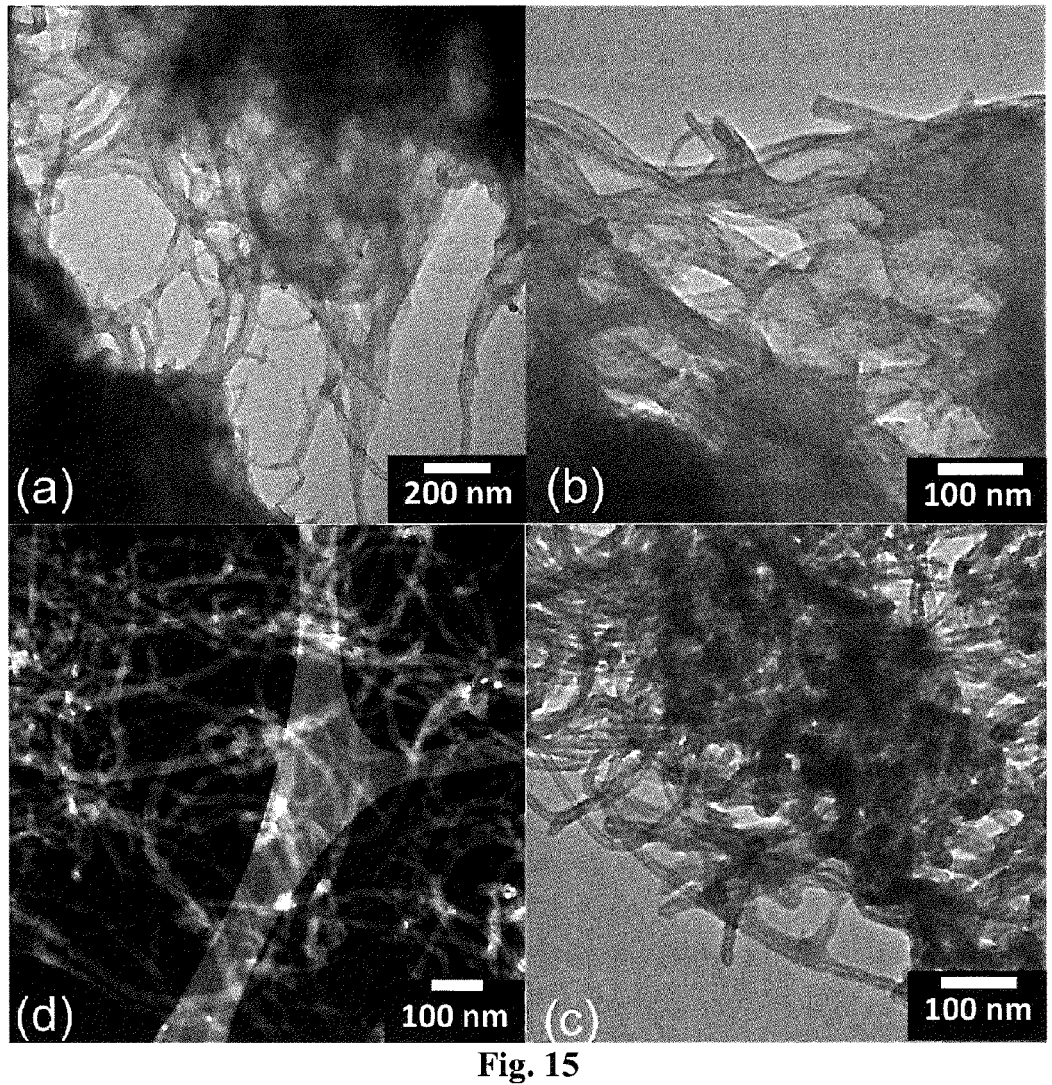
FIG. 15 shows (a-b) TEM images showing untreated polymer-MWCNT mix; (c-d) conventional TEM and high angle annular dark field (HAADF) images of SiBNC-MW-CNTs synthesized by microwave irradiation, respectively. Note that elements with higher atomic weight (i.e., Si) appears bright in HAADF mode.

Structural characterization was carried out with TEM to observe: (a) polymer distribution on nanotube surfaces before microwave exposure and (b) polymer and/or carbon nanotube decomposition (if any) after microwave irradiation was complete. After microwave exposure, the specimens showed considerable change: a more uniform amorphous coating on carbon nanotubes could be seen in the high-resolution TEM and high angle annular dark field (HAADF) images (FIG. 15), possibly indicating polymer decomposition and ceramic formation. The structure of the ceramic-coated CNT, including the shells and the core, was intact even for higher microwave exposure times. This is both remarkable and conclusive as the CNTs usually burn when exposed to microwave irradiation. Because both the starting polymer and resulting ceramic are amorphous (typical of PDCs), we further resorted to spectroscopic and thermogravimetric analysis to confirm the formation of SiBNC ceramic.

ii. X-Ray Photoelectron Spectroscopy (XPS)

Figure 16:
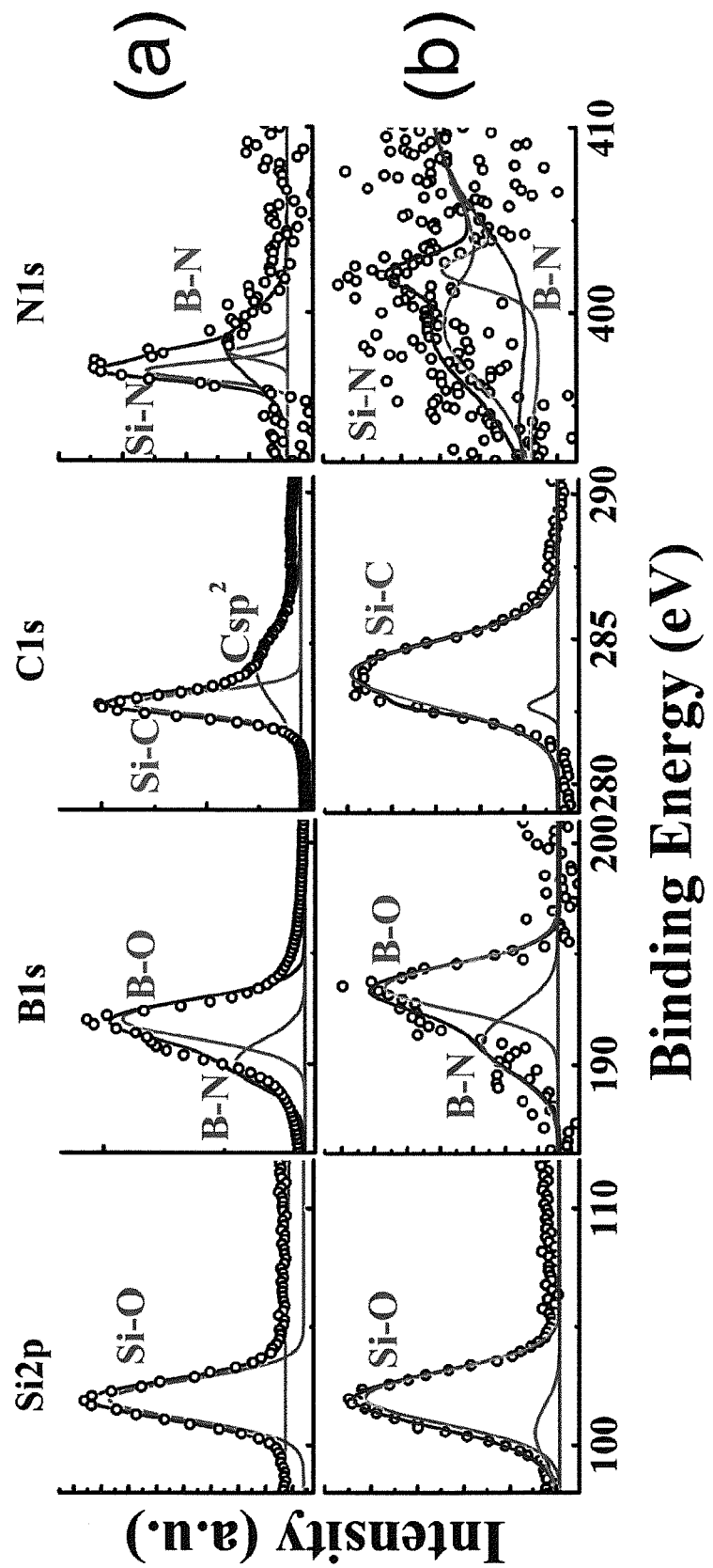
FIG. 16 shows core level elemental XPS spectra of SiBNC-MWCNT processed (a) at 800° C. for 4 hours and (b) exposed to microwave for 10 min.

XPS provides deterministic information about the nature of bond formation and the percentage of elements constituting a compound. We utilized XPS for comparing microwave irradiated specimens with those prepared by conventional heating. Comparison of the survey scans of specimens pyrolyzed at 800° C. and specimens irradiated with microwaves for 10 minutes consistently showed the existence of Si, B, C and N elemental peaks arising from the valence energy levels for the respective atoms (FIG. 16). The resolution of each elemental peak determined the corresponding phases and their proportion in the final compound, as shown in FIG. 16. The thermal degradation of the polymer and subsequent transformation to ceramic results in complementary changes in the elemental phases. Hence, XPS is critical in determining the extent of polymer conversion into ceramic. A single broad peak fitted at 102 eV observed in both specimens is due to Si—O bonds, implying the polyurea(methylvinyle)silazane and trimethyl borate reaction and the cleavage of the methyl group from the latter. Small broad peak at lower energy at 192.5 eV is due to B—N type bond, whereas the large peak at higher energy at 195 eV is clearly due to more electronegative B—O bond as in $B_2O_3$. The sharp intense peak in the pyrolyzed specimen at 283 eV and the broad peak at 283.8 eV in the microwave irradiated specimen are due to Si—C, whereas the higher energy carbon peak at 284.18 eV is due to $sp^2$ bonded carbon. Nitrogen peaks were not very noticeable due its small fraction in the total composition; however, the Si—N bond present in the polymer backbone emerged as a prominent peak. To sum up, the XPS comparison of microwave irradiated and conventional heated specimens strongly suggests conversion of polymer precursor into ceramic by microwave irradiation.

As shown in Table II, comparative analysis of chemical composition by XPS also revealed certain drawbacks associated with microwave assisted heating: (a) low ceramic yield (~50%) compared to that of conventional pyrolysis process (~65%), (b) lesser boron is retained in the final ceramic, probably due to high initial weight loss of the polymer and (c) relatively high surface oxygen content in the microwave specimens.

TABLE II

XPS elemental and phase analysis comparison of the specimen synthesized by microwave exposure for 10 min and pyrolysis at 800° C. for 4 hours.

| Specimen | Elemental Ratios | | | Estimated Bonding Character | | | | |
|---|---|---|---|---|---|---|---|---|
| | | | | Si bonds | | | B bonds | |
| | Si/N | Si/B | B/O | $SiO_2$ | SiC | $Si_3N_4$ | $B_2O_3$ | BN |
| Microwave, 10 min | 4.75 | 1.91 | 0.18 | 15.7 | 81.49 | 2.81 | 58.1 | 41.9 |
| Pyrolyzed, 800° C. | 0.77 | 0.75 | 1.4 | 81.56 | 6.08 | 12.37 | 57.44 | 42.56 |

We believe that these drawbacks could be reduced or eliminated by optimizing the microwave irradiation power and exposure times as well as composition of the starting polymer.

iii. Fourier Transform Infrared Spectroscopy (FTIR)

Figure 17:
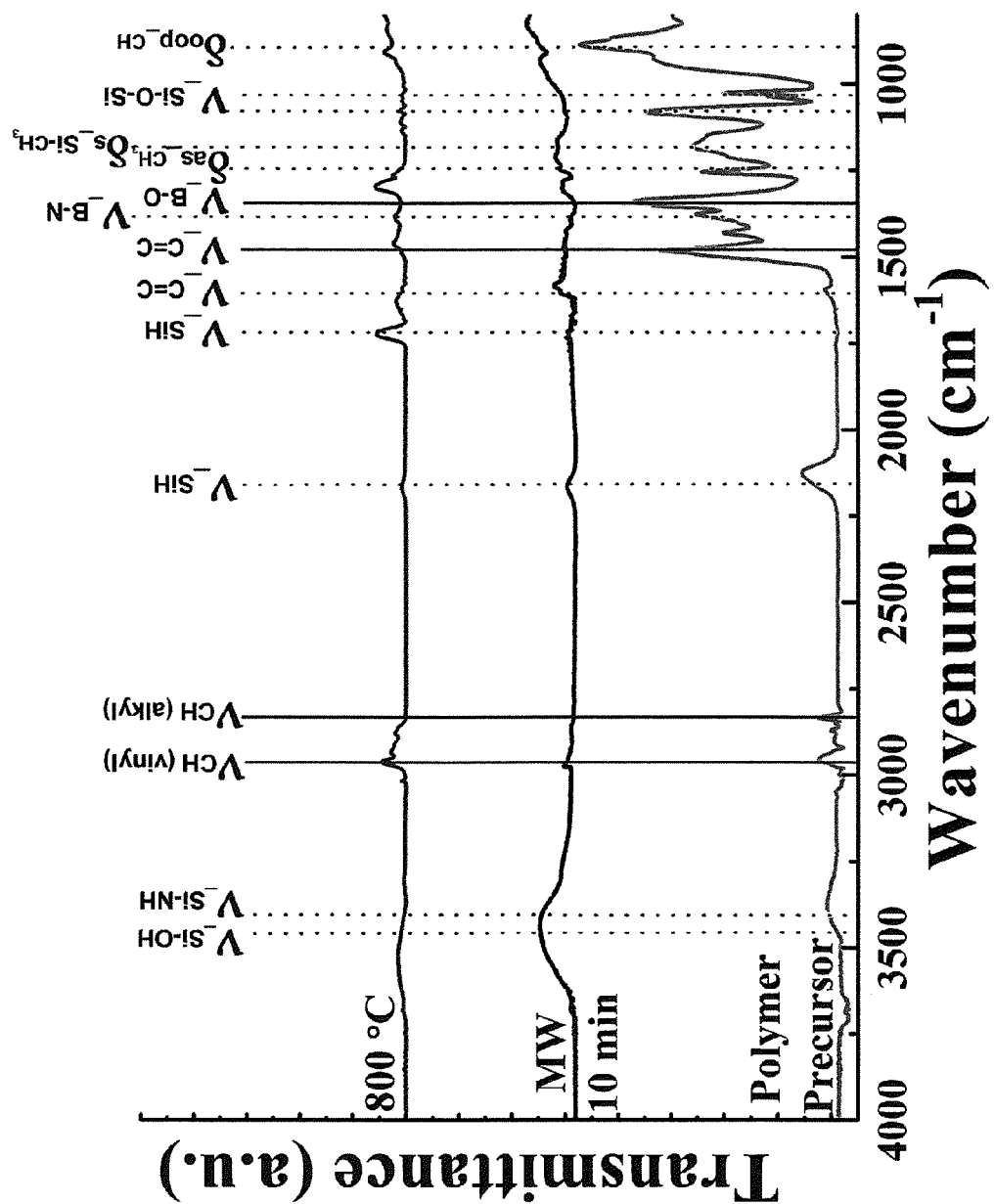
FIG. 17 shows the diffuse reflectance spectrum of SiBNC-MWCNT microwave (MW) specimen, SiBNC-MWCNT specimen pyrolyzed at 800° C. and the starting polymeric precursor (v: stretching vibration mode and δ: bending vibration mode)

FIG. 17 is the comparison between the FTIR spectrum obtained from liquid polymer precursor, SiBCN-MWCNT synthesized by microwaves and the specimen synthesized by conventional pyrolysis at 800° C. For the precursor, peaks from 2950 $cm^{-1}$ to 2850 $cm^{-1}$ and 2127 $cm^{-1}$ correspond to C—H stretching vibration and Si—H type bond, respectively. The decrease in intensity of both these bonds in microwave irradiated specimen and the pyrolyzed specimen indicates decomposion of the polymer and subsequent ceramic formation typically observed in Si/C/N systems. Moreover, the retention of B—O and B—N peaks at 1480 $cm^{-1}$ and 1380 $cm^{-1}$, respectively, in the processed specimens indicates retention of boron in the final ceramic (also observed in XPS analysis, FIG. 16). Additional peaks at 1603 $cm^{-1}$ and 1457 $cm^{-1}$ are due to C=C bonds in MWCNT. Close resemblance between the microwave irradiated and conventionally pyrolyzed specimens suggests successful ceramization as a result of heat generation due to MWCNT-microwave interactions. Additionally, the following peaks were correspondingly assigned for the Diffuse Reflectance FTIR (DRIFT) spectra collected for all the specimens: 3680 $cm^{-1}$: free vOH; 3480-3400 $cm^{-1}$: bonded vOH in Si—OH; 3420-3390 $cm^{-1}$: vSi—NH—Si; 3030 $cm^{-1}$: terminal vinyl group on silicon, vC-H; 2960 $cm^{-1}$: vas-$CH_3$; 2930 $cm^{-1}$: vas-$CH_2$; 2865 $cm^{-1}$: vs-$CH_3$; 2850 $cm^{-1}$: vs-$CH_2$; 2160 $cm^{-1}$: vSi—H; 1715 $cm^{-1}$: terminal vC=O; 1629 $cm^{-1}$: vC=O [N-Disubstituted amides] 1476 $cm^{-1}$: δas-$CH_3$; 1265 $cm^{-1}$: δs-$CH_3$ [Si—$CH_3$]; 1396 $cm^{-1}$: v h-B—N; 1301 $cm^{-1}$: vB-O [B($OCH_3$)$_3$]; 1124, 1044 $cm^{-1}$: vSi—O—Si; 904 $cm^{-1}$: δC—H out-of-plane; 808 $cm^{-1}$: δSi—H (v: stretching vibration mode, δ: bending vibration mode).

iv. Thermogravimetric Analysis (TGA)

TGA was employed to compare the high temperature stability of microwave-synthesized nanowires with those prepared through the conventional pyrolysis route. The TGA for PDC specimens processed by conventional heating route typically follows three phases: a low temperature weight loss due to solvent evaporation, followed by the oxidation of non-ceramic coated nanotubes and other organic impurities at higher temperatures, and lastly the weight stabilization phase (FIG. 18(a)). The weight loss curves for the microwave-synthesized specimen should resemble similar transitions if successful ceramization occurred during microwave exposure. As shown in the comparison plot, FIG. 18 (a), the specimen pyrolyzed at 800° C. and the specimen synthesized by microwave exposure for ten minutes most closely resemble one another. Remarkably, the microwave specimen showed less weight loss (25.5±3.3%) compared to the pyrolyzed specimen (37.9±2.8%). The oxidation temperatures of both specimens were in the same temperature range. The TGA residual maintained its characteristic black color indicating survival of the nanotube core, which was later confirmed by TEM of the residual mass, FIGS. 18 (b), (c) and (d). TGA analysis clearly suggests that the microwave-synthesized SiBNC-MWCNTs are as robust as those prepared by conventional pyrolysis methods.

Figure 18:
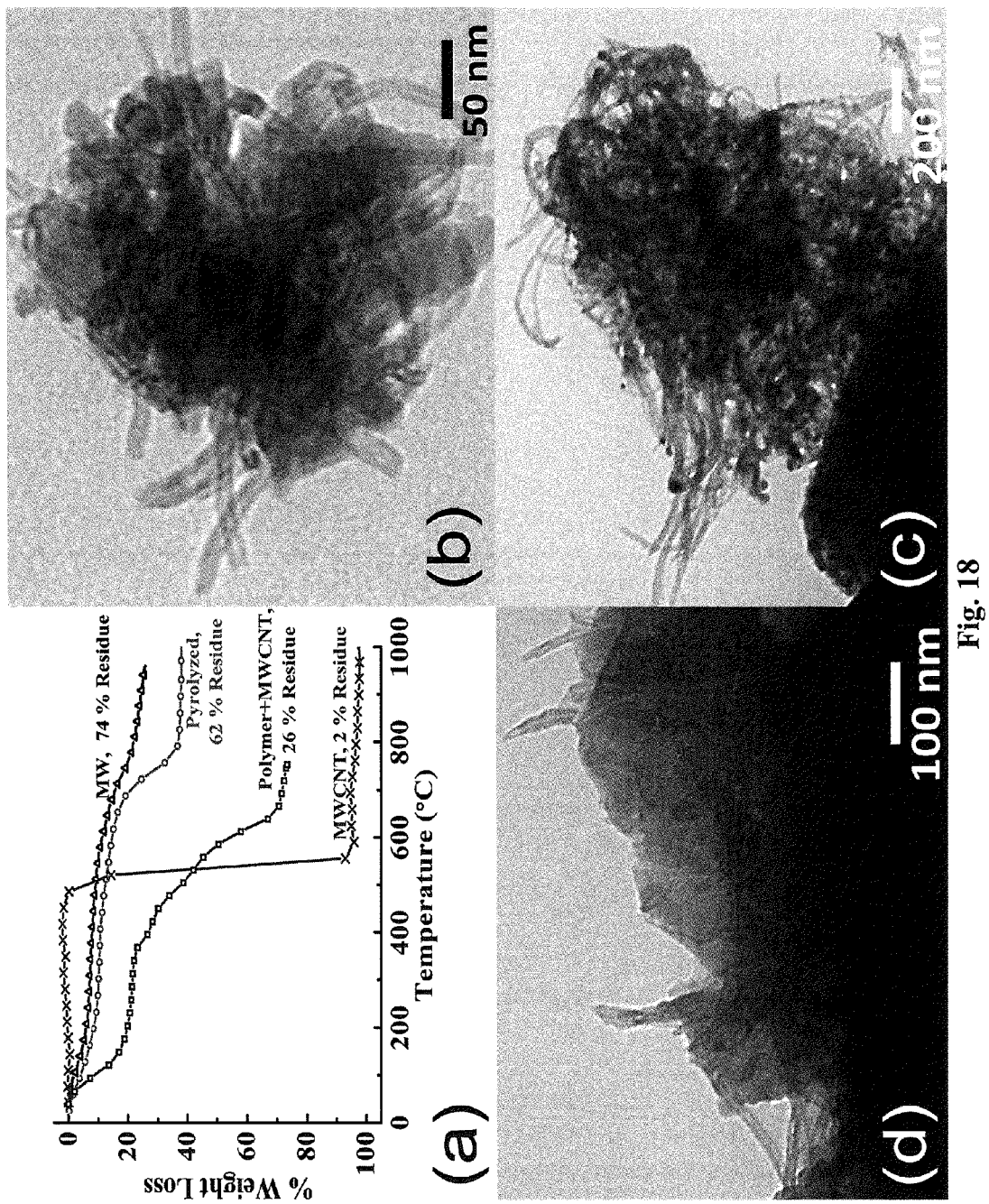
FIG. 18 shows (a) TGA plots showing the comparative weight loss (%) for SiBNC-MWCNT composites synthesized by 10 minute microwave irradiation (black) and conventional pyrolysis at 800° C. (red). Labels indicate respective residual weight percentages. Weight loss for 'as obtained' MWCNTs (blue) and 'untreated' polymer-MWCNT mix (green) has also been included for comparison. TGA was performed in flowing air @ 25 mL/min. Images (b) to (d) are the TEM micrographs of TGA residual corresponding to SiBNC-MWCNT composite synthesized by microwave irradiation.

The high-temperature stability of SiBNC-MWCNT specimens is further highlighted by comparing the TGA data with that of pristine MWCNT and the MWCNT-polymer mix. As shown in FIG. 18 (a), the MWCNTs experienced ~98% weight loss at ~536° C. The weight loss profile of non-microwave specimens (i.e., specimen consisting of polymer-nanotube mix) showed weight loss typical of a polysilazane precursor: (a) ~23% weight loss at ~100° C. (attributed to atmospheric absorbed moisture), (b) ~14% weight loss in 380° C. to 480° C. temperature range due to the release of oligomers and $NH_3$, and (c) a maximum weight loss of ~37% at 623.9±0.6° C., most likely due to burning the non-polymer coated MWCNTs. Further weight loss could be due to release of $CH_4$ and $H_2$, typical of silazane-based polymers.

As shown in Table III, due to an insignificant difference observed between the specimens processed at increasing microwave exposure times it was concluded that (a) the polymer to ceramic conversion occurs initially within the first few minutes of microwave exposure and (b) after the initial ceramic transformation, CNT oscillation are possibly damped by the surrounding ceramic matrix.

TABLE III

Summary of oxidation temperatures and residual weight obtained from TGA analysis of various specimens used in this study.

| Specimen | Oxidation Temperature (° C.) | Total Weight Loss (%) |
|---|---|---|
| MWCNT | 536.3 | 97.7 ± 0.1 |
| Polymer-MWCNT | 100.8 ± 2.0, 380.4 ± 1.8, 479.7 ± 1.4, 623.9 ± 0.6 | 73.6 ± 1.2 |
| Si(B)CN-MWCNT 800° C. | 730.0 ± 0.3 | 37.9 ± 2.8 |
| Si(B)CN-MWCNT 5 min | 736.8 ± 0.5 | 20.5 ± 3.6 |
| Si(B)CN-MWCNT 10 min | 736.2 ± 0.4 | 25.5 ± 3.3 |
| Si(B)CN-MWCNT 15 min | 723.7 ± 0.4 | 24.9 ± 3.4 | c. Dielectric Measurements

To quantify the microwave interaction properties of MWCNT-polymer mix, we measured the impedance and thereby calculated the complex permittivity of the nanocomposite from 100 MHz to 3 GHz frequency. As shown in FIGS. 19(a) and 19(b), the permittivity plots for the specimen displayed a diminishing response with increasing frequency at room temperature. This behavior of permittivity corresponds to the Debye (β) relaxation phase, caused by reduced molecular polarization at the MWCNT polymer interface with increasing microwave frequency. This secondary (β) relaxation rate is temperature dependent given by the Arrhenius relationship:

$$R(T) = R_\infty \exp\left(\frac{-E_A}{k_B T}\right)$$

where $R_\infty$ is the relaxation rate in the high temperature limit, $k_B$ is the Boltzmann constant and $E_A$ is the activation energy. Alternatively, the Erying relationship also gives an inverse relationship between temperature and relaxation time as, $$\tau(T) = \frac{h}{kT}\exp\left(\frac{\Delta H}{RT}\right)\exp\left(-\frac{\Delta S}{R}\right)$$

where h and k are Planck and Boltzmann constants, respectively, and ΔH and ΔS are the change in enthalpy and entropy, respectively.

We consider the MWCNT-polymer composite as a heterogenous mix containing a small amount of conducting MWCNTs in a nonconducting polymer matrix. Under the influence of an external electromagnetic field, the charge buildup occurs at the MWCNT-polymer interface. This interfacial polarization is the cause of heat loss in the composite specimen. The MWCNT-polymer dielectric specimen, after an initial absorption of microwave energy (shown as low permittivity at room temperature in FIG. 19(b)), experiences a temperature rise by Joule heating. This further leads to an increase in phonon vibrations, inducing dielectric and ionic conduction losses by electric carrier-phonon interactions resulting further increase in effective permittivity, E″. Moreover for the heteregenous dielectric material in conducting medium, the effective permittivity loss exponentially increases with temperature as given by $$\in''(\omega) = B(T)\in_0 \omega^{n(T)-1}$$

where B(T) is a temperature-dependent function at a given frequency 'ω'. Hence, the progressively increasing permittivity leads to higher temperatures, also known as thermal runaway. Moreover, at room temperature the induced dipole moments partially cancels out; but at higher temperatures (i.e., higher thermal energy) the molecules have greater degree of freedom and decreases the dipole cancelling effect, resulting in high permittivity. This explains the reason for high heat generation at the nanotube polymer interface sites. As shown in FIG. 19(d), the return loss of dispersed MWCNT in polymer is 5.6 dB at 2.45 GHz. This implies that 72.5% of incident power was dissipated as heat by the significantly lossy specimen.

Figure 19:
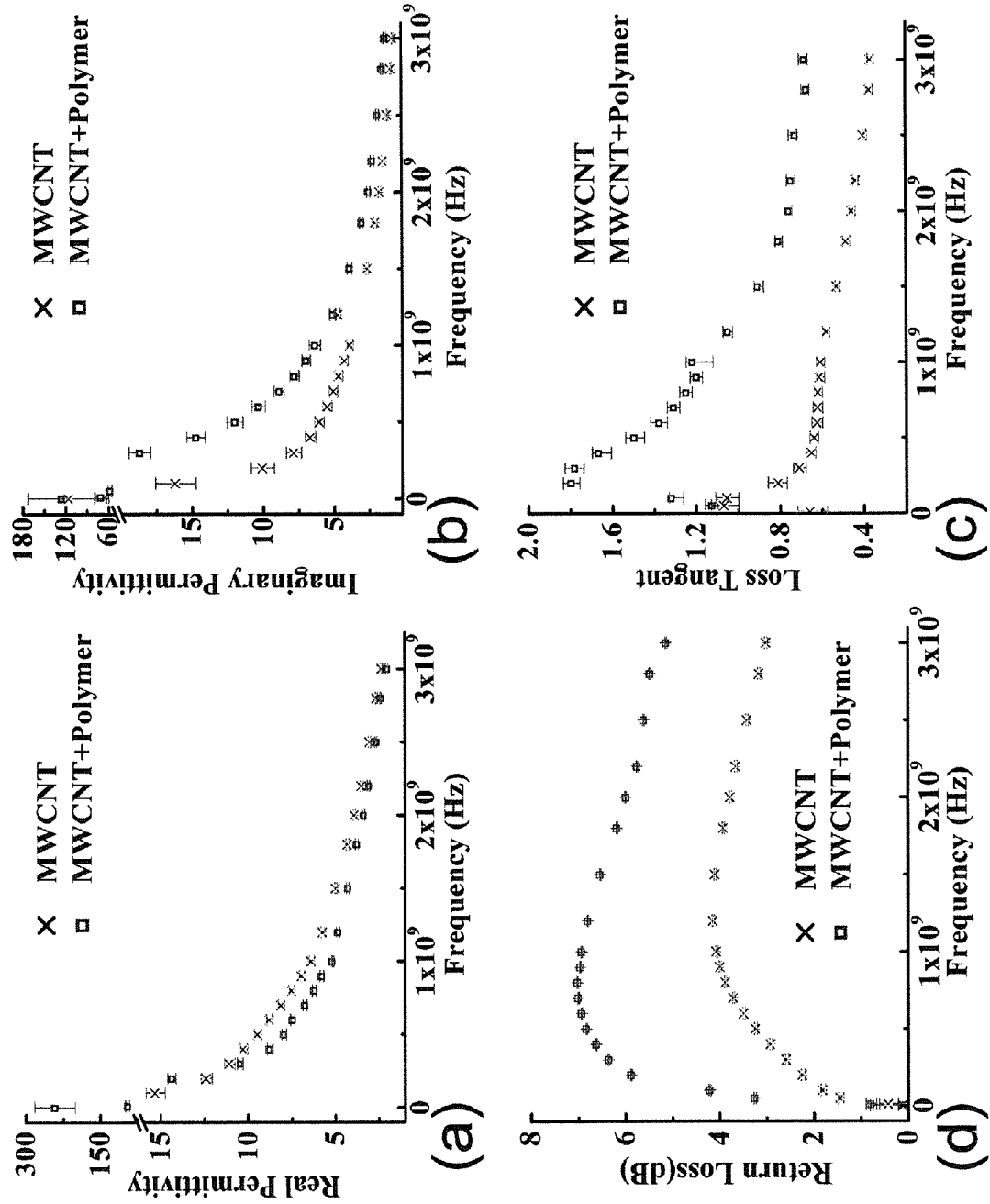
FIG. 19 shows the dielectric properties calculated from impedance measurements: (a) Real permittivity quantifies the electrical energy the dielectric can retain; (b) imaginary permittivity determines the effectiveness to absorb microwave energy; and (c) loss tangent represents the ability to effectively convert the electromagnetic energy into heat energy, and (d) return loss is a measure of effectiveness of the power delivered from the transmission line to the load for the dispersed MWCNT in polymer and agglomerated MWCNT specimens measured in the microwave frequency range from 100 MHz to 3 GHz.

As observed in FIG. 19, the dispersed MWCNTs (5 wt %) in polymer showed slightly higher imaginary permittivity than the 'as obtained' nondispersed MWCNTs. In an alternating electric field, the acquired dipole of the CNT is directed towards its length, and hence the CNTs dispersed in polymer may have better microwave absorption than the agglomerated CNTs. The loss tangent and return loss (FIGS. 19(c) and 19(d)) showed a similar pattern because they possess high values at low microwave frequencies and starts decreasing after ~600 MHz. This behavior could be due to more time available to π-π electron stacks at the CNT polymer interface to polarize at low frequency than at higher frequencies, where the period of electric field is significantly smaller than the relaxation time of the dipoles.

3. Conclusion

Synthesis of PDC-MWCNT composites by microwave irradiation (in a domestic microwave oven) has been demonstrated. The most effective polymer-to-ceramic conversion occurs during the first few minutes of microwave exposure. The proposed process takes a fraction of the time required by the conventional process and hence offers an energy, time, and cost effective alternative. The XPS surface analysis and FTIR spectral analysis of microwave specimen presents the dominance of Si—O, Si—C, B—O and B—N bonds, analogous to that found in SiBNC ceramics processed at 800° C. following conventional routes. Furthermore, the high temperature oxidation resistance of microwave specimen is comparable to or better than that of SiBNC-MWCNT composites prepared by conventional routes as revealed by the TGA. TEM of residual TGA showed that the MWCNT structure stayed intact within the ceramic shell, further asserting the successful polymer-to-ceramic transformation.

Dielectric measurements at room temperature showed an exponentially decaying dielectric response, suggesting it to be a β-relaxation phase due to interfacial polarization. Low permittivity at 2.45 GHz suggests low energy retention, but the return loss analysis shows that about 70% of incident microwave energy on the specimen is effectively converted into heat at the polymer-nanotube interface, revealing the cause of high heat generation that leads to polymer to ceramic conversion. A similar methodology could be implemented to synthesize carbon-nanotube-based multifunctional nanocomposites with reduced processing times thereby saving energy-related costs.

Example 3

Very High Laser-Damage Threshold of Polymer-Derived SiBNC-Carbon Nanotube Composite Coatings In this Example, the laser irradiance behavior and resulting structural evolution of polymer-derived SiBNC-functionalized multiwall carbon nanotube (MWCNT) coatings was examined. A SiBNC-MWCNT composite composition was prepared and spray-coated to test for potential application in high-power radiometry, particularly at 10.6 μm exposure. We report a damage threshold value of 15 kWcm$^{-2}$ and an optical absorbance of 0.97 after irradiation. This is an order of magnitude improvement over MWCNT (1.4 kWcm$^{-2}$, 0.76), SWCNT (0.8 kWcm$^{-2}$, 0.65) and carbon paint (0.1 kWcm$^{-2}$, 0.87) previously tested by us using a 2.5 kW CO$_2$ laser at 10.6 μm. Electron microscopy, Raman spectroscopy, and X-ray photoelectron spectroscopy suggests partial oxidation of SiBNC forming a stable protective SiO$_2$ phase upon irradiation.

1. Experimental Procedure a. Composite Material and Coating Preparation

Coating material was prepared by dispersing 1.0 g of MWCNTs (Bayer Material Science) in 125 mL of toluene by sonication (Branson 2510) for 30 min. This was followed by drop-wise addition of 10.0 g boron-modified polymeric precursor (prepared using commercially-available polyurea (methylvinyl) silazane (Ceraset™) and tri-methyl borate (Alfa Aesar)), with stirring for 24 hours, followed by slow drying it at 80° C. in an inert atmosphere. On pyrolysis at 1100° C., this resulted in a core-shell structured, SiBNC-MWCNT composite. The composite material was gently crushed using a mortar-pestle to obtain a fine powder. It was then dispersed in toluene (ACS reagent) and sonicated for 1 hour to obtain a homogenous dispersion.

Figure 20:
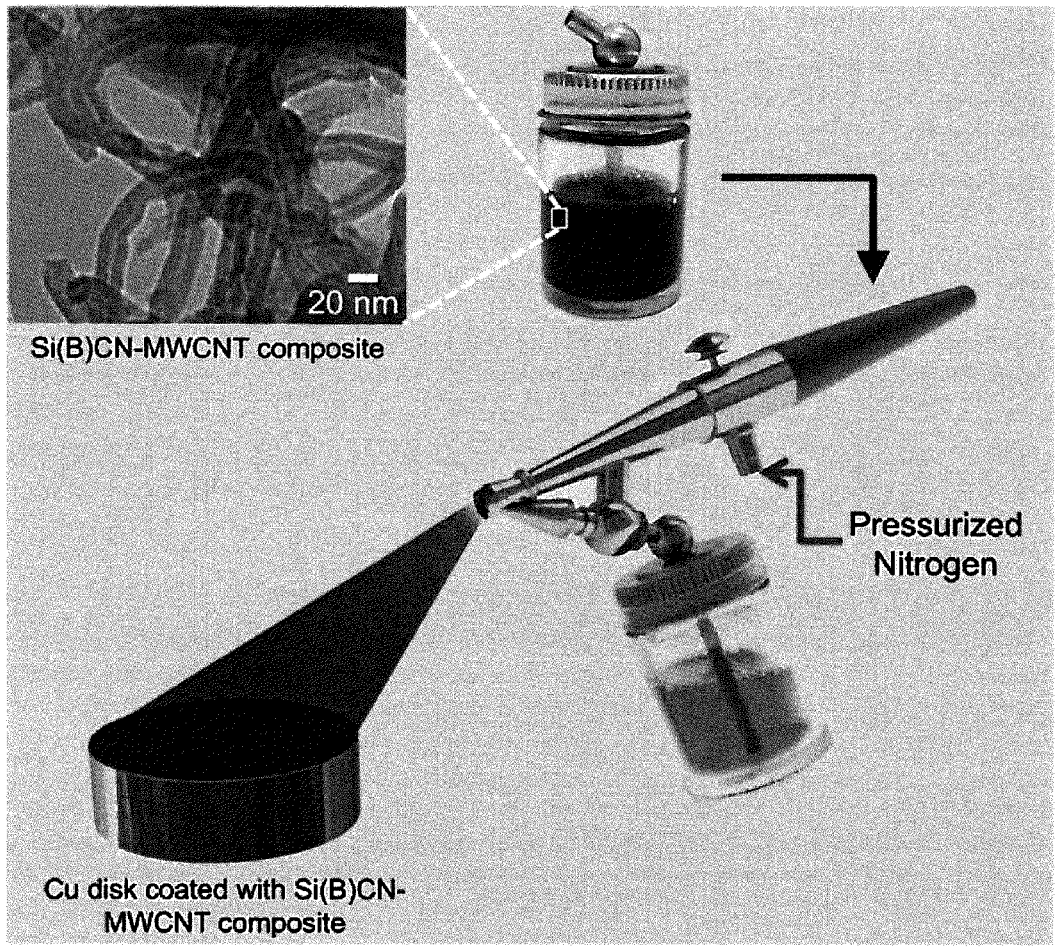
FIG. 20 shows the Schematic representation of the spray coating process (Inset is the TEM image showing shell/core structure of the SiBNC-MWCNT composite). Uniformly dispersed SiBNC-MWCNT nanowires in toluene solution were spray coated using an air brush technique. The coated specimen were then baked overnight at 100° C. for curing.

As shown in the FIG. 20, the dispersion was then carefully sprayed onto copper substrates using an airbrush (Model: Paasche-H#1) at 15 psi of nitrogen gas. The spraying was done with longitudinal passes while the substrate surface temperature was raised to 80° C. using a hot plate. Frequent stops between the passes allowed the solvent to evaporate and thereby form a uniform compact coating. Spray coating was carried out until the appropriate dark black coating thickness was visually realized with an approximate thickness of 10 µm. The coated copper test specimens were then maintained at 100° C. on a hot plate for 12 hours to ensure removal of volatile entities.

The coatings were prepared on two different substrate types: (a) a circular copper disk (weighing 600 grams) with 76 mm diameter and 13.6 mm thickness and, (b) a rectangular copper plate with dimensions 24 mm×62 mm and 0.75 mm thickness.

b. Experimental Setup

The coated copper test specimens were used for studying thermal damage threshold at constant wavelength of 10.6 µm produced by $CO_2$ laser at increasing power densities of 4 kWcm$^{-2}$, 8 kWcm$^{-2}$, 12 kWcm$^{-2}$ and 15 kWcm$^{-2}$, respectively. Copper disk specimens received 10-second exposures, while copper plate specimens were exposed for 2 seconds. Typically, a laser thermal detector test setup has a flowing-water jacket to absorb the heat transferred from laser to copper substrate via the coating material. This flowing water also acts as an infinite sink for the heat transferred. This set-up is rather complex and is not feasible for small-scale damage-threshold-testing; hence we utilized a copper disk with large mass (as a heat sink) as the closest representation of the actual calorimeter cone. Additionally, coatings on copper plates (with lesser heat dissipation) will test the coating material more severely, as they have neither the thermal mass nor did they receive any cooling.

Figure 21:
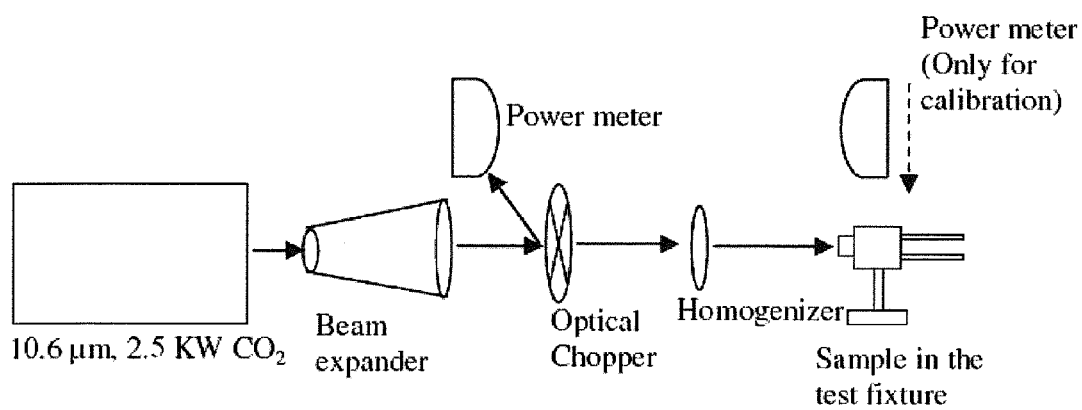
FIG. 21 is a schematic of the set-up for testing and measuring laser damage on the coatings in Example 3.

FIG. 21 shows a schematic for testing laser damage measurements on the specimens. Briefly, the laser was used as the source for local heating and eventual damage. The laser passed through a beam expander, and was then incident on an optical chopper (Dayton 3M560B, 60 Hz, 1550 rotations/minute) which split the beam, one portion of which was monitored by an air-cooled power meter (Molectron, PM150-50). The other beam portion was allowed to pass through a faceted ZnSe lens, 35 mm in diameter with a focal length 38.1 mm. The ZnSe lens acted as a homogenizer of the beam intensity prior to incidence on each specimen.

The exposed and unexposed areas of the coatings were analyzed and compared using scanning electron microscopy (SEM), Raman, and X-ray photoelectron spectroscopy (XPS). SEM analysis of the irradiate areas was done using a Carl Zeiss EVO low vacuum SEM operating at 5 kV with 25 mm (low resolution) and 10 mm (high resolution) working distance. Specular reflectance of the material was measured from the exposed and unexposed areas (disk specimen) using a NIST-customized test setup that involved a 10.6-µm $CO_2$ laser with a 3-mm diameter beam measured at 1.137 W incident power was reflected at approximately 45° from the specimen surface. The power of the reflected beam was detected using a thermopile photodetector. To ensure the beam alignment, the beam was first reflected off of a molybdenum mirror, and then replaced with the SiBNC-MWCNT-coated disk specimen. This specimen was mounted on a translation stage in order to maintain the aligned angle as measurements at different spots were performed. Broadband reflectance measurements for the mid-IR range were carried out using a Thermo Fisher Nicolet 6700 FT-IR Spectrometer in the ATR mode. Raman spectra were collected on a HORIBA LabRAM ARMIS spectrometer using a 17 mW HeNe laser source [632.8 nm wavelength (1.96 eV)]. The spectra were collected using a 100× NIR objective lens (theoretical spot size: 842 nm), 200-µm confocal hole, 150-µm wide entrance slit, and 600-gr·mm$^2$ grating. The surface chemistry of the coating was studied using PHI Quantera SXM (ULVAC-PHI, Inc) and monochromatic Al Kα X-radiation with a beam size <9 µm.

Following a survey scan, a 15-minute high-resolution scan was performed in the major elemental peaks' energy window.

2. Results and Discussion a. Electron Microscopy

The effect of incremental laser power on coating morphology can be observed in corresponding electron microscopy images. As the copper disk specimen has comparatively better heat dissipation (due to its large thermal mass) than the plate specimen, the coating on the disk specimen is expected to withstand much higher power densities and longer periods without damage. Hence, the characterization data is presented in a manner to show incremental coating damage i.e., data from the disk specimen are presented first (FIGS. 22 and 23) followed by copper plate specimen (FIGS. 24 and 25).

At low magnifications, the non-irradiated coating surface exhibited a structurally stable and porous morphology with interconnected particles. MWCNTs are believed to provide the reinforcement to the composite coating by holding porous ceramic on to the copper substrate under harsh testing conditions. The laser-irradiated region of the coating appeared as a bright spot (SEM image charging) while the unexposed areas were relatively dark in both the disk (FIG. 22) and plate (FIG. 24) specimens. For the disk specimen, the transition from non-irradiated to irradiated spot was prominently noticeable (FIG. 22a through 22e). This observation suggests partial oxidation of the ceramic (either $Si_3N_4$/SiC in the coating transforming to $SiO_2$) or burning of partially-coated MWCNTs when compared to the 'as-prepared' coating, shown in FIGS. 23a and 23b. For the 4 kWcm$^{-2}$, 10-second irradiance (FIG. 23c), as much as 70% of the spot appeared bright. The irradiated spots with 8 kWcm$^2$ and 12 kWcm$^2$ exposure showed extension of the bright area to about 95%. At higher magnifications, FIGS. 23d and 23e, these darker areas showed presence of ceramic-coated MWCNT mesh like morphology. Spot at 15 kWcm$^{-2}$ (FIG. 23f) appeared similar to that of 12 kWcm$^{-2}$ and no new changes could be observed in the coating's morphology.

Figure 23:
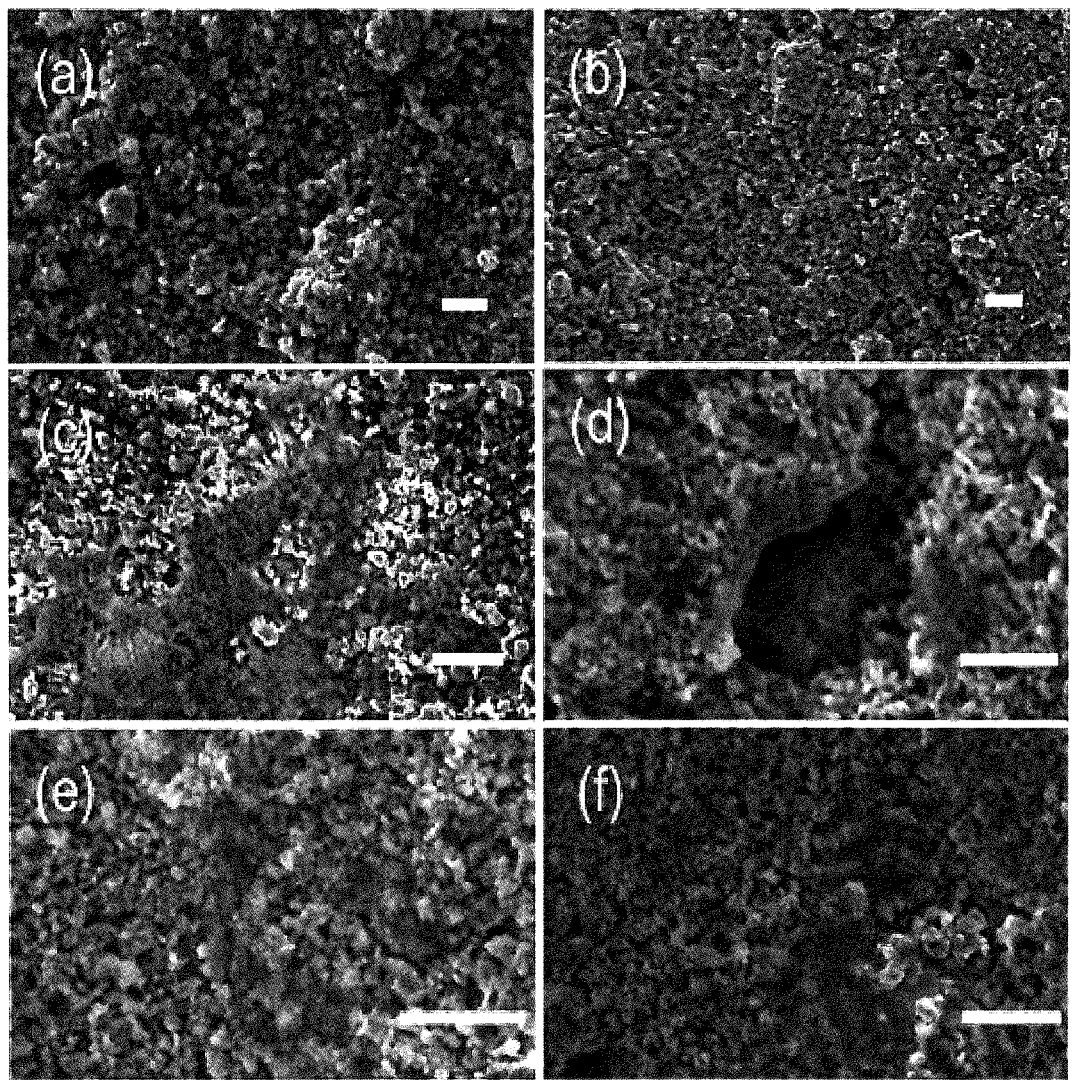
FIG. 23 shows (a)-(b) SEM images of the 'as-prepared' coating on copper disk specimen. While (c) through (f) are SEM images from the coating area irradiated at 4, 8, 12, and 15 kWcm$^{-2}$ for 10 seconds, respectively. Image (d) seems out of focus because of the coating height difference. Scale bar is 5 micrometer in all images.
Figure 24:
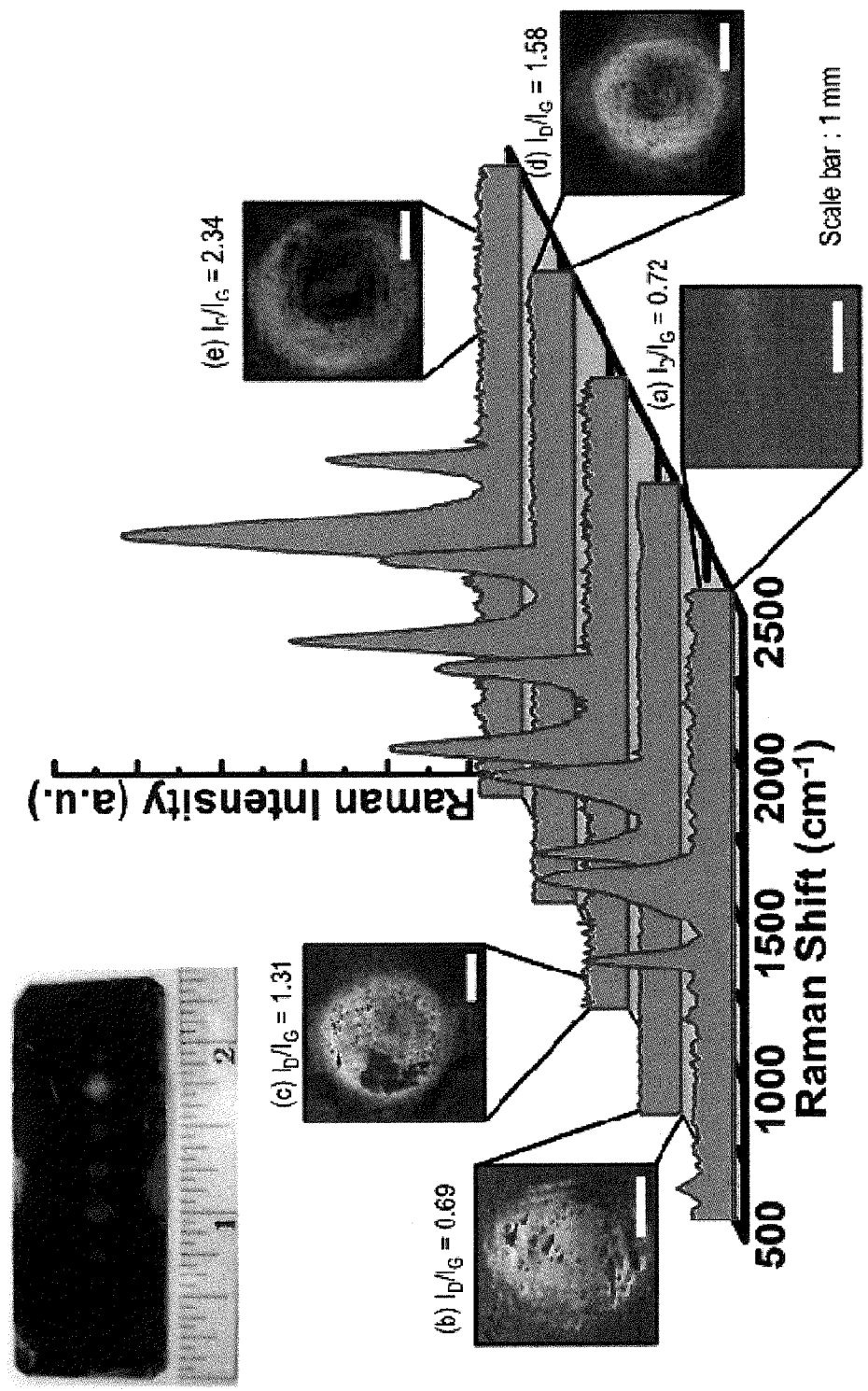
FIG. 24 shows Normalized Raman spectra of SiBNC-MWCNT coatings exposed to laser irradiance at (a) 0 kWcm$^{-2}$ (unexposed), (b) 4 kWcm$^{-2}$, (c) 8 kWcm$^{-2}$, (d) 12 kWcm$^{-2}$, and (e) 15 kWcm$^{-2}$ for 2 seconds, respectively with the corresponding low-magnification SEM micrographs. Scale bar (image b to e) is 1 mm. Insert (top left) is the digital camera image of the plate specimen.
Figure 25:
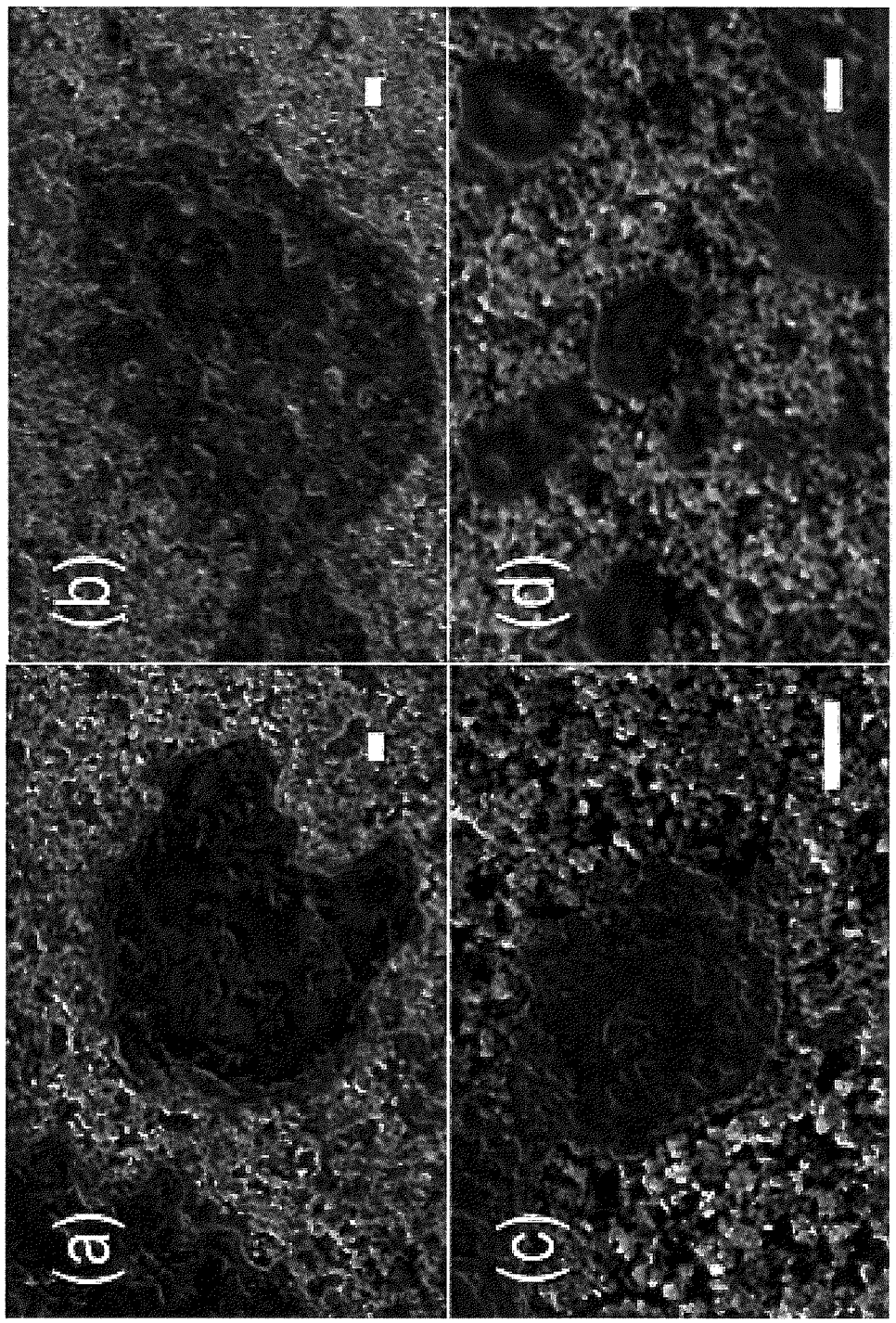
FIG. 25 shows SEM micrographs showing laser-irradiated areas of the coating for copper plate specimen at (a) 4 kWcm$^{-2}$, (b) 8 kWcm$^{-2}$, (c) 12 kWcm$^{-2}$, and (d) 15 kWcm$^{-2}$ for 2 seconds exposure. Scale bar is 5 micrometer in all images.

SEM images from the copper plate specimen are compared in FIGS. 24 and 25. The 'as-prepared' coating looked similar to the one on disk specimen (FIG. 23a). The irradiated spot at 4 kWcm$^{-2}$ (FIGS. 24b and 25a) revealed bright areas with some discontinuities. The surface of these discontinuities (gaps) appeared uniform and smooth with intermittent mesh of interconnected ceramic-coated MWCNTs. These gaps are believed to originate from volume changes induced in the composite material due to an abrupt and intense heat generation on coating top surface during continuous laser exposure. As a result, the top layer experienced cracks and increased discontinuities due to increased volume change compared to the inner layer or bottom regions, thereby forming two layers with distinct appearance. We believe that this issue of differential heating could be addressed by optimizing composite coating thickness, which can be a subject of future research.

SEM images also showed round and isolated particles (size less than 1 µm) that are most likely to be the hard ceramic phase. The area irradiated at higher laser density of 8 kWcm$^{-2}$ (FIG. 25b) exhibited major transition in the discontinuity regions. Unlike smooth gaps observed for lower laser power densities, this spot showed fused-in/solidified liquid-type of morphology. Further, at 12 kWcm$^2$ exposure (FIG. 25c), large isolated gaps (10 to 20 µm) in the coating with solidified liquid-like texture were observed. While at the 15 kWcm$^{-2}$ (FIG. 25d) exposure, these gaps appeared more uniform. Remarkably, still under these conditions the coating was found to be relatively stable and intact on the substrate. The bright appearing spots realized as either $SiO_2$ or burned nanotubes appeared more pronounced. These observations confirm that composite coatings on test copper plate specimen suffered more severe damage due to low thermal mass of the substrate and insufficient cooling.

b. Raman Spectroscopy

Figure 22:
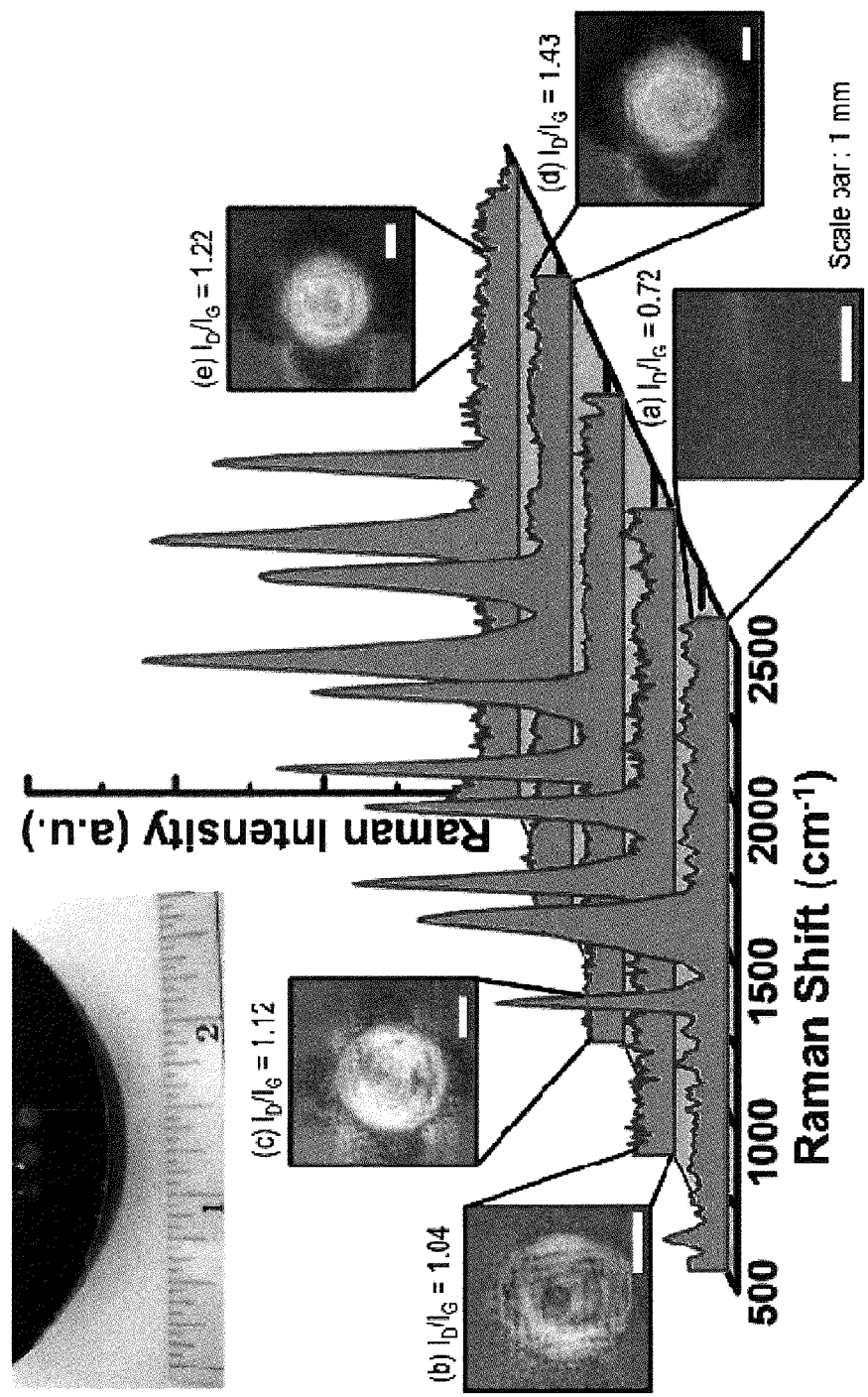
FIG. 22 shows Normalized Raman spectra of SiBNC MWCNT coatings exposed to laser irradiance at (a) 0 kWcm$^{-2}$ (unexposed), (b) 4 kWcm$^{-2}$, (c) 8 kWcm$^{-2}$, (d) 12 kWcm$^{-2}$, and (e) 15 kWcm$^{-2}$ for 10 seconds respectively, along with the corresponding SEM micrographs. Scale bar (image b to e) is 1 mm. Insert (top left) is the digital camera image of the specimen.

Raman spectroscopy is a sensitive, nondestructive and non-invasive technique and hence qualifies for studying the evolution of carbon structure ($sp^3$- and $sp^2$-type carbon) in the irradiated area. The characteristic "D" and "G" peaks signify the presence of $sp^3$- and $sp^2$-type carbon bonds in composite coatings, respectively. Hence, the origin of D-peak collectively corresponds to stretching of Si—C and defect sites in MWCNTs, whereas the G-peak corresponds to C=C (graphitic) bonds in the coating material. As shown in FIG. 22 and FIG. 24, existence of D-peak (1330-1356 $cm^{-1}$) and G-peak (1580-1595 $cm^{-1}$) are invariably observed for all exposures. For the disk specimen, the $I_D/I_G$ ratio increased from 0.72 from the unexposed area to 1.43 from 12 $kWcm^{-2}$ and 1.22 from the 15 $kWcm^{-2}$, 10 seconds irradiated spot. And for the plate specimen, $I_D/I_G$ ratio was 2.34 from the spot that received 15 $kWcm^{-2}$, 2 seconds exposure. Hence, almost a linear effect of increasing laser power density on Raman $I_D/I_G$ ratio was observed, suggesting increased defects in $sp^2$ bonded graphitic carbon with irradiated power. These results also suggest that even under the influence of high irradiance, the graphitic (free) carbon in SiBNC is preserved and MWCNTs in the coatings are protected.

Detailed analysis and comparison of the spectrum collected for laser-irradiated spots and as-prepared coatings provided further understanding of structural changes in the carbon structure. As shown in Table IV, for the copper disk specimen, G-band (or peaks) experienced a blue shift from ~1584 $cm^{-1}$ to ~1593 $cm^{-1}$, suggesting that the graphitic carbon or the MWCNTs experienced compressive stresses, probably due to change in volume of the surrounding ceramic matrix upon irradiation (also observed in SEM images). The calculated ratios of $I_D/I_G$ (summarized in Table IV and V) for the irradiated spots showed a linear increase with increasing laser-power density, suggesting increasing defect sites in $sp^2$-bonded graphitic carbon in the coatings. The 2-D band in the spectra was not analyzed, due to their weak intensities.

TABLE IV

Dependence of $I_D$ (intensity of D-peak) and $I_D/I_G$ (Intensity ratio of D and G peak) as observed in the Raman spectra for the disk specimen, on the incident laser irradiation power density.

| Irradiance [$kWcm^{-2}$] | D-Peak | | G-Peak | | |
|---|---|---|---|---|---|
| | Position [$cm^{-1}$] | FWHM | Position [$cm^{-1}$] | FWHM | $I_D/I_G$ |
| Unexposed | 1333.0 | 40.2 | 1584.9 | 86.4 | 0.72 |
| 4 | 1351.2 | 58.5 | 1585.2 | 56.9 | 1.04 |
| 8 | 1351.5 | 47.3 | 1587.4 | 59.3 | 1.12 |
| 12 | 1334.5 | 81.5 | 1593.0 | 71.7 | 1.43 |
| 15 | 1356.2 | 69.8 | 1592.1 | 51.4 | 1.22 |

TABLE V

Dependence of $I_D$ and $I_D/I_G$ as observed in the Raman spectra for the plate specimen, on the incident laser irradiation power density.

| Irradiance [$kWcm^{-2}$] | D-Peak | | G-Peak | | |
|---|---|---|---|---|---|
| | Position [$cm^{-1}$] | FWHM | Position [$cm^{-1}$] | FWHM | $I_D/I_G$ |
| Unexposed | 1331.7 | 42.7 | 1588.8 | 94.7 | 0.72 |
| 4 | 1335.2 | 48.1 | 1581.7 | 78.2 | 0.69 |
| 8 | 1335.2 | 71.8 | 1588.8 | 65.4 | 1.31 |
| 12 | 1333.5 | 64.8 | 1594.1 | 64.0 | 1.58 |
| 15 | 1338.8 | 97.0 | 1580.0 | 49.1 | 2.34 | c. Reflectance Measurements

Figure 26:
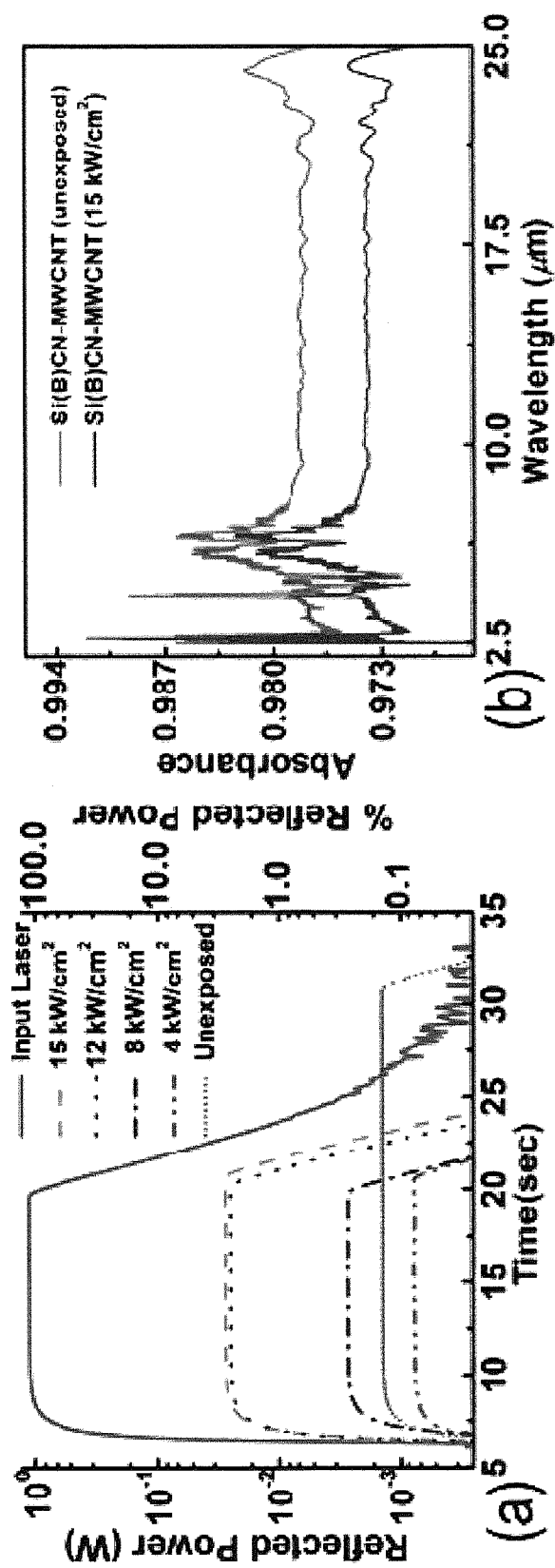
FIG. 26 shows (a) Measured reflected power profiles for the incident laser of 1.137 W at 10.6 μm wavelength from various irradiated areas on the coating for the copper disk specimen. Peak power measurements made with less than 0.5% variance. (b) Mid-IR range spectral absorption response of SiBNC-MWCNT coating before and after irradiation at 15 kWcm$^{-2}$ for 10 seconds.

The measured reflected power with reference to the incident power of 1.137 W laser (15 second pulse) is plotted against time in FIG. 26a. The reflectance from the as-prepared SiBNC-MWCNT coatings was $1.3E^{-3} \pm 2.5E^{-6}$ W, implying high optical absorption (99.87%) at 10.6 µm wavelength. Increasing magnitude of reflected power is observed from areas that were exposed to higher laser irradiance. Reflected power remained unchanged for 4 $kWcm^{-2}$ and 8 $kWcm^{-2}$ irradiated spots, while for the 12 $kWcm^{-2}$ and 15 $kWcm^{-2}$ irradiated spots showed close to 98% absorption.

Further, the adaptability of the composite coatings for longer-wavelength (mid-IR) range was studied by spectral absorption measurements. Comparison of spectral absorption signal from the as-prepared and irradiated areas (FIG. 26b) showed high absorption even at longer-wavelengths. Strikingly, even after the damage inflicted by high laser irradiance (15 $kWcm^{-2}$), the coating maintained a spectral absorption at about 0.97. Change in the chemical structure of ceramic (oxidation) may have contributed to the minute reduction in spectral response observed from the irradiated spot. None-the-less, for a broad wavelength range the absorption remained uniform, implying that the composite material preserved its ability to generate a reliable response signal.

d. X-Ray Photoelectron Spectroscopy

Figure 27:
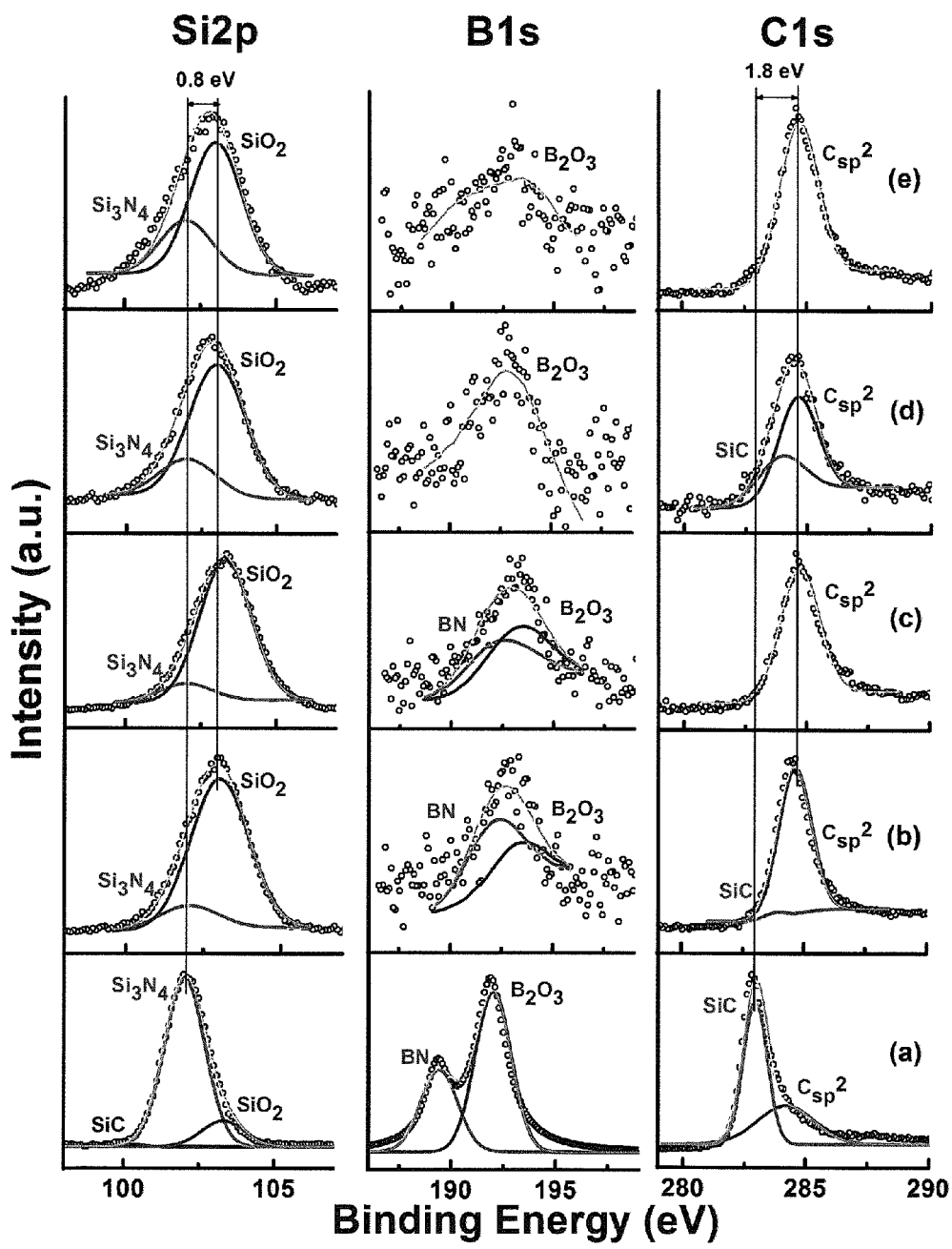
FIG. 27 shows Elemental X-ray photoelectron spectra of SiBNC-MWCNT coatings on copper plate specimen exposed to laser irradiance at (a) 0 kWcm$^{-2}$ (unexposed), (b) 4 kWcm$^{-2}$, (c) 8 kWcm$^{-2}$, (d) 12 kWcm$^{-2}$, and (e) 15 kWcm$^{-2}$ for 2 seconds, respectively.

Surface characterization consistently showed Si, B and C elemental peaks from the laser-irradiated areas. The high-resolution peaks were curve-fitted using a Gaussian-Lorentzian (70:30) mix function and are plotted in FIG. 27. The total area under each peak provided an approximation of the respective elemental and phase composition, as summarized in Table VI.

TABLE VI

Atomic composition of SiBNC-MWCNT coating for unexposed and irradiated coating areas (2 seconds exposure) for copper plate specimen obtained through XPS.

| Laser Density [$kWcm^{-2}$] | Atomic Percentage | | | | | Elemental Ratio | | |
|---|---|---|---|---|---|---|---|---|
| | Si | B | C | N | O | Si/B | Si/C | Si/O |
| Unexposed | 13.3 | 6.5 | 37.8 | 2.9 | 39.3 | 2.0 | 0.3 | 0.3 |
| 4 | 17.8 | 2.7 | 40.5 | — | 39.0 | 6.6 | 0.4 | 0.5 |
| 8 | 24.6 | 2.0 | 17.5 | — | 55.8 | 12.3 | 1.4 | 0.4 |
| 12 | 25.4 | 1.8 | 17.9 | — | 54.9 | 14.1 | 1.4 | 0.5 |
| 15 | 20.1 | 1.6 | 39.0 | — | 39.3 | 12.6 | 0.5 | 0.5 |

The deconvolution of Si2p elemental peak from the non-irradiated area showed a sharp peak corresponding to Si—N type bond (due to $Si_3N_4$ at ~102 eV) and a smaller peak at a higher energy of ~103 eV due to Si—O bond. The XPS peaks from laser-irradiated spots exhibited a higher electronegativity shift in Si peak from Si—N to Si—O type bonds. The B1s valence elemental peak in the non-irradiated and irradiated spots showed mixed existence of both B—N and B—O type bonds at ~192.1 eV and ~193.1 eV, respectively. The boron peaks in laser-irradiated spots were not clearly recognized, suggesting a decrease in the amount of surface boron. The binding energy of C1s photoelectrons (as a strong and narrow peak) at ~283.8 eV confirmed the Si—C bond assignment in the non-irradiated specimen. The XPS spectrum from the laser-irradiated areas suggests a diminishing Si—C peak and an emerging $sp^2$ free-carbon peak (at higher binding energy of ~284.6 eV). In summary, the XPS analysis confirmed that coating's composition transformed from a Si—C rich phase into a Si—O type phase upon increasing laser irradiance, while the graphitic carbon could still be observed in the coating.

3. Conclusion

In conclusion, we have demonstrated preparation of spray coatings composed of core shell SiBNC-MWCNT composite that sustain laser irradiation up to 15 kWcm$^{-2}$ at 10.6 µm for 10 seconds. Unlike some of the other coating materials reported in literature, this composite material shows both the high optical absorbance and an order-of-magnitude higher damage tolerance. The coatings exposed to incremental laser power density and exposure times were analyzed following various spectroscopic and imaging techniques. Electron microscopy revealed no major destruction i.e., burning, delamination and deformation for the disk specimen other than some isolated surface discontinuities. Raman spectroscopy suggests the survival of graphitic carbon (and carbon nanotubes) in the coating. Direct dependence of irradiation power density on $I_D/I_G$ ratio, suggests systematic evolution of $sp^a$ carbon from $sp^2$-bonded-graphitic carbon. XPS results indicate partial oxidation of $Si_3N_4$/SiC ceramic shell into stable $SiO_2$ phases and suggest its adaptable nature. Ex-situ power reflectance measurements confirmed the high optical absorbance of the coating, 99.87% for the unexposed area and 97.54% for the area that received 15 kWcm$^{-2}$ exposure. The coating material's high damage tolerance and uniform absorbance can be collectively attributed to the presence of carbon nanotubes and high oxidation resistance of SiBNC ceramic structure shell.

Example 4

Improved Electrochemical Capacity of Precursor-Derived SiBNC-Carbon Nanotube Composite as Li-Ion Battery Anode In this Example, the electrochemical behavior of SiBNC-ceramic and SiBNC coated-MWCNT composite as lithium-ion battery anodes was examined, along with the lithium cycling ability of SiBNC-MWCNT composite material. Based upon previous research, improved performance of SiBNC is attributed to the presence of boron which modifies the SiCN's nanodomain structure resulting in improved chemical stability and electronic conductivity. It is expected that the open nanodomain structure of amorphous SiBNC shell will contribute to effective Li-ion diffusion and storage, while the nanotube core will improve the availability of electrons at intercalation sites. Additionally, carbon nanotubes are expected to improve the mechanical toughness or long-term cycleability of the electrode. In order to test this hypothesis of enhanced Li-ion cycling in PDCs by boron-doping and changing pyrolysis temperatures, we studied and compared lithium cycling behavior of SiCN (@1100° C.), SiBNC (@800° C., 1100° C., and 1500° C.) and SiBNC-MWCNT composites (@800° C., 1100° C., and 1500° C.) anodes. SiBNC-MWCNT anodes processed at 1100° C. demonstrated a stable cycling performance with the highest reversible capacity and least first cycle loss Reversible capacity of SiBNC was observed to be 138 mAh/g after 30 cycles, which is four times that of SiCN (~25 mAh/g) processed under similar conditions, while the SiBNC-MWCNT composite showed further enhancement, demonstrating 412 mAh/g after 30 cycles. Post-cycling microscopy and chemical analysis of the anode revealed formation of a stable passivating layer, which resulted in stable cycling.

1. Experimental Procedure a. Material Preparation.

Polymer-derived SiBNC ceramic and SiBNC-MWCNT composite were prepared through controlled pyrolysis of a boron-modified polysilazane precursor prepared according to procedures reported above. Briefly, polyurea(methylvinyl)silazane (Ceraset™, Clariant) was modified using trimethyl borate (Sigma Aldrich, 99.9%) to obtain polyborosilazane precursor. The precursor was then mixed with approximately 15 wt. % MWCNTs (Bayer AG), which was followed by crosslinking at 400° C. for 2 hours and pyrolysis at various temperatures (~800, ~1100 or ~1500° C.) for 4 hours in flowing nitrogen resulting in formation of SiBNC-MWCNT shell/core composites. The SiCN ceramic was prepared by cross-linking and pyrolysis of polyureamethylvinylsilazane at 400° C. and 1100° C., respectively. The active materials were ground into fine powders using a mortar/pestle before use.

b. Instrumentation

Structural characterization of the synthesized material and the battery anode was performed using a 10 kV Carl Zeiss EVO Low-Vacuum SEM (Peabody, Mass.). Chemical composition of the specimen's surface was analyzed by X-ray photoelectron spectroscopy (XPS) using PHI Quantera SXM (Physical Electronics Inc. Chanhassen, Minn.) with monochromatic Al Kα X-radiation. Electrical conductivity measurements were carried out using a customized four-point probe setup and Keithley 2636A (Cleveland, Ohio) dual channel sourcemeter in the ohmic region. Electrochemical cycling of the assembled cells was carried out using multichannel Battery Test Equipment (Arbin-BT2000, Austin, Tex.) at atmospheric conditions.

c. Half-Cell Assembly and Testing

The working electrodes (anodes) were prepared by mixing the fine-powdered active material (SiBNC, SiCN or SiBNC-MWCNT) with acetylene black, and polyvinyl diflouride binder (1-methyl-2-pyrrolidinone) in a weight ratio of 8:1:1. Approximately 1 to 2 mg/cm$^2$ of the active material was then applied on the copper current collector foil by use of a doctor's blade and a film applicator. The coated foil was then dried at 100° C. for 12 hours in an inert environment before using it as anode. The 2032-type cells were assembled, crimped and closed in a Argon filled glovebox. A 24-µm thick monolayer insulating membrane (Celgard) acted as the separator and approximately 1 mL electrolyte solution of 1M LiPF$_6$ (Alfa Aesar) dissolved in (1:1 v/v) dimethyl carbonate:ethylene carbonate was used as the electrolyte. Pure lithium metal acted as both the counter and reference electrode. The cells were tested in the voltage range of 10 mV to 2.5 V or 3 V at either 50 or 100 mA/g during both discharge and charge half cycles. For the post-test characterization, the cells were disassembled inside the glovebox and the anodes were washed several times with dimethyl carbonate (DMC) to get rid of any excess electrolyte.

d. Electrical Conductivity

Figure 28:
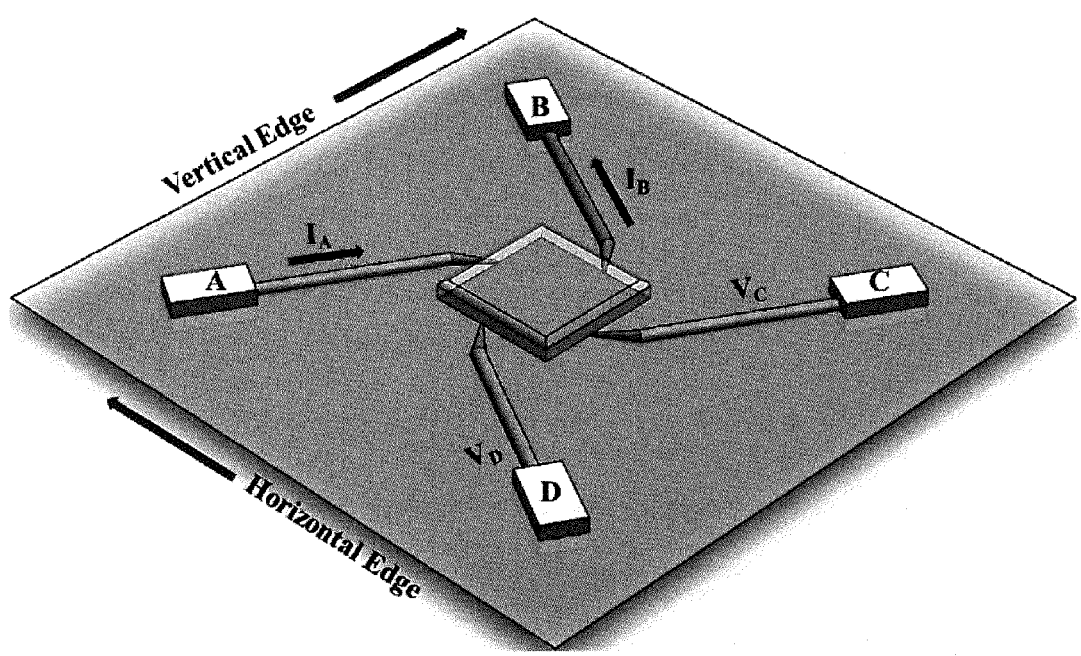
FIG. 28 shows the experimental setup for the 4-point resistivity measurements in Example 4.

Electrical conductivity was measured using a four point setup previously described by Van der Pauw (13 *Philips Res. Repts.* (1958)) (FIG. 28). The specimen pellets used for these measurements were formed by cold pressing (4 ksi) the specimen powder for 30 seconds without using binder, conducting agent or other additives. The measurements were recorded in the ohmic region. Step 1: Primary measurement: $R_{AB,CD}$ was defined as the resistance measured with current supplied between points A and B and consequently measuring the potential across points C and D. The following calculations were made according to the Ohm's law:

$$R_{AB,CD} = V_D - V_C / i_{AB}$$

$$R_{BC,DA} = V_A - V_D / i_{BC}$$

Step 2: Reciprocal measurements: ideally as $R_{AB,CD} = R_{CD,AB}$, the resistances measured along the edges of the samples were averaged for higher accuracy. Hence:

$$R_{edge1} = (R_{AB,CD} + R_{CD,AB})/2$$

$$R_{edge2} = (R_{BC,DA} + R_{DA,BC})/2$$

Step 3: Reverse polarity measurements: For attaining higher precise measurements, the polarity at each points were reversed both at the current source and voltage measurement terminals. Hence:

$$R_{edge1} = (R_{AB,CD} + R_{BA,DC} + R_{CD,AB} + R_{DC,BA})/4$$

$$R_{edge2} = (R_{BC,DA} + R_{CB,AD} + R_{DA,BC} + R_{AD,CB})/4$$

Finally, for the known thickness of the sample 'd', the resistivity is defined as:

$$\rho = \left(\frac{\pi d}{\ln 2}\right)\frac{R_{edge1} + R_{edge2}}{2} \cdot f,$$

where 'f' is defined as the function of the measured resistances.

2. Results and Discussion
a. Electrochemical Cycling Results

FIG. 29a represents the first two-chronopotentiometric intercalation and deintercalation cycles of SiCN-1100 ceramic (complete polymer to ceramic conversion does not take place until 1000° C. and hence 1100° C. was the temperature of choice). The first cycle discharge and charge capacities were 99.4 mAh/g and 13.2 mAh/g that dropped to 25.9 mAh/g and 16.5 mAh/g, respectively in the second cycle. This drop in electrochemical capacity is typical of SiCN prepared from the polyureasilazane (Ceraset™) precursor. Thus, resulting in a very high first cycle loss (ICL) of 86.6% with a voltage hysteresis of 0.77 V. While the SiBNC-1100° C. ceramic specimen synthesized and cycled under similar conditions (FIG. 29c), showed a higher first discharge (241.9 mAh/g) and charge (98.5 mAh/g) capacities with a first cycle loss of 59.3%. The SiBNC-MWCNT-1100° C. composite anode showed further enhancement in the electrochemical capacity as compared with SiBNC and SiCN processed under similar conditions (FIG. 29e). A high reversible capacity (312.1 mAh/g) and relatively low first cycle loss (45.5%) were observed.

Figure 30:
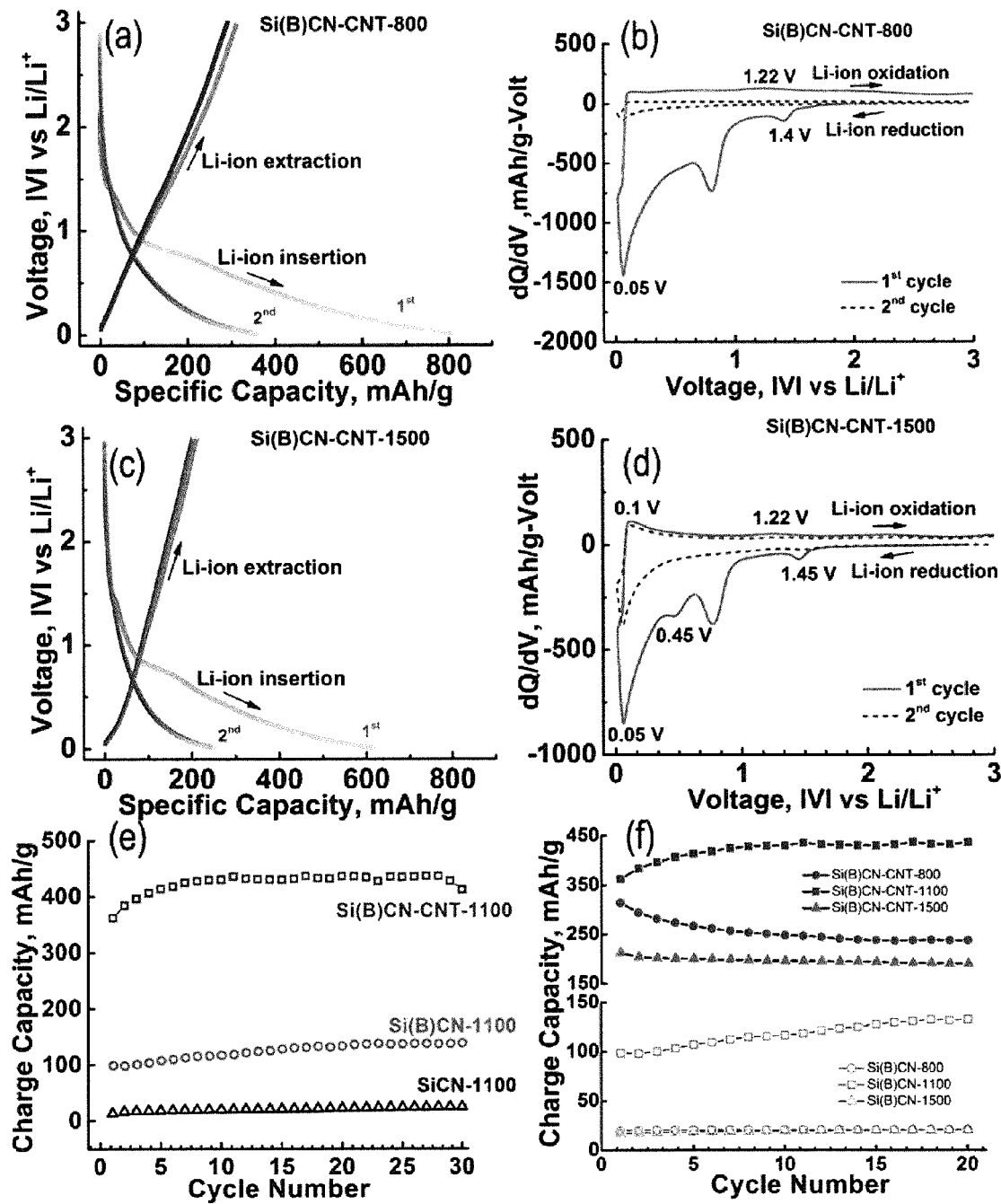
FIG. 30 shows the first two electrochemical voltage profiles and corresponding differentiated capacity with respect to the voltage for (a-b) SiBNC-CNT-800, (c-d) SiBNC-CNT-1500. Comparison of charge (reversible) capacity versus the cycle number for: (e) for SiCN-1100, SiBNC-1100 and SiBNC-CNT-1100 anodes, and (f) various SiBNC anodes showing the effect of pyrolysis temperature (20 cycles only)

The results were also the best when compared with other SiBNC-MWCNT specimen i.e., those processed at 800° C. and 1500° C., respectively (FIG. 30). The dependence of electrochemical capacity on specimen pyrolysis temperature is similar to and is in agreement with recent electrochemical studies on SiCN and SiOC ceramics. The SiBNC-MWCNT-1100° C. anode also showed higher reversible capacity and better capacity retention when compared to some other PDC-based anodes reported in the literature such as C-rich SiCN (reversible capacity of ~263 mAh/g) and SiCN/graphite (reversible capacity of 374 mAh/g).

The initial cycle capacity values and other critical evaluation parameters like the first cycle loss and capacity retention for SiCN and SiBNC anodes are summarized in Table VII.

TABLE VII

Summary of electrochemical cycling data for various specimens.
The error in the measurements is ±0.1%.

| specimen | 1st discharge capacity (mAh/g) | 1st charge capacity (mAh/g) | first cycle loss (%) | charge capacity at (nth cycle) |
|---|---|---|---|---|
| SiCN-1100 | 99.4 | 13.2 | 86.6 | 24.8 (30) |
| Si(B)CN-800 | 52.8 | 19.5 | 63.1 | 20.7 (20) |
| Si(B)CN-1100 | 241.9 | 98.5 | 59.3 | 138.2 (30) |
| Si(B)CN-1500 | 48.1 | 16.5 | 65.7 | 20.2 (20) |
| Si(B)CN-CNT-800 | 815.4 | 314 | 61.5 | 237.3 (20) |
| Si(B)CN-CNT-1100 | 768.1 | 361.9 | 52.9 | 412.1 (30) |
| Si(B)CN-CNT-1500 | 613.5 | 212.4 | 65.4 | 190.7 (20) |

Figure 29:
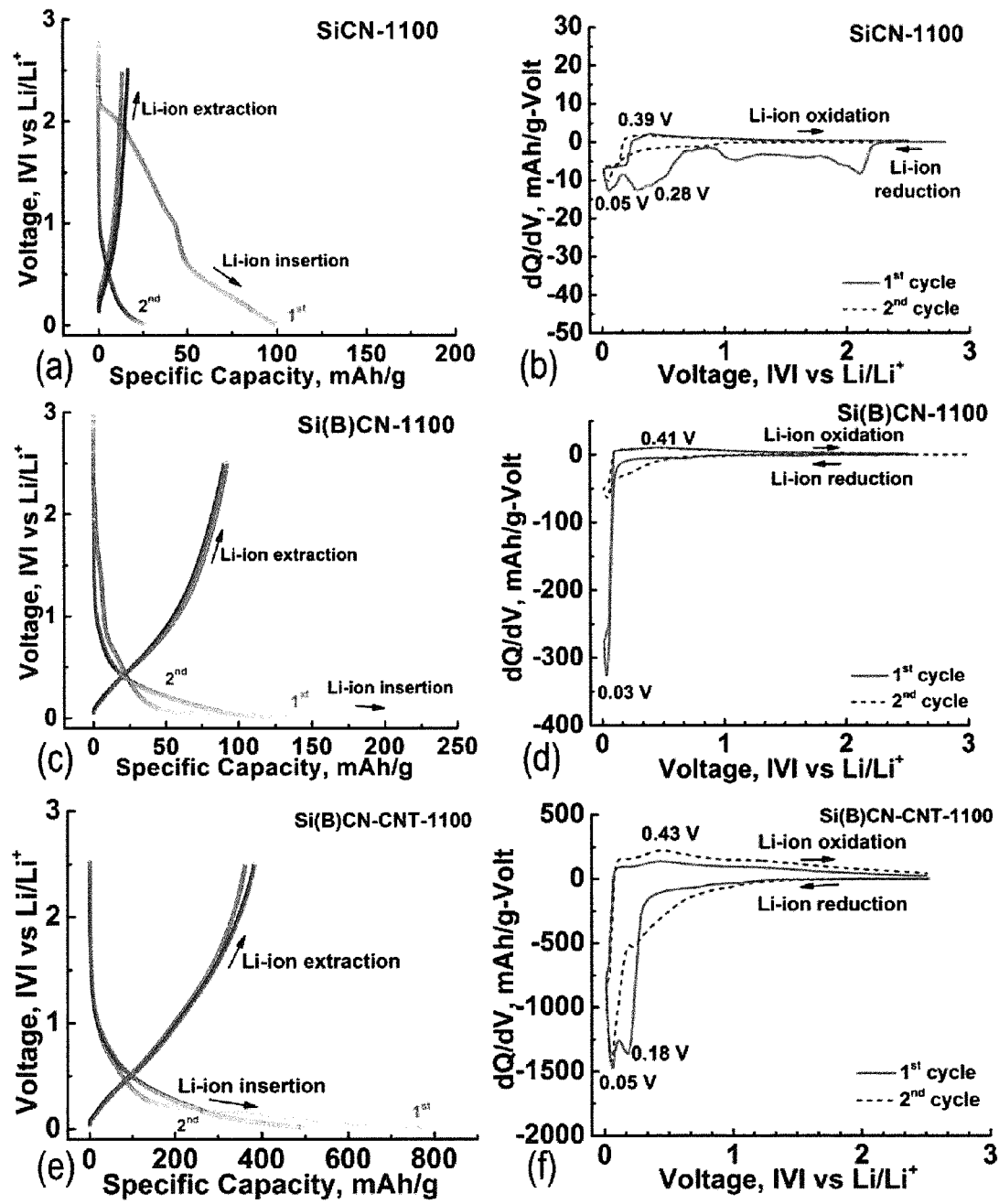
FIG. 29 shows first and second electrochemical intercalation and deintercalation cycles and corresponding dQ/dV plots for (a)-(b) SiCN-1100° C., (c)-(d) SiBNC-1100° C., and (e)-(f) SiBNC-MWCNT-1100° C.

Differentiated capacity with respect to voltage (dQ/dV) plots for SiCN, SiBNC and various SiBNC-MWCNT specimen are plotted in FIGS. 29 (b, d, e) and FIGS. 30(b and d). A dQ/dV peak position signifies the amount of Li-ions diffusing in or out of the host material at a given voltage. For SiCN anode first cycle (FIG. 29b), major reduction peaks at ~50 mV and ~0.28 V suggests Li-ion intercalation in SiCN pores and free or graphitic carbon entities in SiCN ceramics, respectively. The weak peak at 50 mV reappears in the second cycle. A small oxidation peak at ~0.39 V was also observed for both first and second cycles. While for SiBNC anode (FIG. 29d), one strong reduction peak at ~30 mV indicate single reduction energy state for both first and second intercalation cycles.

For all SiBNC-MWCNT specimens, dQ/dV plot showed multiple Li-ion reduction peaks majorly at ~50 mV, ~0.45 V and ~0.8 V (FIG. 29f and FIG. 30b, d). As observed in FIG. 29d, reduction peak at ~50 mV is attributed to SiBNC ceramic, whereas the peaks at 0.45 V and 0.8 V suggests existence of multiple intercalation phases. The additional peak observed for 800° C. and 1500° C. specimens at ~1.45 V, could have originated due to the presence of hydrogen (800° C.) or crystalline nature (1500° C.) of the specimen. Broad peaks suggest availability of multiple Li-ion intercalation phases in the ceramic host material.

Figure 31:
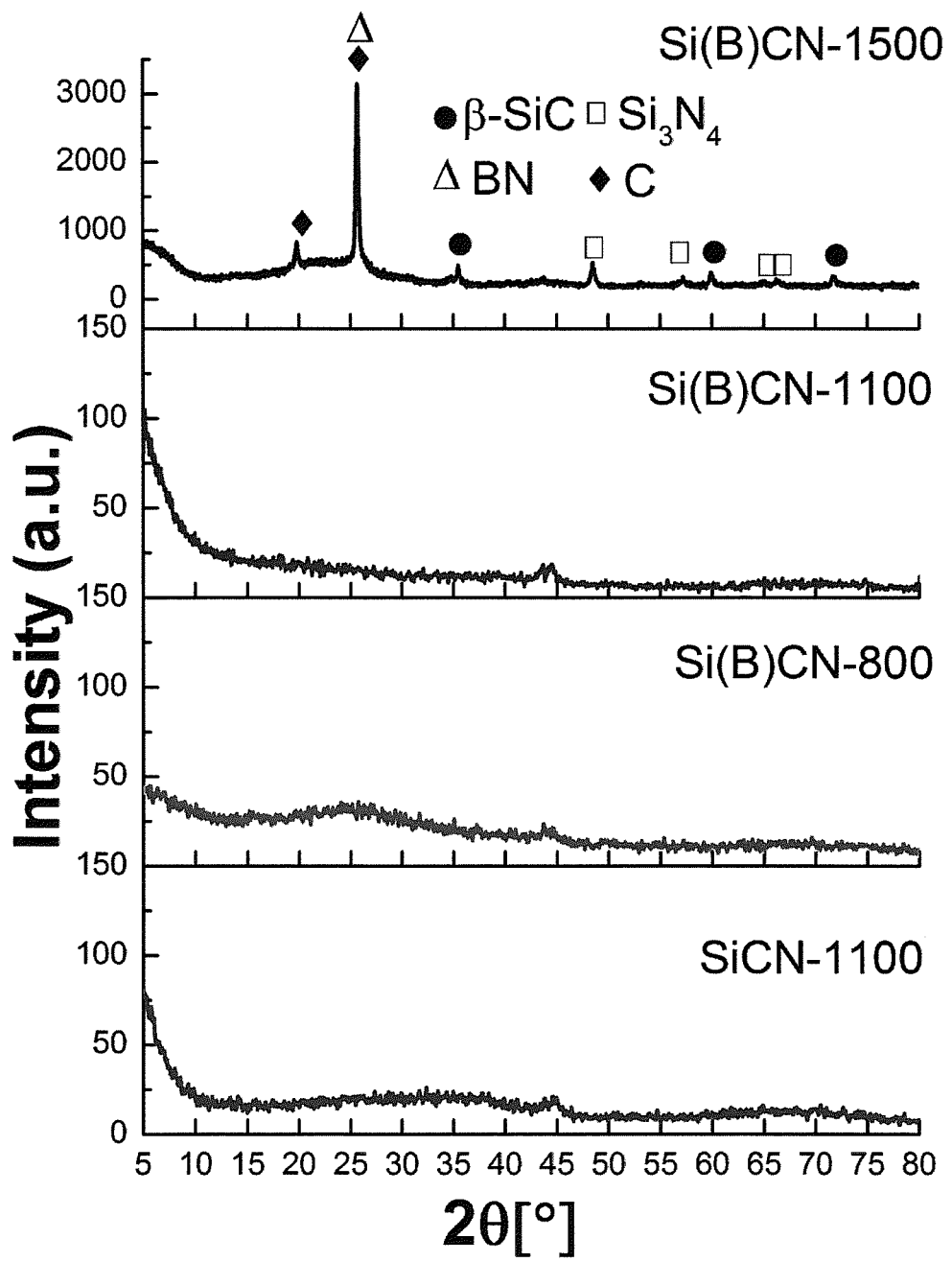
FIG. 31 shows the X-ray diffraction data for various SiBNC and SiCN pellet specimen, confirming the amorphous nature of the precursor-derived SiBNC ceramic for temperatures below 1500° C.
Figure 32:
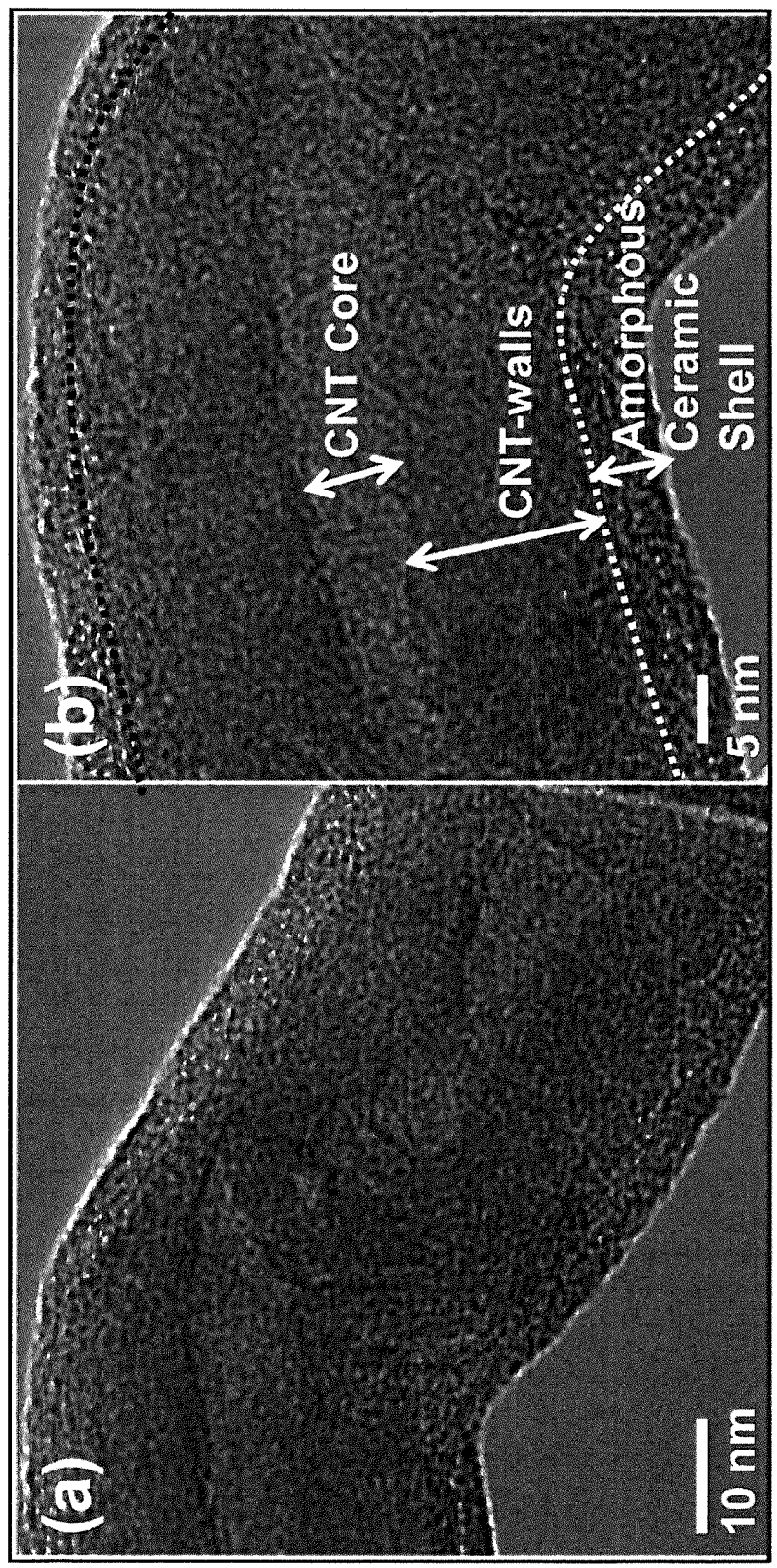
FIG. 32 shows high resolution TEM images of the SiBNC-CNT-1100 composite showing the shell/core morphology.

The variation in electrochemical cycling with changing pyrolysis temperature (FIG. 29e and FIGS. 30 (a, c)), implies its dependence on molecular arrangement of ceramic constituents. This is not surprising since chemical co-ordinations in PDCs have been known to depend on the pyrolysis temperature of the precursor. Pyrolysis at 800° C. have been known to result in a mix of organic and inorganic compounds along with the presence of excess hydrocarbons. While, pyrolysis in the temperature range of 1000 to 1400° C. results in the formation of quaternary silicon possessing mixed bonds tetrahedral (Si—C—N), $sp^2$ bonded carbon chains and turbostratic B(C)N domains. The electrochemical performance can be thus be correlated with the carbon structure in the specimens. The presence of soft, disordered or hydrogenated carbon could be responsible for lithium ion irreversibility for the specimen synthesized at 800° C. While for the specimen pyrolyzed at 1500° C. or higher temperatures, SiBNC starts to undergo phase separation forming crystalline domains of $Si_3N_4$, SiC and BN that are inactive to lithium cycling. This was confirmed by XRD analysis of the specimens using a Bruker powder X-ray diffractometer (Madison, Wis.) using Cu-Kα radiation and a nickel filter (FIG. 31), as well as TEM imagines of the specimen morphology (FIG. 32). Additionally, the abundance of dangling Si bonds for the 800° C. specimen as compared to the 1100° C. specimens results in higher first cycle discharge capacity and higher irreversibility. Hence, the 800° C. specimen (mostly disordered carbon) or crystalline nature of 1500° C. specimen (with turbostratic carbon or B(C)N) results in lower reversible electrochemical capacity and performance than the 1100° C. specimen.

Figure 33:
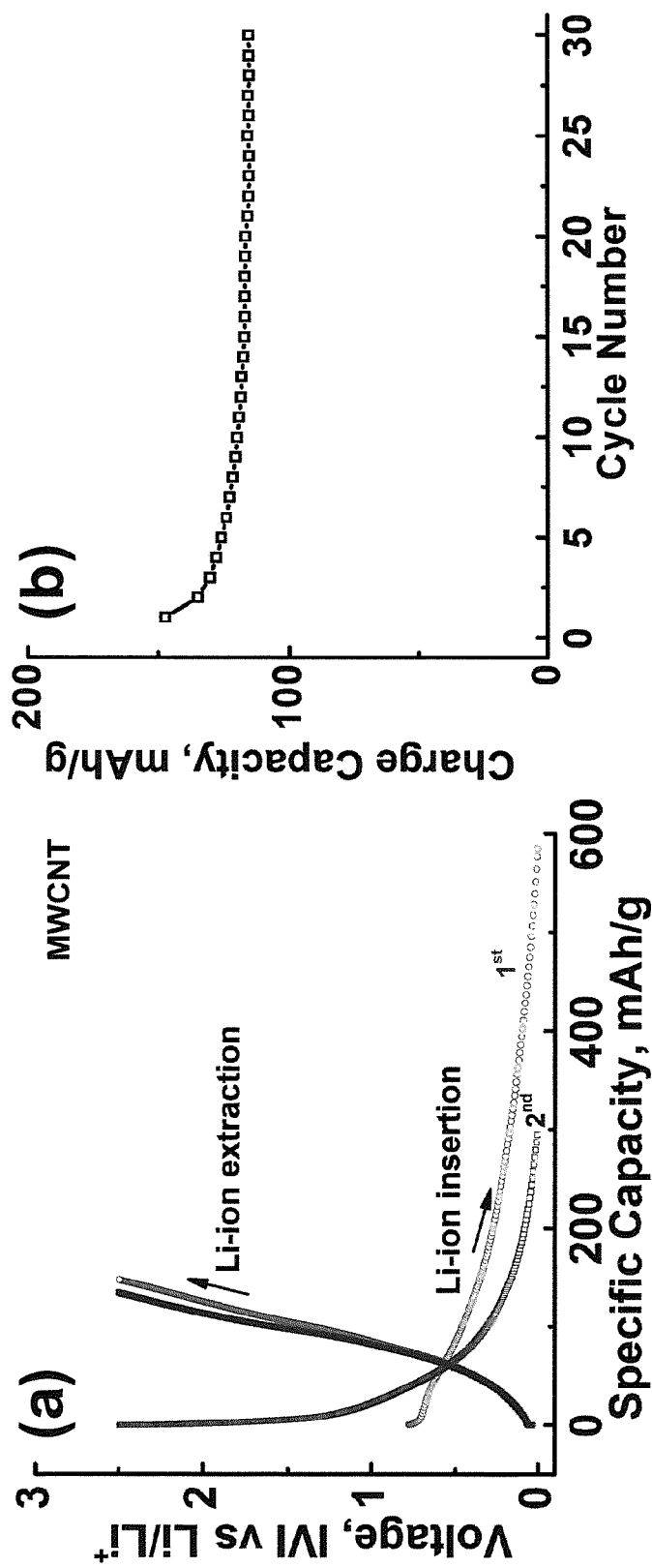
FIG. 33 shows (a) First and second charge/discharge cycles for the MWCNT anode, cycled at 100 mA/g, and (b) Charge capacity for the first 30 cycles for MWCNT anode.

The comparison of Li-ion reversible capacities of SiCN-1100, SiBNC-1100° C. and SiBNC-MWCNT-1100° C. specimens tested for 30 cycles are shown in FIG. 30e. Although the electrochemical capacities for SiCN-1100° C. and SiBNC-1100° C. specimens were low, they retained the initial reversible capacity even after 30 cycles with more than 90% cyclic efficiency. We also studied the electrochemical performance of MWCNT anode (prepared and cycled under similar conditions) for comparison purposes, the results of which are shown in FIG. 33. The MWCNT anode showed a low first cycle charge capacity of ~147.2 mAh/g (with a first cycle loss of 74.82%), which decreased further to ~115.24 mAh/g after 30 cycles.

The effect of pyrolysis temperature on the long-term cycling performance of SiBNC-MWCNT specimens is presented in FIG. 30f (Please note that data for the 1100° C. specimens is repeated here for ease of comparison). It is apparent that inclusion of boron in SiCN ceramic results in both higher reversible capacity and better capacity retention. Further, the ab-initio approach of blending CNTs with ceramic precursor to form a core shell structure (FIG. 32) results in better performance on all critical performance parameters.

Galvanostatic Intermittent Titration Technique (GITT) was performed to get an approximation of the solid state Li-ion diffusion coefficient $(D_{Li})$ for SiBNC-MWCNT-1100° C. anode (best performing anode). The solid state lithium ion diffusion coefficients were determined using $$D_{GITT} \approx \frac{4}{\pi\tau}\left(\frac{m_B V_M}{M_B S}\right)^2 \left(\frac{\Delta E_s}{\Delta E_t}\right)^2$$

Figure 34:
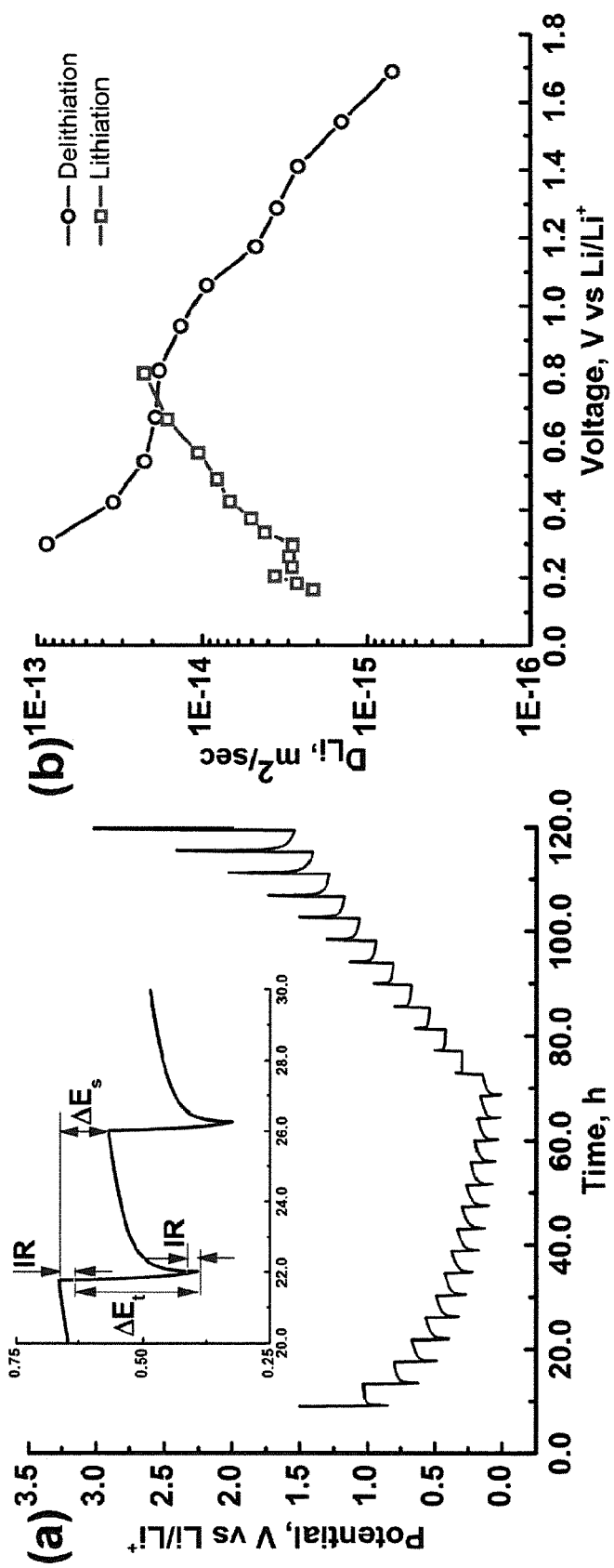
FIG. 34 shows the GITT Data: (a) Charge and discharge cycles with 15 minutes of current pulse at 100 mA/g followed by 4 hours of relaxation for SiBNC-CNT-1100 specimen and (b) calculated diffusion coefficient based on the relaxation steps at the corresponding voltages.

Where, $m_B$, $V_M$, $M_B$ and S are electrode mass, molar volume, molecular weight and surface area, respectively. T is the time over which the constant current pulse is applied and $\Delta E_s$ and $\Delta E_t$ are voltage steps as shown in FIG. 34. The GITT experiment was carried out on the best performing anode (i.e., SiBNC-CNT-1100). A current pulse of 100 mAg$^{-1}$ was applied to the electrode for 15 min followed by a 4 hour of relaxation between pulses (until equilibrium is realized) during both lithiation and delithiation. The diffusion coefficient $(D_{Li})$ was thus calculated by taking the weight of active material on anode (2.5 mg), molecular weight (based on XPS elemental composition, 147.8 g/mol), molecular volume (64.2 cm$^3$/mol), and surface area (1.6 cm$^2$). The calculated $D_{Li}$ varied between $10^{-13}$ and $10^{-16}$ m$^2$/sec during intercalation and extraction (as can be seen in FIG. 34). These values are in the similar range as polymer-derived SiOC anodes. Whereas for silicon anodes, $D_{Li}$ has a range of $(10^{-17}$ to $10^{-14})$ m$^2$/sec.

The electrical conductivity measurements for the SiBNC pellets specimens synthesized at 800° C., 1100° C. and 1500° C. were $1\times10^{-4}$ S/cm, $8.7\times10^{-4}$ S/cm and $1.3\times10^{-2}$ S/cm, respectively. Increased conductivity was observed for SiBNC-MWCNT powdered specimens synthesized at 800° C., 1100° C. and 1500° C., which were $7.6\times10^{-3}$ S/cm, $2.3\times10^{-2}$ S/cm and $1.2\times10^{-1}$ S/cm, respectively. Whereas the measuring instrument was found insensitive to SiCN-1100 pellet specimen, but reasonable room temperature conductivity of $\sim10^{-7}$ S/cm have been reported elsewhere that can be used for comparison purposes. For the dispersed (and dried) MWCNT pellet specimen, the electrical conductivity was approximately 0.25 S/cm. Thus, the increased electrical conductivity seems to influence the enhanced performance of SiBNC-MWCNT than SiBNC and SiCN, as easier flow of electrons in the electrode microstructure is desirable for easier and efficient Li-ion anode cycling.

b. Post-Electrochemical Cycling Characterization

Figure 35:
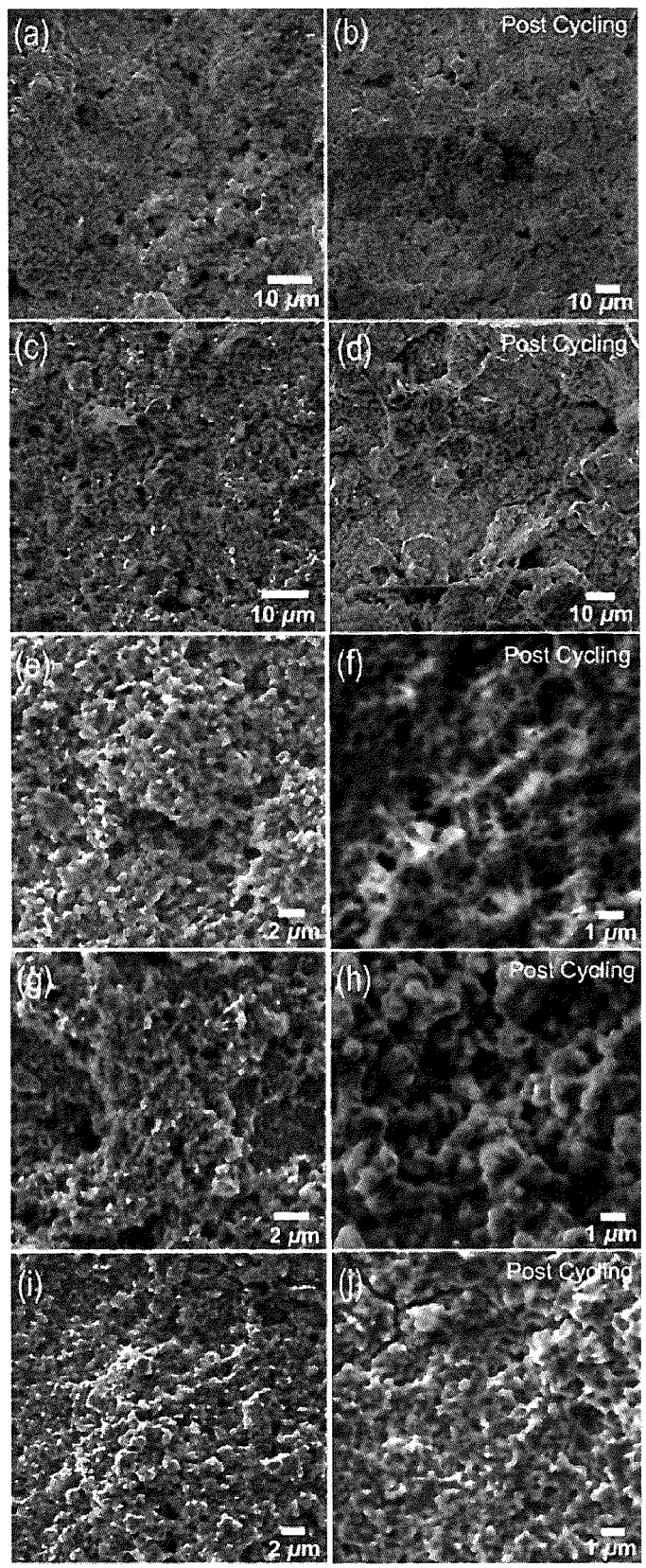
FIG. 35 shows a comparison of SEM images of "as-prepared" anodes with the cycled anodes (disassembled in delithiated state) for (a, b) SiCN-1100 (after 30 cycles), (c, d) SiBNC-1100 (after 30 cycles), (e, f) SiBNC-CNT-800 (after 20 cycles), (g, h) SiBNC-CNT-1100 (after 30 cycles), and (i, j) SiBNC-CNT-1500 (after 30 cycles)

The cycled cells were dissembled and the anodes were recovered for post-electrochemical cycling analysis. SEM imaging was performed for SiCN, SiBNC and SiBNC-MWCNT anodes and their surface morphology was compared with their respective precycled anodes (FIG. 35). Precycled SiCN and SiBNC anodes exhibited a particle (size <500 nm) like morphology. Interconnected particles with sponge like (fluffy) carbon black were also observed. The SiBNC-MWCNT anodes were porous with a matrix like appearance.

Remarkably, all cycled anodes were largely intact with no obvious signs of delamination or pulverization. Unlike bulk silicon or thin films, where lithium cycling results in surface cracks due to volume expansion, absence of surface cracks in these anodes suggested very stable cycling with minimal structural changes. The cycled SiBNC-MWCNT-800° C., exhibited amorphous (soft) porous coating, whereas the cycled SiBNC-MWCNT-1500° C. specimen showed the formation of a few surface cracks. The SiBNC-MWCNT-1100° C. specimen showed the firmly integrated structure corroborating the best electrochemical performance results shown earlier. Presence of SEI (solid electrolyte interphase) layer looked more prominent on the SiBNC-MWCNT electrode surface than on either SiCN or SiBNC anodes, as could be seen in the post-cycling SEM images.

A summary of the surface elemental composition of the specimens from the XPS survey is provided in Table VIII below.

TABLE VIII

Summary of surface elemental composition of various specimen (atomic percent) used in this study. All atomic percentage measurements are accurate up to approximately 15 percent.

| specimen | Si | B | C | N | O |
|---|---|---|---|---|---|
| Si(B)CN-800 | 24.9 | 4.6 | 32.4 | 19.8 | 18.4 |
| Si(B)CN-1100 | 24.4 | 6.1 | 24.6 | 19.5 | 25.4 |
| Si(B)CN-1500 | 23.2 | 5.5 | 19.7 | 14.3 | 37.4 |
| Si(B)CN-CNT-800 | 13.8 | 18.2 | 37.1 | 17.8 | 13 |
| Si(B)CN-CNT-1100 | 9.9 | 6.5 | 52.9 | 2.9 | 27.7 |
| Si(B)CN-CNT-1500 | 7.9 | 17.7 | 39.9 | 27 | 7.5 |

Figure 36:
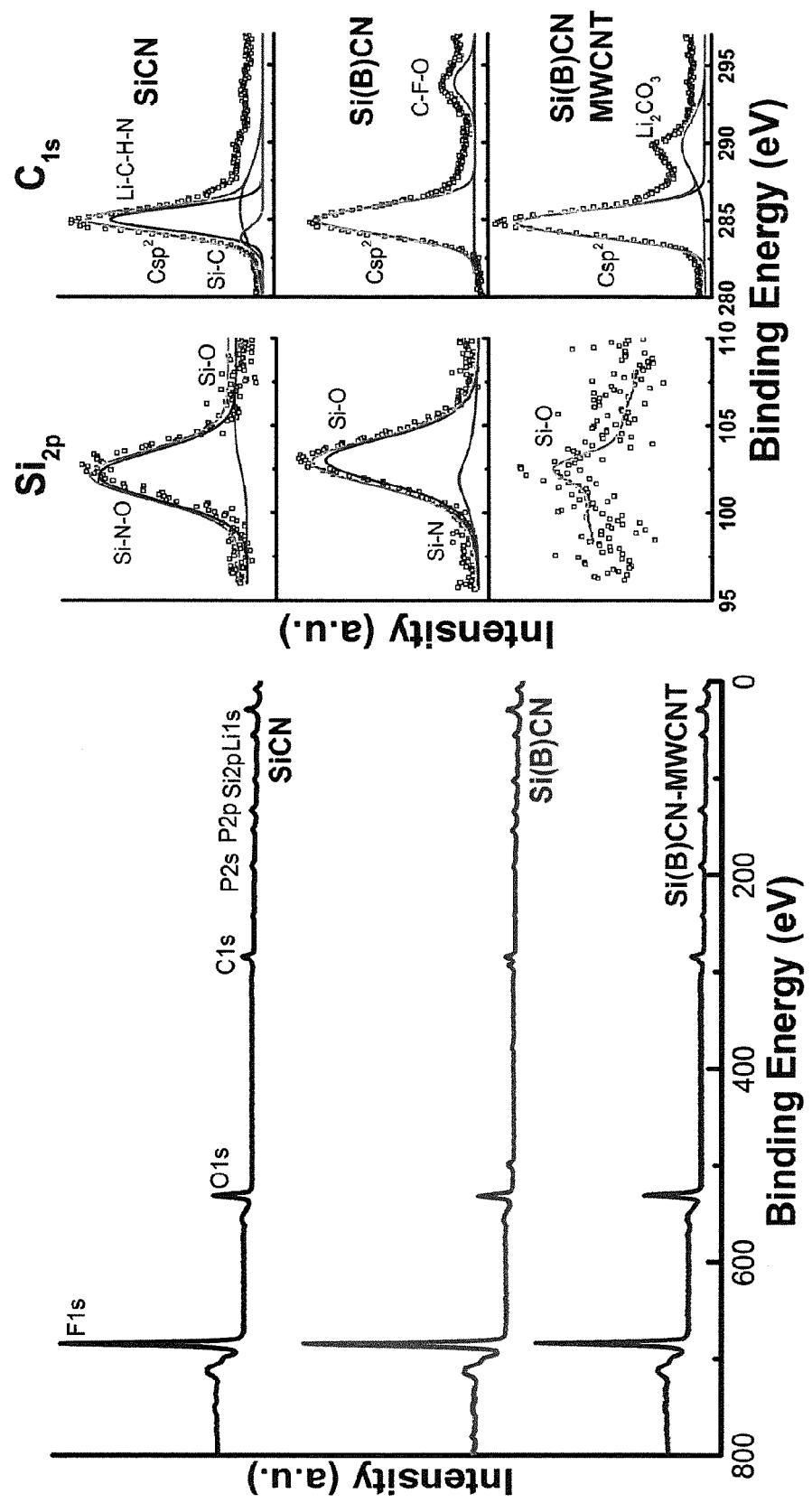
FIG. 36 shows (a) Elemental survey (LEFT) and (b) High resolution scan (RIGHT) for SiCN-1100, SiBNC-1100, and SiBNC-CNT cycled anode specimens.

XPS survey scan performed on dissembled SiCN-1100, SiBNC-1100 and SiBNC-MWCNT-800 anodes, revealed presence of Si, C, Li, O, F and P elements (see FIG. 36). As shown in FIG. 36, for the SiCN anode, the Si2p elemental peak observed at ~102.5 eV can be deconvoluted into peaks at 103.2 eV and 102.1 eV due to Si—O and Si—N—O type bonds, respectively. The C1s peak at ~285 eV can be assigned to peaks at 285.7 eV, 285 eV and 283.8 eV due to sp² carbon, Li—C—H—N, and Si—C, respectively. For the SiBNC anode, the sharp peak at ~102.5 eV can be fitted by two peaks at 103 eV (Si—O) and 101.9 eV (Si—N). While the lower energy peak in C1s scan at ~284.9 eV is assigned to sp² bonded carbon and the higher energy peak at 293.7 eV is most likely due to the C—F—O bonds from the SEI layer. The Si2p elemental scan for the SiBNC-MWCNT anode showed a less intense peak at ~102.5 eV which can originate from Si—O—N type bonds. The lower energy peak in the C1s scan at ~284.8 eV is assigned to sp² bonded carbon whereas the higher energy peak at ~289.8 eV is due to $Li_2CO_3$ most likely from SEI layer that gets formed on the anode's surface. Based on the post-cycling imaging and XPS analysis, it is safe to assume that formation of a stable SEI layer on the anode surface was another reason for the stable Li-cycling observed in the SiBNC-MWCNT-1100 specimen.

3. Conclusion

SiBNC ceramic derived from controlled thermal decomposition (pyrolysis) of boron-modified polyureasilazane showed improved Li-ion storage ability and sustained capacity when utilized as battery anode. Further, nanocomposites prepared by inclusion of CNTs in liquid phase polymeric precursor resulted in core-shell SiBNC-MWCNT morphology, which further enhanced the electrochemical capacity by four folds. This improved behavior is attributed to the structurally porous and thermodynamically stable SiBNC shell and electrically conducting CNT core.

Example 5

Ceramic CNT Paper

Figure 37:
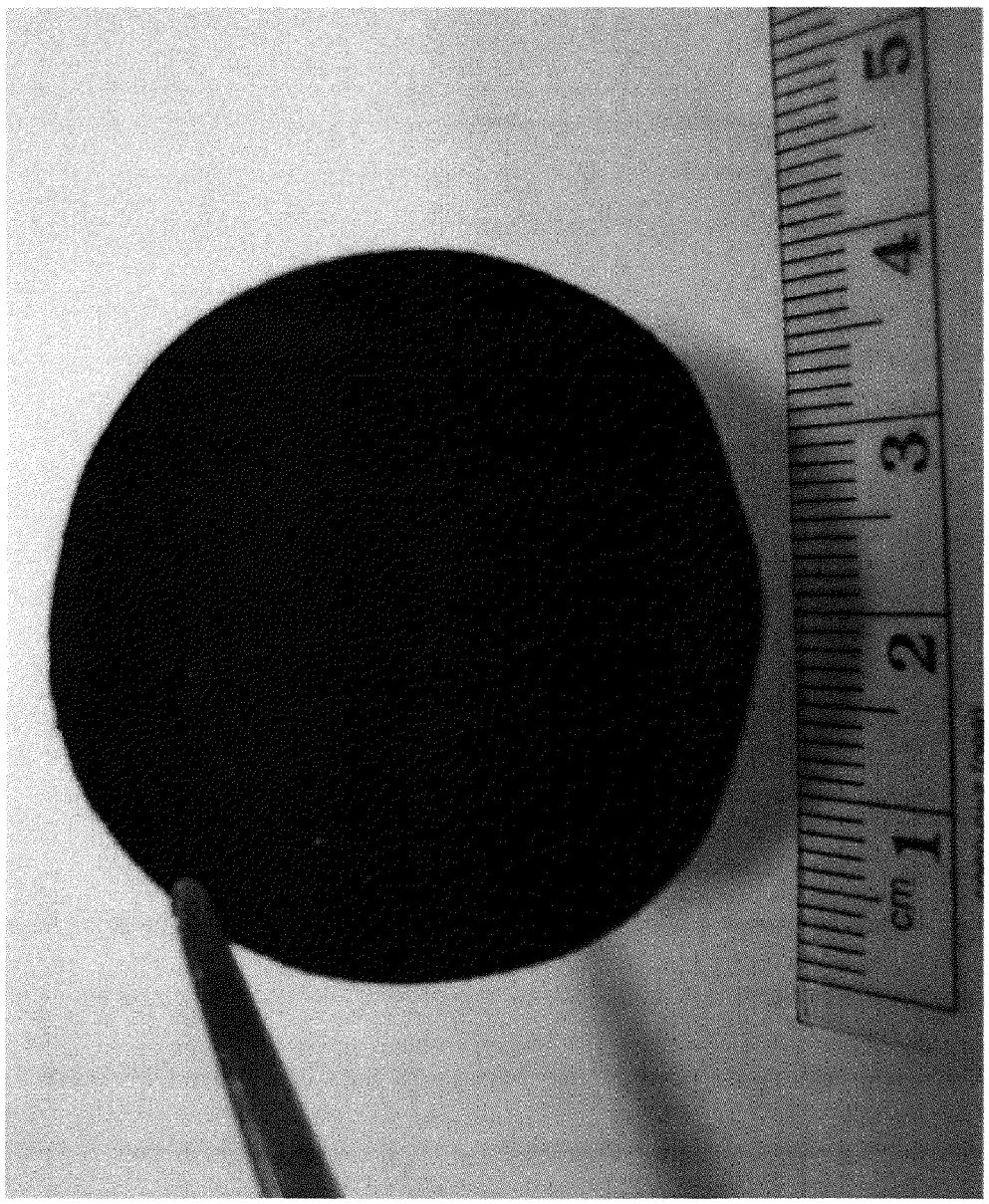
FIG. 37 is a photograph of the SiBNC-CNT freestanding paper composite prepared in Example 5.

In this Example, The CNT paper was first prepared by dispersing MWCNTs in deionized water. The dispersed liquid was then vacuum filtered using a 10-μm filter (Millipore LC type) and subsequently cleaned three times with 100 ml deionized water. The paper was peeled off from the filter followed by drying. The dried CNT paper was then coated with boron-modified silazane liquid polymer. Sufficient polymer penetration and soaking inside the CNT paper was ensured by visual observation. The boron-modified silazane polymer was then crosslinked, followed by pyrolysis to yield the ceramic CNT paper. A photograph of the resulting free-standing, boron-modified ceramic CNT paper is shown in FIG. 37.

We claim:

1. A boron-modified silazane useful as a polymeric precursor for a polymer-derived ceramic, wherein said boron-modified silazane is a room temperature liquid-phase polymer.

2. The boron-modified silazane of claim 1, wherein said boron-modified silazane comprises a backbone having recurring monomeric repeat units comprising boron-nitrogen bonds.

3. The boron-modified silazane of claim 2, wherein said monomeric repeat units further comprise boron-oxygen bonds.

4. The boron-modified silazane of claim 2, said monomeric repeat units comprising alternating silicon and nitrogen atoms in said backbone, wherein said boron-nitrogen bonds are selected from the group consisting of:
   boron pendant from said nitrogen in said backbone;
   boron-substituted nitrogen groups pendant from said silicon in said backbone; and
   combinations thereof.

5. The boron-modified silazane of claim 2, wherein said monomeric repeat units comprise —Si—N—B(R₅)₂ bonds, where each $R_5$ is individually —$OCH_3$ or —$C_2H_4Si(R)H$, where R is —H or —$CH_3$.

6. A structure comprising:
   a substrate having a surface; and
   a layer of a polymer-derived ceramic adjacent said substrate surface, said polymer-derived ceramic formed from a boron-modified silazane according to claim 1.

7. The structure of claim 6, said ceramic further comprising a plurality of nanofillers dispersed therein.

8. The structure of claim 6, wherein said layer of ceramic is formed from a powder coating comprising said boron-modified silazane and a plurality of nanofillers, wherein said boron-modified silazane is bonded with said nanofillers.

9. The structure of claim 6, wherein said layer is resistant to:
   oxidation in flowing air at a temperature of up to about 1000° C.; or
   laser irradiation up to about 15 kWcm⁻² at a wavelength of about 10.6 μm, for about 10 seconds without burning, delamination, or deformation of said layer.

10. The structure of claim 6, wherein said substrate is selected from the group consisting of metal and non-metallic: natural or synthetic woven or non-woven cloth, carbon nanotube mats, cellulose mats, fibers, wires, tubing, pump shafts, cylinders, spindles and/or sleeves, induction coils, and combinations thereof.

11. A nanocomposite comprising:
   a plurality of carbon nanotubes having respective sidewalls; and
   a layer of a polymer-derived ceramic adjacent said sidewalls, said ceramic being formed from a boron-modified silazane according to claim 1, wherein said polymer-derived ceramic is bonded to said sidewalls forming a protective shell thereon.

12. The nanocomposite of claim 11, wherein said nanocomposite is resistant to oxidation in flowing air at a temperature of up to about 1000° C.

13. The nanocomposite of claim 11, wherein said nanocomposite is selected from the group consisting of nanowires, nanorods, nanosheets, and combinations thereof.

14. A method of making a boron-modified silazane, said method comprising forming a reaction mixture comprising trimethyl borate and a room temperature liquid-phase silazane, and mixing under ambient conditions for at least about 12 hours, wherein said reaction mixture is optionally heated from room temperature up to about 85° C. during said mixing such that said mixture is dried during said mixing.

15. The method of claim 14, wherein said reaction mixture further comprises a nanofiller selected from the group consisting of carbon nanotubes, metal nanoparticles, graphene ribbons, molybdenum disulfide, carbon fiber, 2-D nanosheets, fullerenes, and mixtures thereof.

16. The method of claim 14, wherein said room temperature liquid-phase silazane comprises monomeric repeat units comprising alternating silicon and nitrogen, of the formula:

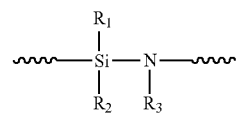

where each of $R_1$ and $R_2$ are individually —H, alkyls, alkenyls, or alkynls, and $R_3$ is —H, alkyl, aryl, or allyl.

17. The method of claim 14, wherein said room temperature liquid-phase silazane comprises monomeric repeat units of the formula:

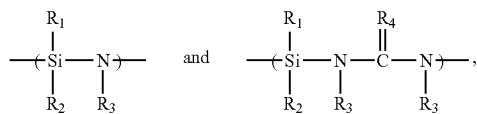

where $R_1$ and $R_2$ are individually —H, alkyls, alkenyls, or alkynls, $R_3$ is —H, alkyl, aryl, or allyl, $R_4$ is O or S, and at least one of $R_3$ is —H.

18. A method of forming a polymer-derived ceramic, said method comprising:
providing a boron-modified silazane according to claim 1;
crosslinking said boron-modified silazane to yield a cured polymeric precursor; and
converting said cured polymeric precursor to a ceramic.

19. The method of claim 18, wherein said converting comprises pyrolyzing said cured polymeric precursor, by heating said cured precursor to a temperature of at least about 700° C. for at least about 4 hours.

20. The method of claim 18, further comprising mixing a plurality of nanofillers with said boron-modified silazane prior to said crosslinking, said nanofillers being selected from the group consisting of carbon nanotubes, metal nanoparticles, carbon fiber, 2-D nanosheets, fullerenes, and mixtures thereof.

21. The method of claim 18, further comprising:
providing a substrate having a surface and forming a layer of said boron-modified silazane adjacent said substrate surface prior to said crosslinking;
providing a mold and filling said mold with said boron-modified silazane prior to said crosslinking; or
providing a fibrous reinforcement structure and impregnating said structure with said boron-modified silazane prior to said crosslinking.

22. The method of claim 18, further comprising grinding said cured polymeric precursor into a powder prior to said converting, and providing a substrate having a surface and forming a coating of said powder adjacent said substrate surface prior to said converting.

23. The method of claim 22, further comprising dispersing said powder in a solvent system or binder before forming said coating.

24. The method of claim 18, further comprising grinding said ceramic into a powder, and providing a substrate having a surface and forming a coating of said powder adjacent said substrate surface.

* * * * *